US012700946B2

(12) United States Patent
Zhu et al.

(10) Patent No.: US 12,700,946 B2
(45) Date of Patent: Aug. 4, 2026

(54) DATA TRANSMISSION METHOD, DATA RECEIVING METHOD, AND COMMUNICATION APPARATUS

(71) Applicant: HUAWEI TECHNOLOGIES CO., LTD., Shenzhen (CN)

(72) Inventors: Huiying Zhu, Shanghai (CN); Pengpeng Dong, Shanghai (CN); Zhiyuan Tan, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 311 days.

(21) Appl. No.: 18/591,308

(22) Filed: Feb. 29, 2024

(65) Prior Publication Data

US 2024/0214108 A1    Jun. 27, 2024

Related U.S. Application Data

(63) Continuation of application No. PCT/CN2022/115455, filed on Aug. 29, 2022.

(30) Foreign Application Priority Data

Aug. 30, 2021    (CN) .......................... 202111018156.9

(51) Int. Cl.
H04L 1/00         (2006.01)

(52) U.S. Cl.
CPC .......... H04L 1/0007 (2013.01); H04L 1/0033 (2013.01)

(58) Field of Classification Search
CPC ... H04L 1/0007; H04L 1/0033; H04L 1/0075; H04L 1/0076; H04L 1/0045; H04L 1/0041; H03M 13/3761
See application file for complete search history.

(56) References Cited

U.S. PATENT DOCUMENTS

2006/0224760 A1* 10/2006 Yu ......................... H04L 67/108
709/231

FOREIGN PATENT DOCUMENTS

| CN | 105356892 A | 2/2016 |
| CN | 105356968 A | 2/2016 |
| CN | 105703782 A | 6/2016 |

(Continued)

OTHER PUBLICATIONS

Chi Wan Sung & Xueqing Gong, "Combination Network Coding: Alphabet Size and Zigzag Decoding", IEEE, 2014 (Year: 2014).*

(Continued)

*Primary Examiner* — Habte Mered
(74) *Attorney, Agent, or Firm* — Maier & Maier, PLLC

(57)         ABSTRACT

A data transmission method, a data receiving method, and a communication apparatus, which may be applied to an extended reality (XR) service or another low-latency service. The method includes: obtaining K to-be-coded data packets with a same length; performing shift exclusive OR coding based on a coding coefficient and the K to-be-coded data packets, to obtain a check packet; and sending the check packet, where a packet header of the check packet does not include indication information of the coding coefficient, the coding coefficient of the check packet is related to a difference between a data length of the check packet and the length of the to-be-coded data packet, and the to-be-coded data packet includes an original packet or a system packet corresponding to an original packet.

20 Claims, 11 Drawing Sheets

700

(56)                    References Cited

FOREIGN PATENT DOCUMENTS

| CN | 107317844 A | | 11/2017 |
|----|-------------|---|---------|
| CN | 107547436 A | * | 1/2018 |
| CN | 108199720 A | | 6/2018 |
| CN | 108628697 A | | 10/2018 |
| CN | 110362537 A | | 10/2019 |

OTHER PUBLICATIONS

Nozaki, "Zigzag Decodable Fountain Codes", IEEE, XP080704410, May 30, 2016, 11 pages.
Dai et al., "A New Zigzag-Decodable Code with Efficient Repair in Wireless Distributed Storage", IEEE Transactions on Mobile Computing, IEEE, XP011644827, ISSN: 1536-1233, Jul. 14, 2016, vol. 16, No. 5, 13 pages.
Sung et al., "Combination Network Coding: Alphabet Size and Zigzag Decoding", International Symposium on Information Theory and its Applications, IEICE, XP032702015, Oct. 26-29, 2014, 5 pages.
Gong et al., "Zigzag Decodable Codes: Linear-Time Erasure Codes with Applications to Data Storage", Journal of Computer and System Sciences, Elsevier Inc., XP085148807, ISSN: 0022-0000, May 24, 2017, vol. 89, 19 pages.
Intel Corporation et al., "Use Cases and Options for Network Coding in IAB", 3GPP TSG RAN Meeting #86, RP-192535, Dec. 9-12, 2019, 7 pages.

* cited by examiner (a) Point-to-point transmission (b) Multi-hop single-connectivity (c) Multi-hop multi-connectivity (d) Dual connectivity

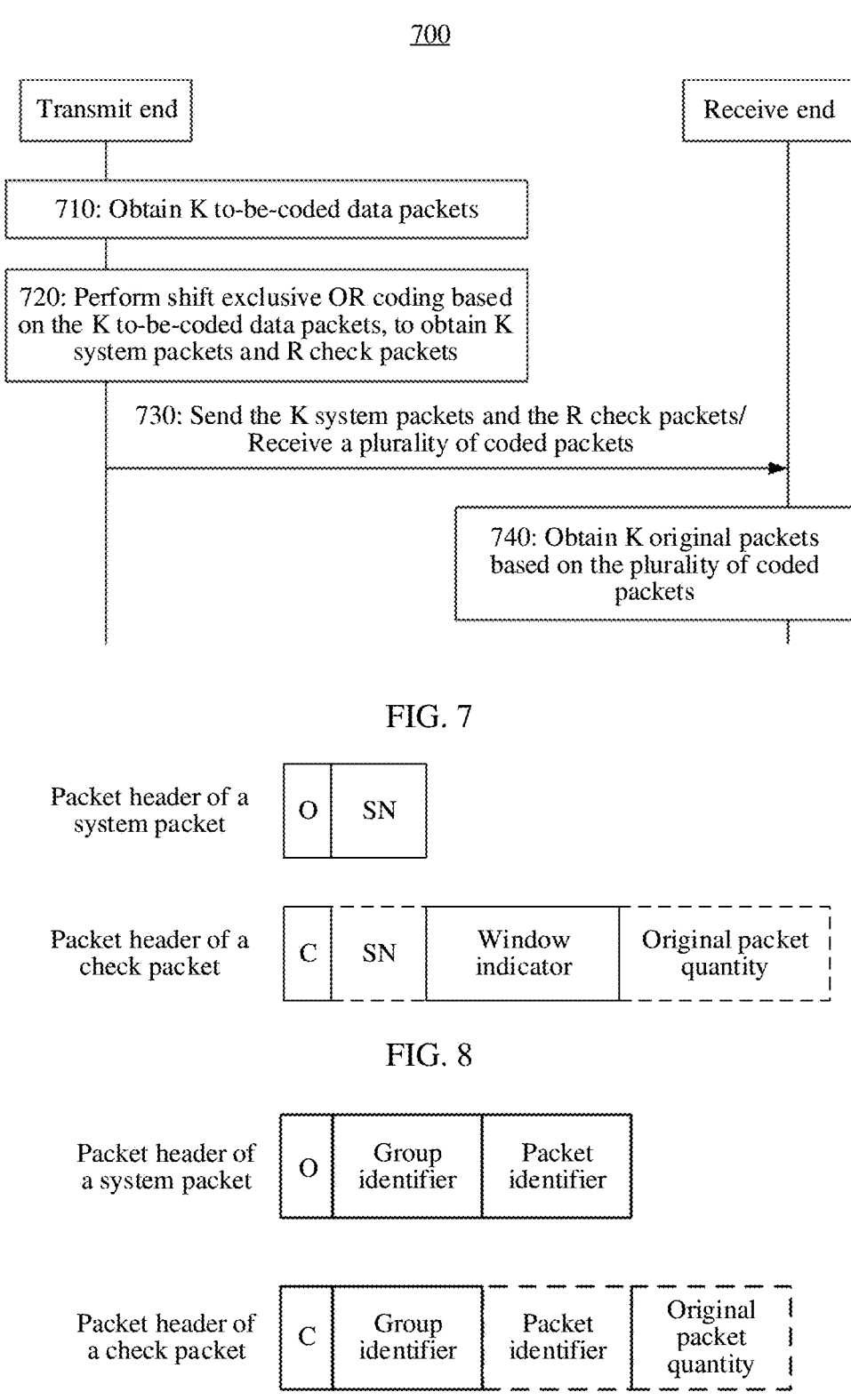

700

Transmit end

Receive end

710: Obtain K to-be-coded data packets

720: Perform shift exclusive OR coding based on the K to-be-coded data packets, to obtain K system packets and R check packets 730: Send the K system packets and the R check packets/ Receive a plurality of coded packets 740: Obtain K original packets based on the plurality of coded packets

FIG. 7

Packet header of a system packet | O | SN

Packet header of a check packet | C | SN | Window indicator | Original packet quantity

FIG. 8

Packet header of a system packet | O | Group identifier | Packet identifier

Packet header of a check packet | C | Group identifier | Packet identifier | Original packet quantity

FIG. 9

DATA TRANSMISSION METHOD, DATA RECEIVING METHOD, AND COMMUNICATION APPARATUS

CROSS-REFERENCE TO RELATED APPLICATIONS

This application is a continuation of International Application No. PCT/CN2022/115455, filed on Aug. 29, 2022, which claims priority to Chinese Application No. 202111018156.9, filed on Aug. 30, 2021. The disclosures of the aforementioned applications are hereby incorporated by reference in their entireties.

TECHNICAL FIELD

The embodiments relate to the communication field, and to a data transmission method, a data receiving method, and a communication apparatus.

BACKGROUND

A network coding (NC) technology may be used to perform network coding on a plurality of original data packets to generate coded data packets. Both a latency and spectral efficiency performance can be considered through transmission of the coded data packet.

To obtain high transmission reliability and ensure that a receive end can correctly perform decoding, a packet header of the coded packet usually needs to carry, for example, a coding coefficient index field indicating a coding coefficient, an original/coded (O/C) field indicating a coded packet type, an original packet quantity field, a window indicator field indicating a coding window, and a block identifier (block ID) field. This causes high indication overheads.

Therefore, it is expected to provide a method to reduce indication overheads and use limited spectrum resources for more data transmission to improve utilization of the spectrum resources.

SUMMARY

The embodiments provide a data transmission method, a data receiving method, and a communication apparatus, to reduce indication overheads and improve utilization of spectrum resources.

According to a first aspect, the embodiments provide a data transmission method. The method may be performed by a transmit end, may be performed by a component (for example, a chip or a chip system) disposed in a transmit end, or may be implemented by a logical module or software that can implement all or some of functions of a transmit end. This is not limited.

For example, the method includes: obtaining K to-be-coded data packets, where lengths of the K to-be-coded data packets are the same, and K>1 and is an integer; performing shift exclusive OR coding based on a coding coefficient and the K to-be-coded data packets, to obtain a check packet, where a packet header of the check packet does not include indication information of the coding coefficient, the coding coefficient of the check packet corresponds to a difference between a data length of the check packet and the length of the to-be-coded data packet, and the K to-be-coded data packets include K original packets or K system packets corresponding to the K original packets; and sending the check packet.

A receive end needs to perform decoding based on the coding coefficient of the check packet. Therefore, when sending the check packet, the transmit end needs to use the packet header to carry the indication information of the coding coefficient of the check packet. In this embodiment, a correspondence between the coding coefficient of the check packet and the difference between the data length of the check packet and the length of the to-be-coded data packet is used, so that the receive end can determine the coding coefficient of the check packet based on the difference between the data length of the received check packet and the length of the to-be-coded data packet (for example, an original packet or a system packet) and the correspondence. Therefore, indication overheads of the coding coefficient of the check packet can be reduced, and limited spectrum resources can be used for more data transmission to improve utilization of the spectrum resources.

Optionally, the check packet is any one of R check packets obtained by performing shift exclusive OR coding based on R groups of coding coefficients and the K to-be-coded data packets, each of the R check packets corresponds to one of the R groups of coding coefficients, and $R \geq 1$ and is an integer.

A quantity of check packets obtained by coding the K original packets is not limited in the embodiments. There may be one or more check packets, and any check packet may satisfy: a coding coefficient corresponds to a difference between a data length of the check packet and the length of the to-be-coded data packet.

Further, when $R > 1$, lengths of any two of the R check packets are different.

When the method is applied to a plurality of check packets, data lengths of the plurality of check packets may be made different through coding, so that the receive end uniquely determines a group of coding coefficients for each check packet, to perform successful decoding.

With reference to the first aspect, in some possible implementations of the first aspect, the R check packets are obtained by performing shift exclusive OR coding on the K to-be-coded data packets based on the R groups of coding coefficients, the R groups of coding coefficients are in a one-to-one correspondence with R values, and the R values respectively correspond to differences between the length of the to-be-coded data packet and data lengths of the R check packets.

In other words, the R values indicate the differences between the length of the to-be-coded data packet and the data lengths of the R check packets.

The R values may be obtained by performing mathematical transformation based on differences between a length of the system packet and the data lengths of the check packets. The mathematical transformation may include linear transformation of at least one or more of the following operations: addition of any value, subtraction of any value, multiplication by any value, or division by any value.

A possible form of the R values is quantities of shift units included in the differences between the length of the to-be-coded data packet and the data lengths of the R check packets. Another possible form of the R values is multiples of quantities of shift units included in the differences between the length of the to-be-coded data packet and the data lengths of the R check packets. Still another possible form of the R values is ratios of quantities of shift units included in the differences between the length of the to-be-coded data packet and the data lengths of the R check packets to a displacement reference quantity, or the like. The embodiments include but are not limited to this.

It should be understood that the to-be-coded data packet may be an original packet, and R values corresponding to differences between a length of the original packet and the data lengths of the R check packets may be denoted as R first values. Alternatively, the to-be-coded data packet may be a system packet, and R values corresponding to differences between a length of the system packet and the data lengths of the R check packets may be denoted as R second values.

In an implementation, the K to-be-coded data packets include the K original packets, the R check packets are obtained by performing shift exclusive OR coding on the K original packets based on the R groups of coding coefficients, the R groups of coding coefficients are in a one-to-one correspondence with R first values, and the R first values are related to differences between a length of the original packet and the data lengths of the R check packets.

If the R check packets are obtained by performing shift exclusive OR coding on the K original packets based on the R groups of coding coefficients, the receive end may determine the coding coefficient based on the one-to-one correspondence between the R groups of coding coefficients and the R first values and a difference between a data length of each received check packet and the length of the original packet.

For example, both the length of the original packet and a packet header length of the check packet may be predefined, and may be known by the receive end in advance. The data length of the check packet may be obtained by the receive end by detecting each received check packet, and may be obtained by subtracting the packet header length of the check packet from a length of the received check packet. After the data length of each check packet and the length of the original packet are determined, the coding coefficient may be determined based on the difference between the lengths of the check packet and the original packet. It may be understood that when the receive end can identify that a received data packet is a system packet or a check packet, the length of the original packet may be learned by the receive end through detection.

The first value may be obtained by performing mathematical transformation based on the difference between the data length of the check packet and the length of the original packet. If the difference between the data length of the check packet and the length of the original packet is denoted as d, and the mathematical transformation on the length difference is denoted as a function $f(\ )$, the first value may be denoted as $f(d)$, and the R first values $f(d)$ are in a one-to-one correspondence with the R groups of coding coefficients. The mathematical transformation may include linear transformation of at least one or more of the following operations: addition of any value, subtraction of any value, multiplication by any value, or division by any value.

Two possible forms of the first value are provided below.

In a possible form, the first value is a quantity of shift units included in the difference between the data length of the check packet and the length of the original packet.

Optionally, that the R first values are related to differences between a length of the original packet and the data lengths of the R check packets includes: The R first values are respectively quantities of shift units included in the differences between the length of the original packet and the data lengths of the R check packets.

Generally, a length of a data packet, a data length, or the like may be expressed in bits, bytes, or the like. For ease of representing the length, the length may be converted into a ratio of the length to the shift unit, to facilitate counting. In this case, the first value represents the quantity of shift units included in the difference between the data length of the check packet and the length of the original packet.

The difference between the data length of the check packet and the length of the original packet corresponds to the coding coefficient. Therefore, to enable the receive end to uniquely determine a group of coding coefficients based on each received check packet, it only needs to be ensured that largest displacement quantities respectively defined by the R groups of coding coefficients are different.

In another possible form, the first value is a ratio of a quantity of shift units included in the difference between the data length of the check packet and the length of the original packet to a displacement reference quantity.

Optionally, that the R first values are related to differences between a length of the original packet and the data lengths of the R check packets includes: The R first values are respectively ratios of quantities of shift units included in the differences between the length of the original packet and the data lengths of the R check packets to the displacement reference quantity, where the displacement reference quantity is a greatest common divisor of largest displacement quantities respectively defined by different columns of coding coefficients in K rows of coding coefficients in a predefined $P \times Q$-dimensional matrix that correspond to the R groups of coding coefficients, $P \geq K$, $Q \geq R$, and P and Q are integers.

In some cases, largest displacement quantities of the R groups of coding coefficients may be determined based on the K rows of coding coefficients in the predefined $P \times Q$-dimensional matrix that correspond to the R groups of coding coefficients. Therefore, a greatest common divisor of largest displacement quantities respectively defined by all columns of coding coefficients in the K rows of coding coefficients is a displacement reference quantity of the R groups of coding coefficients.

In another implementation, the K to-be-coded data packets include the K system packets, the R check packets are obtained by performing shift exclusive OR coding on the K system packets based on the R groups of coding coefficients, the K system packets correspond to the K original packets, the R groups of coding coefficients are from R predefined groups of coding coefficients, the R groups of coding coefficients are in a one-to-one correspondence with R second values, and the R second values are related to differences between a length of the system packet and the data lengths of the R check packets.

If the R check packets are obtained by performing shift exclusive OR coding on the K system packets based on the R groups of coding coefficients, the receive end may determine the coding coefficient based on the one-to-one correspondence between the R groups of coding coefficients and the R second values and a difference between a data length of each received check packet and the length of the system packet.

For example, all of a length of the original packet, a packet header length of the system packet, and a packet header length of the check packet may be predefined, and may be known by the receive end in advance. Therefore, the length of the system packet may be predetermined, and is a sum of the length of the original packet and the packet header length of the system packet. The data length of the check packet may be obtained by the receive end by detecting each received check packet, and may be obtained by subtracting the packet header length of the check packet from a length of the received check packet. Therefore, after the data length of each check packet and the length of the system packet are determined, the coding coefficient may be determined based on the difference between the lengths of the check packet and the system packet. It may be understood that when the receive end can identify that a received data packet is a system packet or a check packet, the length of the original packet may be learned by the receive end through detection.

The second value may be obtained by performing mathematical transformation based on the difference between the data length of the check packet and the length of the system packet. If the difference between the data length of the check packet and the length of the system packet is denoted as w, and the mathematical transformation on the length difference is denoted as a function $f(\ )$, the second value may be denoted as $f(w)$, and the R second values $f(w')$ are in a one-to-one correspondence with the R groups of coding coefficients. The mathematical transformation may include linear transformation of at least one or more of the following operations: addition of any value, subtraction of any value, multiplication by any value, or division by any value.

Two possible forms of the second value are provided below.

In a possible form, the second value is a quantity of shift units included in the difference between the data length of the check packet and the length of the system packet.

Optionally, that the R second values are related to differences between a length of the system packet and the data lengths of the R check packets includes: The R second values are respectively quantities of shift units included in the differences between the length of the system packet and the data lengths of the R check packets.

In another possible form, the second value is a ratio of a quantity of shift units included in the difference between the data length of the check packet and the length of the system packet to a displacement reference quantity.

Optionally, that the R second values are related to differences between a length of the system packet and the data lengths of the R check packets includes: The R second values are respectively ratios of quantities of shift units included in the differences between the length of the system packet and the data lengths of the R check packets to the displacement reference quantity, where the displacement reference quantity is a greatest common divisor of largest displacement quantities respectively defined by different columns of coding coefficients in K rows of coding coefficients in a predefined P×Q-dimensional matrix that correspond to the R groups of coding coefficients, P≥K, Q≥R, and P and Q are integers.

For related descriptions of the two possible forms of the second value, refer to the foregoing related descriptions of the two possible forms of the first value. For brevity, details are not described herein.

With reference to the first aspect, in some possible implementations of the first aspect, the check packet is one of a plurality of coded packets obtained by performing shift exclusive OR coding on the K to-be-coded data packets based on a plurality of groups of coding coefficients, a packet header of each of the plurality of coded packets does not include indication information of a coded packet type, or a packet header of each of the plurality of coded packets does not include a coded packet type field, there is a correspondence between the coded packet type and a length of the coded packet or a length of a data part of the coded packet, and the coded packet type includes a check packet or a system packet.

Herein, the indication information of the coded packet type may include an original (original, O) field carried in a packet header of the system packet, a coded (coded, C) field carried in a packet header of the check packet, indication information of a coding coefficient carried in the packet header of the system packet, and indication information of a coding coefficient carried in the packet header of the check packet.

It should be understood that the coding coefficient of the system packet is a unit vector, and the coding coefficient of the check packet is a non-unit vector. For example, in coding coefficients used to generate the system packet, each group of coding coefficients includes a non-zero element. However, the coding coefficient of the check packet does not have this feature. The coding coefficient of the system packet and the coding coefficient of the check packet may be used by the receive end to identify whether a received coded packet is a system packet or a check packet.

In a possible implementation, the indication information of the coding coefficient may be carried in a coding coefficient index field or a coefficient vector index field. A field used to carry the indication information of the coding coefficient is not limited.

That a packet header of each of the plurality of coded packets does not include indication information of a coded packet type may include: in the plurality of coded packets, a packet header of a system packet does not include an O field, and a packet header of a check packet does not include a C field; and neither the packet header of the system packet nor the packet header of the check packet in the plurality of coded packets includes indication information of a coding coefficient.

The coded packet type field may be an O field and a C field, and may be briefly referred to as an O/C field.

That a packet header of each of the plurality of coded packets does not include a coded packet type field may include: In the plurality of coded packets, a packet header of a system packet does not include an O field, and a packet header of a check packet does not include a C field.

A length of the check packet may be not less than the length of the to-be-coded data packet. Therefore, the check packet and the system packet may be distinguished by using a value relationship between the lengths. For example, there is a correspondence between the coded packet type and the length of the coded packet or the length of the data part of the coded packet. By using the correspondence, the transmit end may not need to indicate the coded packet type in the packet header of the coded packet, and does not need to indicate the coding coefficient for each of the check packet and the system packet; and the receive end may determine, based on the length of the received coded packet or the length of the data part of the coded packet, whether the received packet is a check packet or a system packet. Therefore, overheads caused by packet header indication can be reduced, and limited spectrum resources can be used for more data transmission to help improve utilization of the spectrum resources.

According to a second aspect, a data receiving method is provided. The method may be performed by a receive end, may be performed by a component (for example, a chip or a chip system) disposed in a receive end, or may be implemented by a logical module or software that can implement all or some of functions of a receive end. This is not limited.

For example, the method includes: receiving a plurality of coded packets, where the plurality of coded packets include a check packet, a packet header of the check packet does not include indication information of a coding coefficient, the check packet includes data obtained by performing shift exclusive OR coding on K first data packets with a same length based on the coding coefficient, the K first data packets include K original packets or K system packets corresponding to the K original packets, K>1 and is an integer, and there is a correspondence between the coding coefficient and a difference between a data length of the check packet and the length of the first data packet.

The first data packet corresponds to the to-be-coded data packet in the first aspect. For the receive end, the received coded packet is a data packet obtained after shift exclusive OR coding is performed on the to-be-coded data packet. The to-be-coded data packet obtained by a transmit end is coded for the receive end, and therefore the data packet is named the first data packet for distinction.

The check packet includes the data obtained by performing shift exclusive OR coding on the K first data packets with a same length based on the coding coefficient, that is, the check packet and the K first data packets with a same length meet a shift exclusive OR coding relationship based on the coding coefficient.

The receive end needs to perform decoding based on the coding coefficient of the check packet. Therefore, when sending the check packet, the transmit end needs to use the packet header to carry the indication information of the coding coefficient of the check packet. In this embodiment, the correspondence between the coding coefficient of the check packet and the difference between the data length of the check packet and the length of the first data packet is used, so that the receive end can determine the coding coefficient of the check packet based on the difference between the data length of the received check packet and the length of the first data packet (for example, an original packet or a system packet) and the correspondence. Therefore, indication overheads of the coding coefficient of the check packet can be reduced, and limited spectrum resources can be used for more data transmission to improve utilization of the spectrum resources.

Optionally, the plurality of coded packets include U check packets, the check packet is any one of the U check packets, the U check packets include data obtained by performing shift exclusive OR coding on the K original packets based on U groups of coding coefficients, each of the U check packets corresponds to one of the U groups of coding coefficients, and U≥1 and is an integer.

A quantity of check packets obtained by coding the K original packets is not limited in the embodiments. One or more check packets may be obtained through coding. Therefore, the receive end may receive one or more check packets. Any check packet may satisfy: a coding coefficient corresponds to a difference between a data length of the check packet and a length of the to-be-coded data packet.

Further, when U>1, lengths of any two of the U check packets are different.

When the method is applied to a plurality of check packets, data lengths of the plurality of check packets are different, so that the receive end can uniquely determine a group of coding coefficients for each check packet, to perform successful decoding.

It should be understood that because packet loss may occur, the check packets received by the receive end may be some or all of R check packets sent by the transmit end. Therefore, U≤R.

With reference to the second aspect, in some possible implementations of the second aspect, the U check packets are obtained by performing shift exclusive OR coding on the K first data packets based on the U groups of coding coefficients, the U groups of coding coefficients are in a one-to-one correspondence with U values, and the U values respectively correspond to differences between the length of the first data packet and data lengths of the U check packets.

In other words, the U values indicate the differences between the length of the first data packet and the data lengths of the U check packets.

The U values may be obtained by performing mathematical transformation based on differences between a length of the system packet and the data lengths of the check packets. The mathematical transformation may include linear transformation of at least one or more of the following operations: addition of any value, subtraction of any value, multiplication by any value, or division by any value.

A possible form of the U values is quantities of shift units included in the differences between the length of the first data packet and the data lengths of the U check packets. Another possible form of the U values is multiples of quantities of shift units included in the differences between the length of the first data packet and the data lengths of the U check packets. Still another possible form of the U values is ratios of quantities of shift units included in the differences between the length of the first data packet and the data lengths of the U check packets to a displacement reference quantity, or the like. The embodiments include but are not limited to this.

It should be understood that the first data packet may be an original packet, and U values corresponding to differences between a length of the original packet and the data lengths of the U check packets may be denoted as U first values. Alternatively, the first data packet may be a system packet, and U values corresponding to differences between a length of the system packet and the data lengths of the U check packets may be denoted as U second values.

In an implementation, the K first data packets include the K original packets, and the determining the coding coefficient based on the check packet includes: determining the coding coefficient based on a difference between the data length of the check packet and a length of the original packet and a correspondence between the U groups of coding coefficients and U first values, where the U first values are related to differences between the length of the original packet and the data lengths of the U check packets.

If the U check packets are obtained by performing shift exclusive OR coding on the K original packets based on the U groups of coding coefficients, the receive end may determine the coding coefficient based on the one-to-one correspondence between the U groups of coding coefficients and the U first values and a difference between a data length of each received check packet and the length of the original packet.

For example, both the length of the original packet and a packet header length of the check packet may be predefined, and may be known by the receive end in advance. The data length of the check packet may be obtained by the receive end by detecting each received check packet, and may be obtained by subtracting the packet header length of the check packet from a length of the received check packet. After the data length of each check packet and the length of the original packet are determined, the coding coefficient may be determined based on the difference between the lengths of the check packet and the original packet. It may be understood that when the receive end can identify that a received data packet is a system packet or a check packet, the length of the original packet may be learned by the receive end through detection.

The first value may be obtained by performing mathematical transformation based on the difference between the data length of the check packet and the length of the original packet. If the difference between the data length of the check packet and the length of the original packet is denoted as d, and the mathematical transformation on the length difference is denoted as a function $f(\ )$, the first value may be denoted as $f(d)$, and the U first values $f(d)$ are in a one-to-one correspondence with the U groups of coding coefficients. The mathematical transformation may include linear transformation of at least one or more of the following operations: addition of any value, subtraction of any value, multiplication by any value, or division by any value.

Two possible forms of the first value are provided below.

In a possible form, the first value is a quantity of shift units included in the difference between the data length of the check packet and the length of the original packet.

Optionally, that the U first values are related to differences between a length of the original packet and the data lengths of the U check packets includes: the U first values are respectively quantities of shift units included in the differences between the length of the original packet and the data lengths of the U check packets.

In another possible form, the first value is a ratio of a quantity of shift units included in the difference between the data length of the check packet and the length of the original packet to a displacement reference quantity.

Optionally, that the U first values are related to differences between a length of the original packet and the data lengths of the U check packets includes: the U first values are respectively ratios of quantities of shift units included in the differences between the length of the original packet and the data lengths of the U check packets to the displacement reference quantity, where the displacement reference quantity is a greatest common divisor of largest displacement quantities respectively defined by different columns of coding coefficients in K rows of coding coefficients in a predefined P×Q-dimensional matrix that correspond to the U groups of coding coefficients, $P \geq K$, $Q \geq U$, and P and Q are integers.

It should be understood that the one-to-one correspondence between the U groups of coding coefficients and the U first values in the second aspect is a subset of the one-to-one correspondence between the R groups of coding coefficients and the R first values in the first aspect. For the one-to-one correspondence between the U groups of coding coefficients and the U first values and the U first values, refer to the related descriptions in the first aspect. For brevity, details are not described herein.

In another implementation, the K first data packets include the K system packets, and the determining the coding coefficient based on the check packet includes: determining the coding coefficient based on a difference between the data length of the check packet and a length of the system packet and a correspondence between the U groups of coding coefficients and U second values, where the U second values are related to differences between the length of the system packet and the data lengths of the U check packets.

If the U check packets are obtained by performing shift exclusive OR coding on the K system packets based on the U groups of coding coefficients, the receive end may determine the coding coefficient based on the one-to-one correspondence between the U groups of coding coefficients and the U second values and a difference between a data length of each received check packet and the length of the system packet.

For example, all of a length of the original packet, a packet header length of the system packet, and a packet header length of the check packet may be predefined, and may be known by the receive end in advance. Therefore, the length of the system packet may be predetermined, and is a sum of the length of the original packet and the packet header length of the system packet. The data length of the check packet may be obtained by the receive end by detecting each received check packet, and may be obtained by subtracting the packet header length of the check packet from a length of the received check packet. Therefore, after the data length of each check packet and the length of the system packet are determined, the coding coefficient may be determined based on the difference between the lengths of the check packet and the system packet. It may be understood that when the receive end can identify that a received data packet is a system packet or a check packet, the length of the original packet may be learned by the receive end through detection.

The second value may be obtained by performing mathematical transformation based on the difference between the data length of the check packet and the length of the system packet. If the difference between the data length of the check packet and the length of the system packet is denoted as w, and the mathematical transformation on the length difference is denoted as a function $f(\ )$, the second value may be denoted as $f(w)$, and the U second values $f(w)$ are in a one-to-one correspondence with the U groups of coding coefficients. The mathematical transformation may include linear transformation of at least one or more of the following operations: addition of any value, subtraction of any value, multiplication by any value, or division by any value.

Two possible forms of the second value are provided below.

In a possible form, the second value is a quantity of shift units included in the difference between the data length of the check packet and the length of the system packet.

Optionally, that the U second values are related to differences between a length of the system packet and the data lengths of the U check packets includes: The U second values are respectively quantities of shift units included in the differences between the length of the system packet and the data lengths of the U check packets.

In another possible form, the second value is a ratio of a quantity of shift units included in the difference between the data length of the check packet and the length of the system packet to a displacement reference quantity.

Optionally, that the U second values are related to differences between a length of the system packet and the data lengths of the U check packets includes: The U second values are respectively ratios of quantities of shift units included in the differences between the length of the system packet and the data lengths of the U check packets to the displacement reference quantity, where the displacement reference quantity is a greatest common divisor of largest displacement quantities respectively defined by different columns of coding coefficients in K rows of coding coefficients in a predefined P×Q-dimensional matrix that correspond to the U groups of coding coefficients, $P \geq K$, $Q \geq U$, and P and Q are integers.

It should be understood that the one-to-one correspondence between the U groups of coding coefficients and the U second values in the second aspect is a subset of the one-to-one correspondence between the R groups of coding coefficients and the R second values in the first aspect. In addition, the second value is similar to the first value. However, because different to-be-coded data packets are used, the length differences are calculated based on different lengths of the to-be-coded data packets. For content of the one-to-one correspondence between the U groups of coding coefficients and the U second values, refer to the foregoing related descriptions of the R groups of coding coefficients and the R groups of first values. For brevity, details are not described herein.

With reference to the first aspect or the second aspect, in some possible implementations, the P×Q-dimensional matrix $H_V$ satisfies:

$$H_v = \begin{bmatrix} z^0 & z^0 & z^0 & \cdots & z^0 \\ z^0 & z^1 & z^2 & \cdots & z^{Q-1} \\ z^0 & z^2 & z^4 & \cdots & z^{2(Q-1)} \\ \vdots & \vdots & \vdots & \ddots & \vdots \\ z^0 & z^{P-1} & z^{2(P-1)} & \cdots & z^{(P-1)(Q-1)} \end{bmatrix},$$

where the coding coefficient used to generate the check packet is from K coding coefficients $[z^{(i-1)(q-1)} \ z^{i(q-1)} \ \ldots \ z^{(i+K-2)(q-1)}]^T$ in a $q^{th}$ column in the matrix $H_v$, $1 \leq i \leq P-K+1$, $1 \leq q \leq Q$, and q are integers; and a data part $y_q$ of the check packet satisfies $y_q = z^{(i-1)(q-1)}x_1 \oplus z^{i(q-1)}x_2 \oplus \ldots \oplus z^{(i+K-2)(q-1)}x_K$, $\oplus$ represents exclusive OR processing, $x_1$, $x_2$, . . . , and $x_K$ represent the K to-be-coded data packets or the K first data packets, $z^t$ represents that data multiplied by $z^t$ is shifted by t shift units, $0 \leq t \leq (P-1)(Q-1)$, and t is an integer.

It should be understood that for the transmit end, $x_1$, $x_2$, . . . , and $x_K$ represent the K to-be-coded data packets, and $y_q$ may be a data part of a check packet in the R check packets sent by the transmit end, for example, a data part of an $r^{th}$ check packet.

For the receive end, $x_1$, $x_2$, . . . , and $x_K$ represent the K first data packets, and $y_q$ may be a data part of a check packet in the U check packets received by the receive end, for example, a data part of a $u^{th}$ check packet.

It should be understood that the P×Q-dimensional matrix may be referred to as a matrix having a Vandermonde matrix structure or a matrix in a form of a Vandermonde matrix. The R groups of coding coefficients may be determined, for example, based on the matrix $H_V$, for example, are a matrix including any K rows and any R columns of elements in the matrix $H_V$, or may be any R columns of elements selected from a matrix obtained after at least one of the following types of transformation is performed on any K rows of elements in the matrix $H_V$: row switching transformation, column switching transformation, or row switching transformation performed on one or more columns.

It should be further understood that the P×Q-dimensional matrix may be converted into a Q×P-dimensional matrix. For example, the Q×P-dimensional matrix is a transpose of the matrix $H_V$. The R groups of coding coefficients may be determined, for example, based on the Q×P-dimensional matrix. For example, the R groups of coding coefficients may be any K columns and any R rows of elements in the Q×P-dimensional matrix, or may be any R rows of elements selected from a matrix obtained after at least one of the following types of transformation is performed on any K columns of elements in the Q×P-dimensional matrix: row switching transformation, column switching transformation, or column switching transformation performed on one or more rows.

With reference to the second aspect, in some possible implementations of the second aspect, the check packet is one of the plurality of coded packets, a packet header of each of the plurality of coded packets does not include indication information of a coded packet type, or a packet header of each of the plurality of coded packets does not include a coded packet type field, there is a correspondence between the coded packet type and a length of the coded packet or a length of a data part of the coded packet, and the coded packet type includes a check packet or a system packet.

For descriptions of the indication information of the coded packet type, the coded packet type field, and the indication information of the coding coefficient, refer to the related descriptions in the first aspect. For brevity, details are not described herein.

The plurality of coded packets received by the receive end may be some or all of the plurality of coded packets sent by the transmit end. Therefore, the plurality of coded packets received by the receive end may include a system packet and a check packet, may include a plurality of system packets but include no check packet, that is, all of the coded packets are system packets, or may include a plurality of check packets but include no system packet, that is, all of the coded packets are check packets.

A length of the check packet may be not less than the length of the to-be-coded data packet. Therefore, the check packet and the system packet may be distinguished by using a value relationship between the lengths. For example, there is a correspondence between the coded packet type and the length of the coded packet or the length of the data part of the coded packet. By using the correspondence, the transmit end may not need to indicate the coded packet type in the packet header of the coded packet, and does not need to indicate the coding coefficient for each of the check packet and the system packet; and the receive end may determine, based on the length of the received coded packet or the length of the data part of the coded packet, whether the received packet is a check packet or a system packet. Therefore, overheads caused by packet header indication can be reduced, and limited spectrum resources can be used for more data transmission to help improve utilization of the spectrum resources.

The following lists several possible cases in which the system packet and the check packet are distinguished based on the length of the coded packet.

In a possible case in which there is a correspondence between the coded packet type and the length of the data part of the coded packet, a data length of the check packet is greater than a length of the original packet, and a data length of the system packet is equal to the length of the original packet; and a packet header length of the check packet is equal to a packet header length of the system packet, and the check packet is obtained by performing shift exclusive OR coding based on the plurality of system packets corresponding to the plurality of original packets. The check packet is obtained by performing shift exclusive OR coding based on the plurality of system packets corresponding to the plurality of original packets, that is, the check packet and the plurality of system packets corresponding to the plurality of original packets meet a shift exclusive OR coding relationship.

That is, the receive end may identify the check packet and the system packet based on a value relationship between a data length of the coded packet and the original packet. The packet header length of the check packet is the same as the packet header length of the system packet. Therefore, the data length of the coded packet may be obtained by subtracting the packet header length of the check packet or the system packet from the length of the received coded packet. If the data length of the coded packet is greater than the length of the original packet, the coded packet is a check packet; or if the data length of the coded packet is equal to the length of the original packet, the coded packet is a system packet.

In a possible case in which there is a correspondence between the coded packet type and the length of the coded packet, the length of the check packet is greater than a sum of a length of the original packet and a packet header length of the system packet, and a length of the system packet is equal to the sum of the length of the original packet and the packet header length of the system packet; and a packet header length of the check packet is equal to the packet header length of the system packet, and the check packet is obtained by performing shift exclusive OR coding based on the plurality of system packets corresponding to the plurality of original packets.

That is, the receive end may identify the check packet and the system packet based on a value relationship between the length of the coded packet and the length sum of the packet header length of the check packet or the system packet and the length of the original packet. If the length of the coded packet is greater than the sum of the lengths, the coded packet is a check packet; or if the length of the coded packet is equal to the sum of the lengths, the coded packet is a system packet.

In another possible case in which there is a correspondence between the coded packet type and the length of the data part of the coded packet, a data length of the check packet is greater than a length of the original packet, and a data length of the system packet is equal to the length of the original packet; and a packet header length of the check packet is equal to a packet header length of the system packet, the check packet is obtained by performing shift exclusive OR coding based on the plurality of original packets, and all of displacement quantities defined by coding coefficients in each group of coding coefficients used to generate the check packet are not 0.

In another possible case in which there is a correspondence between the coded packet type and the length of the coded packet, the length of the check packet is greater than a sum of a length of the original packet and a packet header length of the system packet, and a length of the system packet is equal to the sum of the length of the original packet and the packet header length of the system packet; and a packet header length of the check packet is equal to the packet header length of the system packet, the check packet is obtained by performing shift exclusive OR coding based on the plurality of original packets, and all of displacement quantities defined by coding coefficients in each group of coding coefficients used to generate the check packet are not 0.

A displacement quantity defined by a coding coefficient used to perform shift exclusive OR coding on the original packet is 0, and therefore the data length of the check packet is the same as the length of the original packet. The packet header length of the check packet is the same as the packet header length of the system packet. Therefore, when both the data length of the check packet and a data length of the system packet are the length of the original packet, the length of the check packet is the same as the length of the system packet. To facilitate distinction between the check packet and the system packet, the coding coefficient may be designed. Provided that all of the displacement quantities defined by the coding coefficients in each group of coding coefficients are not 0, the data length of the check packet may be greater than the length of the original packet, so that the system packet and the check packet can be distinguished.

In this way, the receive end may identify the check packet and the system packet based on a value relationship between a data length of the coded packet and the original packet. The packet header length of the check packet is the same as the packet header length of the system packet. Therefore, the data length of the coded packet may be obtained by subtracting the packet header length of the check packet or the system packet from the length of the received coded packet. If the data length of the coded packet is greater than the length of the original packet, the coded packet is a check packet; or if the data length of the coded packet is equal to the length of the original packet, the coded packet is a system packet.

Alternatively, the receive end may identify the check packet and the system packet based on a value relationship between the length of the coded packet and the length sum of the packet header length of the check packet or the system packet and the length of the original packet. If the length of the coded packet is greater than the sum of the lengths, the coded packet is a check packet; or if the length of the coded packet is equal to the sum of the lengths, the coded packet is a system packet.

In still another possible case in which there is a correspondence between the coded packet type and the length of the coded packet, the length of the check packet is greater than a sum of a length of the original packet and a packet header length of the system packet, and a length of the system packet is equal to the sum of the length of the original packet and the packet header length of the system packet; and a packet header length of the check packet is greater than the packet header length of the system packet.

In yet another possible case in which there is a correspondence between the coded packet type and the length of the coded packet, the length of the check packet is greater than or equal to a sum of a length of the original packet and a packet header length of the check packet, and a length of the system packet is less than the sum of the length of the original packet and the packet header length of the check packet; and the packet header length of the check packet is greater than a packet header length of the system packet.

That is, the receive end may identify the check packet and the system packet based on the length of the coded packet. Regardless of whether the check packet is obtained by performing shift exclusive OR coding on the original packet or obtained by performing shift exclusive OR coding on the system packet, a data length of the check packet is not less than a data length of the system packet, and the packet header length of the check packet is greater than the packet header length of the system packet. Therefore, the length of the check packet is greater than the length of the system packet.

The receive end may identify the check packet and the system packet based on a value relationship between the length of the coded packet and the length sum of the packet header length of the system packet and the length of the original packet. If the length of the coded packet is greater than the sum of the lengths, the coded packet is a check packet; or if the length of the coded packet is equal to the sum of the lengths, the coded packet is a system packet.

Alternatively, the receive end may identify the check packet and the system packet based on a value relationship between the length of the coded packet and the length sum of the packet header length of the check packet and the length of the original packet. If the length of the coded packet is greater than or equal to the sum of the lengths, the coded packet is a check packet; or if the length of the coded packet is less than the sum of the lengths, the coded packet is a system packet.

According to a third aspect, a data transmission method is provided. The method may be performed by a transmit end, may be performed by a component (for example, a chip or a chip system) disposed in a transmit end, or may be implemented by a logical module or software that can implement all or some of functions of a transmit end. This is not limited.

For example, the method includes: obtaining a plurality of to-be-coded data packets, where lengths of the plurality of to-be-coded data packets are the same, and the plurality of to-be-coded data packets include a plurality of original packets or a plurality of system packets corresponding to the plurality of original packets; performing shift exclusive OR coding based on a coding coefficient and the plurality of to-be-coded data packets, to obtain a plurality of coded packets, where a packet header of each of the plurality of coded packets does not include indication information of a coded packet type, or a packet header of each of the plurality of coded packets does not include a coded packet type field, there is a correspondence between the coded packet type and a length of the coded packet or a length of a data part of the coded packet, and the coded packet type includes a check packet or a system packet; and sending the plurality of coded packets.

According to a fourth aspect, a data receiving method is provided. The method may be performed by a receive end, may be performed by a component (for example, a chip or a chip system) disposed in a receive end, or may be implemented by a logical module or software that can implement all or some of functions of a receive end. This is not limited.

For example, the method includes: receiving at least one coded packet, where a packet header of each of the at least one coded packet does not include indication information of a coded packet type, or a packet header of each of the plurality of coded packets does not include a coded packet type field, there is a correspondence between the coded packet type and a length of the coded packet or a length of a data part of the coded packet, and the coded packet type includes a check packet or a system packet.

Further, the method may further include: obtaining a plurality of original packets, where lengths of the plurality of original packets are the same.

A length of the check packet may be not less than a length of a to-be-coded data packet. Therefore, the check packet and the system packet may be distinguished by using a value relationship between the lengths. In this way, a transmit end may not need to indicate the coded packet type in the packet header of the coded packet, for example, use the packet header to include at least one of the coded packet type field or a coding coefficient field; and the receive end may determine, based on the length of the received coded packet, whether the received packet is a check packet or a system packet. Therefore, overheads caused by packet header indication can be reduced, and limited spectrum resources can be used for more data transmission to help improve utilization of the spectrum resources.

The following lists several possible cases in which the system packet and the check packet are distinguished based on the length of the coded packet.

In a possible case in which there is a correspondence between the coded packet type and the length of the data part of the coded packet, a data length of the check packet is greater than a length of the original packet, and a data length of the system packet is equal to the length of the original packet; and a packet header length of the check packet is equal to a packet header length of the system packet, and the check packet is obtained by performing shift exclusive OR coding based on a plurality of system packets corresponding to the plurality of original packets.

In a possible case in which there is a correspondence between the coded packet type and the length of the coded packet, the length of the check packet is greater than a sum of a length of the original packet and a packet header length of the system packet, and a length of the system packet is equal to the sum of the length of the original packet and the packet header length of the system packet; and a packet header length of the check packet is equal to the packet header length of the system packet, and the check packet is obtained by performing shift exclusive OR coding based on a plurality of system packets corresponding to the plurality of original packets.

In another possible case in which there is a correspondence between the coded packet type and the length of the data part of the coded packet, a data length of the check packet is greater than a length of the original packet, and a data length of the system packet is equal to the length of the original packet; and a packet header length of the check packet is equal to a packet header length of the system packet, the check packet is obtained by performing shift exclusive OR coding based on the plurality of original packets, and all of displacement quantities defined by coding coefficients in each group of coding coefficients used to generate the check packet are not 0.

In another possible case in which there is a correspondence between the coded packet type and the length of the coded packet, the length of the check packet is greater than a sum of a length of the original packet and a packet header length of the system packet, and a length of the system packet is equal to the sum of the length of the original packet and the packet header length of the system packet; and a packet header length of the check packet is equal to the packet header length of the system packet, the check packet is obtained by performing shift exclusive OR coding based on the plurality of original packets, and all of displacement quantities defined by coding coefficients in each group of coding coefficients used to generate the check packet are not 0.

In still another possible case in which there is a correspondence between the coded packet type and the length of the coded packet, the length of the check packet is greater than a sum of a length of the original packet and a packet header length of the system packet, and a length of the system packet is equal to the sum of the length of the original packet and the packet header length of the system packet; and a packet header length of the check packet is greater than the packet header length of the system packet.

In yet another possible case in which there is a correspondence between the coded packet type and the length of the coded packet, the length of the check packet is greater than or equal to a sum of a length of the original packet and a packet header length of the check packet, and a length of the system packet is less than the sum of the length of the original packet and the packet header length of the check packet; and the packet header length of the check packet is greater than a packet header length of the system packet.

In the implementation of the first aspect or the second aspect, detailed descriptions are provided above with reference to the foregoing several possible cases. For brevity, details are not described herein.

According to a fifth aspect, a data transmission method is provided. The method may be performed by a transmit end, may be performed by a component (for example, a chip or a chip system) disposed in a transmit end, or may be implemented by a logical module or software that can implement all or some of functions of a transmit end. This is not limited.

For example, the method includes: obtaining K to-be-coded data packets, where lengths of the K to-be-coded data packets are the same, the K to-be-coded data packets include K original packets or K system packets corresponding to the K original packets, and $K>1$ and is an integer; performing shift exclusive OR coding based on the K to-be-coded data packets, to obtain a check packet, where a packet header of the check packet includes an index i of a coding coefficient used to generate the check packet in a plurality of predefined groups of coding coefficients, but does not include indication information of the original packet quantity K, a largest displacement quantity of the coding coefficient is i times $K-1$, and $i \geq 1$ and is an integer; and sending the check packet.

In some situations, if a value of K is not fixed, the indication information of the original packet quantity K needs to be carried in the packet header of the check packet. In this embodiment, a relationship $K=d/i+1$ or $K=w/i+1$ between the largest displacement quantity of the coding coefficient and the coding coefficient index is used, so that when the packet header does not indicate the original packet quantity K, a receive end can still determine the original packet quantity K based on the coding coefficient index. Therefore, indication overheads of indicating the original packet quantity K in the packet header of the check packet can be reduced, and limited spectrum resources can be used for more data transmission to improve utilization of the spectrum resources.

Herein, d may represent a quantity of shift units included in a difference between a data length of the check packet and a length of the original packet, that is, is an example of the first value described above, and w may represent a quantity of shift units included in a difference between the data length of the check packet and a length of the system packet, that is, is an example of the second value described above. For d and w, respectively refer to the foregoing related descriptions of the first value and the second value. For brevity, details are not described herein.

With reference to the fifth aspect, in some possible implementations of the fifth aspect, the check packet is any one of R check packets obtained by performing shift exclusive OR coding based on R groups of coding coefficients and the K to-be-coded data packets, each of the R check packets corresponds to one of the R groups of coding coefficients, and $R \geq 1$ and is an integer; and when $R>1$, lengths of any two of the R check packets are different.

A quantity of check packets obtained by coding the K to-be-coded data packets is not limited. When the method is applied to a plurality of check packets, data lengths of the plurality of check packets are different, so that a group of coding coefficients can be uniquely determined for each check packet, to perform successful decoding.

With reference to the fifth aspect, in some possible implementations of the fifth aspect, the R groups of coding coefficients are from any R columns in a matrix $H_V'$, and the matrix $H_V'$ satisfies:

$$H_V' = \begin{bmatrix} z^0 & z^0 & z^0 & \cdots & z^0 \\ z^0 & z^1 & z^2 & \cdots & z^{Q-1} \\ z^0 & z^2 & z^4 & \cdots & z^{2(Q-1)} \\ \vdots & \vdots & \vdots & \ddots & \vdots \\ z^0 & z^{K-1} & z^{2(K-1)} & \cdots & z^{(K-1)(Q-1)} \end{bmatrix},$$

It should be understood that the matrix $H_V'$ is a submatrix of the matrix $H_V$ shown in some possible implementations of the first aspect and the second aspect, for example, is first K rows in the matrix $H_V$. Herein, $Q \geq R$, and Q is an integer; the coding coefficient used to generate the check packet is from K coding coefficients $[z^0\, z^{q-1}\, z^{2(q-1)} \ldots z^{(K-1)(q-1)}]^T$ in a $q^{th}$ column in the matrix $H_V'$, $1 \leq q \leq Q$, and q is an integer; and a data part $y_q$ of the check packet satisfies $y_q = z^0 x_1 \oplus z^{q-1} x_2 \oplus z^{2(q-1)} x_3 \oplus \ldots \oplus z^{(K-1)(q-1)} x_K$, $\oplus$ represents exclusive OR processing, $x_1, x_2, \ldots$, and $x_K$ represent the K to-be-coded data packets, $z^t$ represents that data multiplied by $z^t$ is shifted by t shift units, $0 \leq t \leq (P-1)(Q-1)$, and is an integer.

It should be understood that for the transmit end, $y_q$ may be a data part of a check packet in the R check packets sent by the transmit end, for example, a data part of an $r^{th}$ check packet.

It should be further understood that the $K \times Q$-dimensional matrix may be a matrix including first K rows of elements extracted from the foregoing $P \times Q$-dimensional matrix. The R groups of coding coefficients whose displacement reference quantity is $K-1$ may be obtained by randomly selecting R columns of elements from the matrix, or the R groups of coding coefficients whose displacement reference quantity is $K-1$ may be obtained by randomly selecting R columns of elements from a matrix obtained after at least one of the following types of transformation is performed on the matrix: row switching transformation, column switching transformation, or row switching transformation performed on one or more columns.

It should be further understood that the $K \times Q$-dimensional matrix may be converted into a $Q \times K$-dimensional matrix. For example, the $Q \times K$-dimensional matrix is a transpose of the $K \times Q$-dimensional matrix. The R groups of coding coefficients may be determined, for example, based on the $Q \times K$-dimensional matrix. For example, the R groups of coding coefficients are any R rows of elements in the $Q \times K$-dimensional matrix, or may be any R rows of elements in a matrix obtained after at least one of the following types of transformation is performed on the $Q \times K$-dimensional matrix: row switching transformation, column switching transformation, or column switching transformation performed on one or more rows.

According to a sixth aspect, a data receiving method is provided. The method may be performed by a receive end, may be performed by a component (for example, a chip or a chip system) disposed in a receive end, or may be implemented by a logical module or software that can implement all or some of functions of a receive end. This is not limited.

For example, the method includes: receiving a plurality of coded packets, where the plurality of coded packets include a check packet, a packet header of the check packet includes an index i of a coding coefficient used to generate the check packet in a plurality of predefined groups of coding coefficients, but does not include indication information of an original packet quantity K, a largest displacement quantity of the coding coefficient is i times K−1, K>1, i≥1, and K and i are integers; and determining the original packet quantity K based on the index i.

In some situations, if a value of K is variable, the indication information of the original packet quantity K may need to be carried in the packet header of the check packet. In this embodiment, a relationship K=d/i+1 or K=w/i+1 between the largest displacement quantity of the coding coefficient and the coding coefficient index is used, so that when the packet header does not indicate the original packet quantity K, the receive end can still determine the original packet quantity K based on the coding coefficient index. Therefore, indication overheads of indicating the original packet quantity K in the packet header of the check packet can be reduced, and limited spectrum resources can be used for more data transmission to improve utilization of the spectrum resources.

Herein, d may represent a quantity of shift units included in a difference between a data length of the check packet and a length of an original packet, that is, is an example of the first value described above, and w may represent a quantity of shift units included in a difference between the data length of the check packet and a length of a system packet, that is, is an example of the second value described above. For d and w, respectively refer to the foregoing related descriptions of the first value and the second value. For brevity, details are not described herein.

Further, the method may include: obtaining K original packets based on the plurality of coded packets and the coding coefficient, where lengths of the K original packets are the same.

In the embodiments, for a method for obtaining the K original packets based on the plurality of coded packets and the coding coefficient, refer to some existing manners. For example, a packet header may be removed based on a received system packet, to obtain a corresponding original packet; or K to-be-coded data packets may be obtained based on a shift exclusive OR coding relationship between check packets and the K original packets based on the coding coefficient and an inverse operation of shift exclusive OR coding. If the to-be-coded data packet is an original packet, the K to-be-coded data packets obtained in this manner are the K original packets. If the to-be-coded data packet is a system packet, the K original packets may be obtained after a packet header is removed from the K to-be-coded data packets obtained in this manner.

With reference to the sixth aspect, in some possible implementations of the sixth aspect, the plurality of coded packets include U check packets, the check packet is any one of the U check packets, the U check packets include data obtained by performing shift exclusive OR coding on K first data packets based on U groups of coding coefficients, each of the U check packets corresponds to one of the U groups of coding coefficients, and U≥1 and is an integer; when U>1, lengths of any two of the U check packets are different; and the K first data packets include the K original packets or K system packets corresponding to the K original packets, and K>1 and is an integer.

The first data packet corresponds to the to-be-coded data packet in the first aspect. For the receive end, the received coded packet is a data packet obtained after shift exclusive OR coding is performed on the to-be-coded data packet. The to-be-coded data packet obtained by a transmit end is coded for the receive end, and therefore the data packet is named the first data packet for distinction.

A quantity of check packets obtained by coding the K first data packets is not limited. When the method is applied to a plurality of check packets, data lengths of the plurality of check packets are different, so that a group of coding coefficients can be uniquely determined for each check packet, to perform successful decoding.

It should be understood that because packet loss may occur, the check packets received by the receive end may be some or all of R check packets sent by the transmit end. Therefore, U≤R.

With reference to the sixth aspect, in some possible implementations of the sixth aspect, the U groups of coding coefficients are from U columns in a matrix $H_v'$, and the matrix $H_v'$ satisfies:

$$
H_v' = \begin{bmatrix}
z^0 & z^0 & z^0 & \cdots & z^0 \\
z^0 & z^1 & z^2 & \cdots & z^{Q-1} \\
z^0 & z^2 & z^4 & \cdots & z^{2(Q-1)} \\
\vdots & \vdots & \vdots & \ddots & \vdots \\
z^0 & z^{K-1} & z^{2(K-1)} & \cdots & z^{(K-1)(Q-1)}
\end{bmatrix},
$$

It should be understood that the matrix $H_v'$ is a submatrix of the matrix $H_v$ shown in some possible implementations of the first aspect and the second aspect, for example, is first K rows in the matrix $H_v$. Herein, Q≥U, and Q is an integer; the coding coefficient used to generate the check packet is from K coding coefficients $[z^0\ z^{q-1}\ z^{2(q-1)}\ \ldots\ z^{(K-1)(q-1)}]^T$ in a $q^{th}$ column in the matrix $H_v'$, 1≤q≤Q, and q is an integer; and a data part $y_q$ of the check packet satisfies $y_q = z^0 x_1 \oplus z^{q-1} x_2 \oplus z^{2(q-1)} x_3 \oplus \ldots \oplus z^{(K-1)(q-1)} x_K$, $\oplus$ represents exclusive OR processing, $x_1, x_2, \ldots,$ and $x_K$ represent the K first data packets, $z^t$ represents that data multiplied by $z^t$ is shifted by t shift units, 0≤t≤(K−1)(Q−1), and is an integer.

It should be understood that for the receive end, $y_q$ may be a data part of a check packet in the U check packets received by the receive end, for example, a data part of a $u^{th}$ check packet.

It should be further understood that the K×Q-dimensional matrix may be a matrix including first K rows of elements extracted from the foregoing P×Q-dimensional matrix. The U groups of coding coefficients whose displacement reference quantity is K−1 may be obtained by randomly selecting U columns of elements from the matrix, or the U groups of coding coefficients whose displacement reference quantity is K−1 may be obtained by randomly selecting U columns of elements from a matrix obtained after at least one of the following types of transformation is performed on the matrix: row switching transformation, column switching transformation, or row switching transformation performed on one or more columns.

It should be further understood that the K×Q-dimensional matrix may be converted into a Q×K-dimensional matrix. For example, the Q×K-dimensional matrix is a transpose of the K×Q-dimensional matrix. The U groups of coding coefficients may be determined, for example, based on the Q×K-dimensional matrix, for example, are any U rows of elements in the Q×K-dimensional matrix, or may be any U rows of elements in a matrix obtained after at least one of the following types of transformation is performed on the Q×K-dimensional matrix: row switching transformation, column switching transformation, or column switching transformation performed on one or more rows.

According to a seventh aspect, the embodiments provide a communication apparatus to implement the data transmission method in any one of the first aspect to the sixth aspect and the possible implementations of the first aspect to the sixth aspect. The apparatus includes a corresponding unit or module configured to perform the method. The unit or module included in the apparatus may be implemented by software and/or hardware. The apparatus may be, for example, a terminal or a network device, may be a chip, a chip system, a processor, or the like that supports a terminal or a network device in implementing the foregoing method, or may be a logical module or software that can implement all or some of functions of a terminal or a network device. It may be understood that a coding or decoding process in the foregoing method may be implemented by using a digital circuit, and a corresponding data circuit may be referred to as a coder or a decoder, or a coder/decoder.

According to an eighth aspect, the embodiments provide a communication apparatus, including a processor. The processor is configured to perform the method in any one of the first aspect to the sixth aspect and the possible implementations of the first aspect to the sixth aspect.

Optionally, the apparatus may further include a memory, configured to store instructions and data. The memory is coupled to the processor. When the processor executes the instructions stored in the memory, the method described in the foregoing aspects may be implemented.

Optionally, the apparatus may further include a communication interface. The communication interface is used by the apparatus to communicate with another device. For example, the communication interface may be a transceiver, a circuit, a bus, a module, or another type of communication interface.

According to a ninth aspect, the embodiments provide a chip system. The chip system includes at least one processor, configured to support implementation of a function in any one of the first aspect to the sixth aspect and the possible implementations of the first aspect to the sixth aspect, for example, receiving or processing of data and/or information in the foregoing method.

In a possible implementation, the chip system further includes a memory. The memory is configured to store program instructions and data. The memory is located inside or outside the processor.

The chip system may include a chip, or may include a chip and another discrete device.

According to a tenth aspect, the embodiments provide a non-transitory computer-readable storage medium, including a computer program. When the computer program is run on a computer, the computer is enabled to implement the method in any one of the first aspect to the sixth aspect and the possible implementations of the first aspect to the sixth aspect.

According to an eleventh aspect, the embodiments provide a computer program product. The computer program product includes a computer program (which may also be referred to as code or instructions). When the computer program is run, a computer is enabled to perform the method in any one of the first aspect to the sixth aspect and the possible implementations of the first aspect to the sixth aspect.

According to a twelfth aspect, an embodiment provides a communication system, including the foregoing transmit end and the foregoing receive end.

BRIEF DESCRIPTION OF DRAWINGS

FIG. 7 is a schematic flowchart of a data transmission method and a data receiving method according to an embodiment;

FIG. 8 is a schematic diagram of a packet header according to an embodiment;

FIG. 9 is a schematic diagram of a packet header according to an embodiment;

DETAILED DESCRIPTION OF EMBODIMENTS

Figure 1:
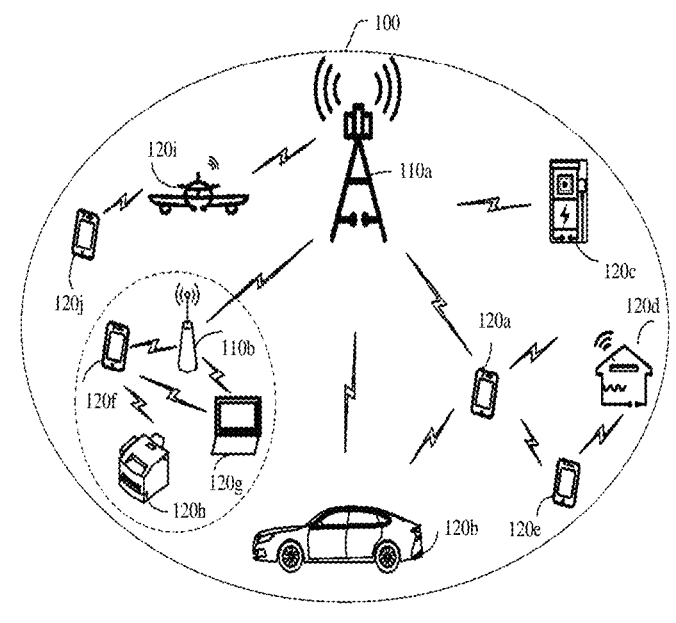
FIG. 1 to FIG. 3 are schematic diagrams of an architecture of a communication system applicable to an embodiment.

The following describes the solutions in embodiments with reference to the accompanying drawings.

To facilitate understanding of embodiments, the following descriptions are first provided.

First, to clearly describe the solutions in embodiments, the terms such as "first" and "second" are used in embodiments to distinguish between same items or similar items that provide basically same functions. For example, a first matrix and a second matrix are merely intended to distinguish between different matrices, and are not intended to limit a sequence of the first matrix and the second matrix. A person skilled in the art may understand that the terms such as "first" and "second" do not limit a quantity or an execution sequence, and the terms such as "first" and "second" do not indicate a definite difference.

Second, in embodiments, "at least one" means one or more, and "a plurality of" means two or more. The term "and/or" describes an association relationship between associated objects, and represents that three relationships may exist. For example, A and/or B may represent the following three cases: only A exists, both A and B exist, and only B exists, where A and B may be singular or plural. The character "/" can indicate an "or" relationship between associated objects, but does not exclude an "and" relationship between the associated objects. A specific meaning represented by the character "/" may be understood with reference to the context. At least one of the following items (pieces) or a similar expression thereof indicates any combination of these items, including a single item (piece) or any combination of a plurality of items (pieces). For example, at least one of a, b, or c may represent a, b, c, a and b, a and c, b and c, or a, b, and c, where a, b, and c each may be singular or plural.

Third, in embodiments, both "when" and "if" mean that an apparatus performs corresponding processing in an objective situation, are not intended to limit time, do not require the apparatus to necessarily have a determining action during implementation, and do not mean another limitation.

Fourth, "simultaneously" in embodiments may be understood as "at a same time point", may be understood as "in a time period", or may be understood as "in a same period", and may be understood with reference to the context.

Fifth, in embodiments, "B corresponding to A" indicates that B is associated with A, and "determining B based on A" does not mean that B is determined based only on A, and B may alternatively be determined based on A and/or other information.

Sixth, the correspondences shown in the tables in the embodiments may be configured, or may be predefined. Values of information in the tables are merely examples, and other values may be configured. This is not limited. When a correspondence between information and each parameter is configured, not all correspondences shown in the tables need to be configured. For example, in the tables, correspondences shown in some rows may alternatively not be configured. For another example, proper deformations and adjustments such as splitting and combination may be performed based on the foregoing tables. Names of parameters shown in titles of the foregoing tables may alternatively be other names that can be understood by a communication apparatus, and values or representation manners of the parameters may alternatively be other values or representation manners that can be understood by the communication apparatus. During implementation of the foregoing tables, another data structure, for example, an array, a queue, a container, a stack, a linear table, a pointer, a linked list, a tree, a graph, a structure, a class, a pile, or a hash table, may alternatively be used.

"Predefine" may be understood as "define", "predefine", "store", "pre-store", "pre-negotiate", "preconfigure", "solidify", or "pre-burn".

Seventh, in embodiments, a group of coding coefficients may be represented in a form of a vector, or may be represented in another form; and a plurality of groups of coding coefficients may be represented in a form of a plurality of vectors, may be represented in a form of a matrix, or may be represented in another form. This is not limited in embodiments.

In embodiments, only for ease of understanding and description, a coding coefficient index is described as a possible form of indication information of the coding coefficient. However, this should not constitute any limitation. When the coding coefficient is represented in another form, the corresponding indication information may alternatively be named another name such as a coding coefficient index. This is not limited. It may be understood that a specific value of the coding coefficient index is not limited to the example provided in embodiments, and may be abstracted as another value provided that the value may represent the corresponding coding coefficient at a transmit end and a receive end.

Eighth, in embodiments, a transmit end and a receive end may store Q ($Q \geq 1$ and is an integer) predefined groups of coding coefficients. The Q groups of coding coefficients may be stored in a form of a matrix, a vector, or the like, may be stored in a form of an array, or may be stored in a form of a generation rule of a matrix or a vector. In addition, when a matrix or a vector is stored, row/column transformation, matrix transformation, other mathematical transformation, or the like may be performed based on the stored matrix or vector, to obtain more possible matrices or vectors. Although not shown, these matrices or vectors obtained based on the transformation shall fall within the scope of the embodiments.

The row/column transformation includes row transformation, column transformation, or row transformation and column transformation.

For ease of description, the Q groups of coding coefficients are represented below in a form of a matrix. A matrix corresponding to the Q groups of coding coefficients may be, for example, a P×Q-dimensional matrix, or may be a Q×P-dimensional matrix. This is not limited in embodiments.

Similarly, a plurality of groups of coding coefficients used to generate a plurality of check packets may also be represented in a form of a matrix. A matrix corresponding to the plurality of groups of coding coefficients may be referred to as a generator matrix. The generator matrix described below may be, for example, a K×R-dimensional matrix or an R×K-dimensional matrix. This is not limited in embodiments.

A relationship between the parameters satisfies: $P \geq K > 1$ and $Q \geq R \geq 1$. Herein, all of P, Q, K, and R are integers.

Ninth, "stored" may mean "stored in one or more memories". The one or more memories may be separately disposed, or may be integrated into a coder, a decoder, a processor, or a communication apparatus. Alternatively, some of the one or more memories may be separately disposed, and some of the one or more memories may be integrated into a decoder, a processor, or a communication apparatus. A type of the memory may be a storage medium in any form. This is not limited.

Tenth, in embodiments, a length of a data packet may refer to a quantity of bits, bytes, symbols, or the like included in the data packet. For example, the length of the data packet is M bits, M bytes, or M symbols. A unit used to express the length is not limited in embodiments.

Network coding in embodiments is shift exclusive OR coding. Therefore, in a shift exclusive OR coding process, shift processing is performed on the data packet, and a shift granularity is a shift unit. Therefore, if the data packet is divided based on the granularity of shift unit, several shift units may be obtained. The length of the data packet (for example, an original packet or a coded packet) in embodiments may alternatively be expressed in a quantity of shift units included in the data packet. For example, the length of the data packet is M shift units, or the data packet includes M shift units, where $M \geq 1$ and is an integer. One shift unit may be a bits, a bytes, a symbols, or the like, where $a \geq 1$ and is an integer. For example, one shift unit may be 1 bit, 1 byte (that is, 8 bits), or one symbol. One symbol may include one or more bits.

Eleventh, a length of a system packet is a sum of a packet header length of the system packet and a data length of the system packet. The data length of the system packet is a length of a data part of the system packet, for example, may be equal to a length of an original packet.

A length of a check packet is a sum of a packet header length of the check packet and a data length of the check packet. The data length of the check packet is a length of a data part of the check packet. The data length of the check packet is not less than the length of the original packet.

Twelfth, a shift operation in embodiments may mean to move data to the right by several shift units. For example, $z^t x$ represents a shift operation performed on a data packet x, $z^t$ is a coding coefficient, and/represents a displacement quantity defined by the coding coefficient. When $t \geq 1$, $z^t x$ satisfies $$z^t x[m] = \begin{cases} 0, & 1 \leq m \leq t \\ x[m-t], & t < m \leq M+t \end{cases}.$$

Herein, $z^t x[m]$ represents an $m^{th}$ shift unit obtained by moving an $(m-t)^{th}$ shift unit in the data packet x to the right by t shift units, M represents a quantity of shift units included in the data packet x, $1 \leq m \leq M+t$, $M \geq 1$, and m and M are integers. For brevity, descriptions of a same or similar case are omitted below.

In the following embodiments, for ease of distinction and understanding, a displacement quantity defined by a coding coefficient in a K×R-dimensional matrix or an R×K-dimensional matrix is identified by t, for example, $t_{k,r}$ and $t_{r,k}$; and a displacement quantity defined by a coding coefficient in a P×Q-dimensional matrix or a Q×P-dimensional matrix is represented by s, for example, $s_{p,q}$ and $s_{q,p}$. In a subscript, a first bit represents a sequence number of a row of the coding coefficient in the matrix, and a second bit represents a sequence number of a column of the coding coefficient in the matrix.

Thirteenth, in embodiments, R check packets and K to-be-coded data packets may satisfy:

$$\begin{bmatrix} y_1 \\ y_2 \\ \vdots \\ y_R \end{bmatrix}^T =$$

$$\begin{bmatrix} x_1 \\ x_2 \\ \vdots \\ x_K \end{bmatrix}^T \begin{bmatrix} z^{t_{1,1}} & z^{t_{1,2}} & \cdots & z^{t_{1,R}} \\ z^{t_{2,1}} & z^{t_{2,2}} & \cdots & z^{t_{2,R}} \\ \vdots & \vdots & \ddots & \vdots \\ z^{t_{K,1}} & z^{t_{K,2}} & \cdots & z^{t_{K,R}} \end{bmatrix} \text{ or } \begin{bmatrix} y_1 \\ y_2 \\ \vdots \\ y_R \end{bmatrix} = \begin{bmatrix} z^{t_{1,1}} & z^{t_{1,2}} & \cdots & z^{t_{1,K}} \\ z^{t_{2,1}} & z^{t_{2,2}} & \cdots & z^{t_{2,K}} \\ \vdots & \vdots & \ddots & \vdots \\ z^{t_{R,1}} & z^{t_{R,2}} & \cdots & z^{t_{R,K}} \end{bmatrix} \begin{bmatrix} x_1 \\ x_2 \\ \vdots \\ x_K \end{bmatrix}$$

Herein, $y_1$, $y_2$, . . . , and $y_R$ represent data parts of the R check packets, $x_1$, $x_2$, . . . , and $x_K$ represent the K to-be-coded data packets, $$\begin{bmatrix} z^{t_{1,1}} & z^{t_{1,2}} & \cdots & z^{t_{1,R}} \\ z^{t_{2,1}} & z^{t_{2,2}} & \cdots & z^{t_{2,R}} \\ \vdots & \vdots & \ddots & \vdots \\ z^{t_{K,1}} & z^{t_{K,2}} & \cdots & z^{t_{K,R}} \end{bmatrix}$$

represents a generator matrix $G_{K \times R}$, and $$\begin{bmatrix} z^{t_{1,1}} & z^{t_{1,2}} & \cdots & z^{t_{1,K}} \\ z^{t_{2,1}} & z^{t_{2,2}} & \cdots & z^{t_{2,K}} \\ \vdots & \vdots & \ddots & \vdots \\ z^{t_{R,1}} & z^{t_{R,2}} & \cdots & z^{t_{R,K}} \end{bmatrix}$$

represents a generator matrix $G_{R \times K}$.

It should be understood that the generator matrices $G_{K \times R}$ and $G_{R \times K}$ are transposes of each other. The generator matrix $G_{K \times R}$ and the generator matrix $G_{K \times R}$ are respectively two different examples of R groups of coding coefficients. Only for ease of understanding and description, the following describes a relationship between the data parts of the R check packets and the K to-be-coded data packets by using a K×R-dimensional generator matrix as an example.

It may be understood that the generator matrix $G_{K \times R}$ may be determined from a P×Q-dimensional matrix, the generator matrix $G_{R \times K}$ may be determined from a Q×R-dimensional matrix, and the P×Q-dimensional matrix and the Q×P-dimensional matrix may be transposes of each other. The P×Q-dimensional matrix and the Q×P-dimensional matrix are respectively two different examples of Q predefined groups of coding coefficients.

Fourteenth, in embodiments, there is a structure of a Vandermonde matrix (Vandermonde matrix). The Vandermonde matrix is a matrix in a form of $$\begin{bmatrix} a_1^0 & a_1^1 & \cdots & a_1^{n-1} \\ a_2^0 & a_2^1 & \cdots & a_2^{n-1} \\ \vdots & \vdots & \ddots & \vdots \\ a_m^0 & a_m^1 & \cdots & a_m^{n-1} \end{bmatrix}$$

or a transpose matrix thereof. Herein, the elements $[a_1 \, a_2 \ldots a_m]$ are selected from a finite field and are pairwise different. The finite field, also referred to as a Galois field (GF), is a field including only a finite quantity of elements, and is a set on which operations of addition, subtraction, multiplication, and division can be performed and results of the operations of addition, subtraction, multiplication, and division do not go beyond the field.

In embodiments, an exponent of each element in the matrix represents a displacement quantity. For descriptions of the displacement quantity, refer to the foregoing descriptions. Details are not described herein.

Fifteenth, in embodiments, there is mathematical transformation at a plurality of locations, for example, mathematical transformation performed on a length difference (for example, a difference between a data length of a check packet and a length of an original packet or a difference between a data length of a check packet and a length of a system packet). The mathematical transformation may include, for example, linear transformation of at least one or more of the following operations: addition of any value, subtraction of any value, multiplication by any value, or division by any value.

To facilitate understanding of the data transmission method and the data receiving method provided in embodiments, the following describes a system architecture and an application scenario of the data transmission method and the data receiving method provided in embodiments. It may be understood that the system architecture and the application scenario described in embodiments are intended to describe the solutions in embodiments more clearly, and do not constitute a limitation on the solutions provided in embodiments.

FIG. 1 is a schematic diagram of an architecture of a communication system 100 used in an embodiment. As shown in FIG. 1, the communication system 100 may include at least one radio access network device (for example, 110a and 110b in FIG. 1), and may further include at least one terminal (for example, 120a to 120j in FIG. 1).

The terminal may be connected to the radio access network device in a wireless manner. A wired or wireless manner may be used for connection between terminals and between radio access network devices. FIG. 1 is merely a schematic diagram. The communication system 100 may further include another network device, for example, may further include a wireless relay device and a wireless backhaul device, which are not shown in FIG. 1.

The radio access network device may be a device with a wireless transceiver function.

The radio access network device may be a device that provides a wireless communication function service, can be located on a network side, and includes but is not limited to a next generation NodeB (gNodeB, gNB) in a 5th generation (5G) communication system, a next generation NodeB in a 6th generation (6G) mobile communication system, a base station in a future mobile communication system, an access node in a Wi-Fi system, an evolved NodeB (eNB) in a long term evolution (LTE) system, a radio network controller (RNC), a NodeB (NB), a base station controller (base station controller, BSC), a home NodeB (for example, a home evolved NodeB or a home NodeB, HNB), a baseband unit (base band unit, BBU), a transmission reception point (TRP), a transmission point (TP), a base transceiver station (BTS), and the like. In a network structure, the access network device may include a central unit (CU) node, a distributed unit (distributed unit, DU) node, a radio access network (RAN) device including a CU node and a DU node, or a RAN device including a CU-control plane node, a CU-user plane node, and a DU node. The access network device may serve a cell. User equipment communicates with a base station by using a transmission resource (for example, a frequency domain resource, or in other words, a frequency spectrum resource) used for the cell. The cell may be a cell corresponding to the base station (for example, a base station). The cell may belong to a macro base station, or a base station corresponding to a small cell (small cell). The small cell herein may include a metro cell (metro cell), a micro cell (micro cell), a pico cell, a femto cell, or the like. These small cells have features of small coverage and low transmit power, and are applicable to providing a high-rate data transmission service. The radio access network device may be a macro base station (for example, 110a in FIG. 1), may be a micro base station or an indoor base station (for example, 110b in FIG. 1), or may be a relay node or a donor node, a device that provides a wireless communication service for user equipment in a V2X communication system, a radio controller in a cloud radio access network (CRAN) scenario, a relay station, a vehicle-mounted device, a wearable device, a network device in a future evolved network, or the like. A specific technology and a specific device form that are used by the radio access network device are not limited in embodiments. For ease of description, the following provides descriptions by using an example in which the radio access network device is a base station.

The terminal may also be referred to as a terminal device, user equipment (UE), a mobile station (MS), a mobile terminal (MT), or the like, and may be an entity, on a user side, configured to receive or transmit a signal, for example, a mobile phone. The terminal device may be user equipment. The UE includes a handheld device, a vehicle-mounted device, a wearable device, or a computing device that has a wireless communication function. For example, the UE may be a mobile phone, a tablet computer, or a computer having a wireless transceiver function. Alternatively, the terminal device may be a virtual reality (VR) terminal device, an augmented reality (AR) terminal device, a wireless terminal in industrial control, a wireless terminal in self-driving, a wireless terminal in telemedicine, a wireless terminal in a smart grid, a wireless terminal in a smart city, a wireless terminal in a smart home, or the like. The terminal may be widely used in various scenarios, for example, a device-to-device (D2D) scenario, a vehicle-to-everything (V2X) communication scenario, a machine-type communication (MTC) scenario, an internet of things (IoT) scenario, a virtual reality scenario, an augmented reality scenario, an industrial control scenario, an autonomous driving scenario, a telemedicine scenario, a smart grid scenario, a smart furniture scenario, a smart office scenario, a smart wearable scenario, a smart transportation scenario, and a smart city scenario. The terminal may be a mobile phone, a tablet computer, a computer with a wireless transceiver function, a wearable device, a vehicle, an unmanned aerial vehicle, a helicopter, an airplane, a ship, a robot, a robot arm, a smart home device, or the like. In embodiments, an apparatus configured to implement a function of the terminal may be a terminal, or may be an apparatus that can support the terminal in implementing the function, for example, a chip system, a communication module, or a modem. The apparatus may be installed in the terminal. In embodiments, the chip system may include a chip, or may include a chip and another discrete device. In the solutions provided in embodiments, the apparatus configured to implement the function of the terminal is a terminal. A specific technology and a specific device form that are used by the terminal device are not limited in embodiments.

Optionally, the terminal may be configured to act as a base station. For example, the terminal may act as a scheduling entity, and the terminal provides a sidelink (SL) signal between UEs in V2X, D2D, P2P, or the like.

The base station and the terminal may be fixed or movable. The base station and the terminal may be deployed on the land, including an indoor device, an outdoor device, a handheld device, or a vehicle-mounted device; may be deployed on the water; or may be deployed on an airplane, a balloon, and an artificial satellite in the air. Application scenarios of the base station and the terminal are not limited in embodiments.

Roles of the base station and the terminal may be relative. For example, the helicopter or unmanned aerial vehicle 120i in FIG. 1 may be configured as a mobile base station. For the terminal 120j that accesses the radio access network 100 through 120i, the terminal 120i is a base station. However, for the base station 110a, 120i is a terminal, that is, 110a and 120i communicate with each other by using a radio air interface protocol. Also, 110a and 120i may alternatively communicate with each other by using an interface protocol between base stations. In this case, for 110a, 120i is also a base station. Therefore, both the base station and the terminal may be collectively referred to as communication apparatuses, and 110a, 110b, and 120a-120j in FIG. 1 may be referred to as communication apparatuses that have respective corresponding functions, for example, communication apparatuses having a base station function or communication apparatuses having a terminal function.

Communication may be performed between the base station and the terminal, between base stations, and between terminals by using a licensed spectrum, an unlicensed spectrum, or both a licensed spectrum and an unlicensed spectrum; or may be performed by using a spectrum below 6 gigahertz (GHz), a spectrum above 6 GHz, or both a spectrum below 6 GHz and a spectrum above 6 GHz. A spectrum resource used for wireless communication is not limited in embodiments.

In embodiments, a function of the base station may be performed by a module (for example, a chip) in the base station, or may be performed by a control subsystem including the function of the base station. The control subsystem including the function of the base station herein may be a control center in the foregoing application scenarios such as the smart grid scenario, the industrial control scenario, the smart transportation scenario, and the smart city scenario of the terminal. The function of the terminal may alternatively be performed by a module (for example, a chip or a modem) in the terminal, or may be performed by an apparatus including the function of the terminal.

Figure 2:
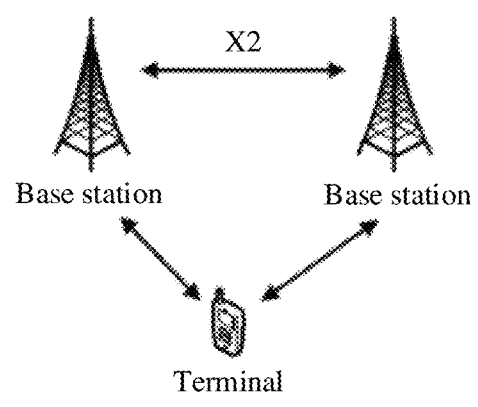

Further, the embodiments may be applied to a plurality of specific communication scenarios, for example, point-to-point transmission between a base station and a terminal or between terminals (for example, point-to-point transmission between a base station and a terminal in (a) in FIG. 2), multi-hop transmission between a base station and a terminal (for example, (b) in FIG. 2 and (c) in FIG. 2), dual connectivity (dual connectivity, DC) (for example, (d) in FIG. 2) or multi-connectivity between a plurality of base stations and a terminal, and another scenario. Base stations in (d) in FIG. 2 may communicate with each other by using an X2 interface. It should be noted that the foregoing specific communication application scenarios are merely examples, and do not constitute a limitation. For example, from a service perspective, embodiments are applicable to many service scenarios, for example, a data coding scenario in an extended reality (XR) service and an uplink high-capacity scenario. In addition, FIG. 2 does not constitute a limitation on a network architecture applicable to the embodiments, and transmission such as an uplink (UL), a downlink (DL), an access link, a backhaul (backhaul) link, and an SL is not limited.

Figures 3, 4:
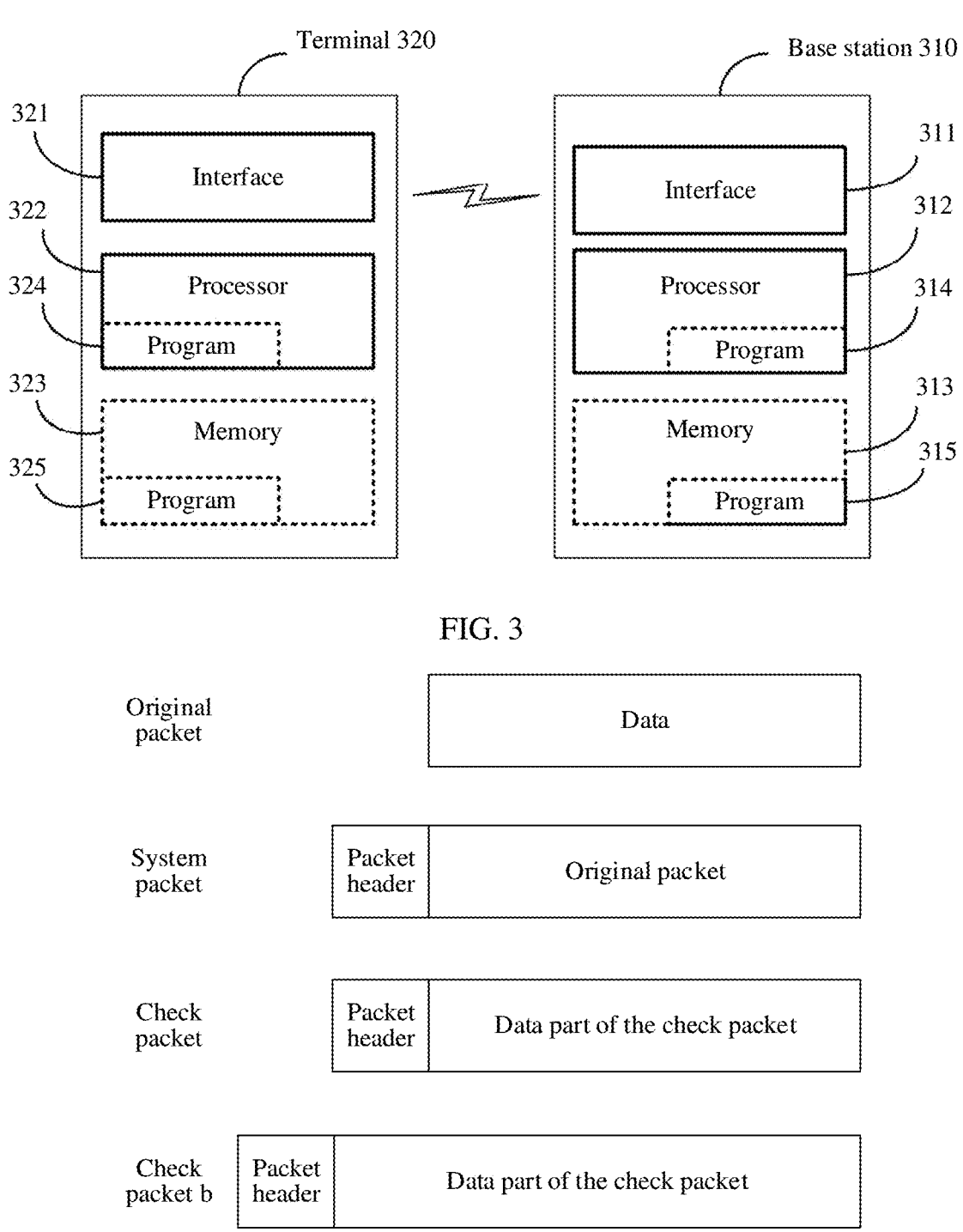
FIG. 4 is a schematic diagram of an original packet, a system packet, and a check packet.

FIG. 3 is a simplified schematic diagram of a communication system according to an embodiment. For simplicity, FIG. 3 shows only a base station 310 and a terminal 320. The base station 310 includes an interface 311 and a processor 312. The processor 312 may optionally store a program 314. The base station 310 may optionally include a memory 313. The memory 313 may optionally store a program 315. The terminal 320 includes an interface 321 and a processor 322. The processor 322 may optionally store a program 324. The terminal 320 may optionally include a memory 323. The memory 323 may optionally store a program 325. These components work together, to provide various functions described in the embodiments. For example, the processor 312 and the interface 311 work together, to provide a wireless connection between the base station 310 and the terminal 320. The processor 322 and the interface 321 work together, to implement downlink transmission and/or uplink transmission of the terminal 320.

The processor (for example, the processor 312 and/or the processor 322) may include one or more processors and implemented as a combination of computing devices. The processor (for example, the processor 312 and/or the processor 322) may separately include one or more of the following: a microprocessor, a microcontroller, a digital signal processor (DSP), a digital signal processing device (DSPD), an application-specific integrated circuit (ASIC), a field programmable gate array (FPGA), a programmable logic device (PLD), gating logic, transistor logic, a discrete hardware circuit, a processing circuit, other proper hardware, or firmware and/or a combination of hardware and software, to perform various functions described in the embodiments. The processor (for example, the processor 312 and/or the processor 322) may be a general-purpose processor or a dedicated processor. For example, the processor 312 and/or the processor 322 may be a baseband processor or a central processing unit. The baseband processor may be configured to process a communication protocol and communication data. The central processing unit may be configured to enable the base station 310 and/or the terminal 320 to perform a software program and process data in the software program.

The interface (for example, the interface 311 and/or the interface 321) may be configured to implement communication with one or more computer devices (for example, a terminal, a base station (BS), and/or a network node). In some embodiments, the interface may include a wire for coupling a wired connection, a pin for coupling a wireless transceiver, or a chip and/or a pin for a wireless connection. In some embodiments, the interface may include a transmitter, a receiver, a transceiver, and/or an antenna. The interface may be configured to use any available protocol (for example, the 3rd generation partnership project (3GPP) standard).

The program in the embodiments is used to represent software in a broad sense. A non-limiting example of the software is program code, a program, a subprogram, instructions, an instruction set, code, a code segment, a software module, an application program, a software application program, or the like. The program may be run in the processor and/or a computer, so that the base station 310 and/or the terminal 320 perform/performs various functions and/or processes described in the embodiments.

The memory (for example, the memory 313 and/or the memory 323) may store data manipulated by the processors 312 and 322 during execution of the software. The memories 313 and 323 may be implemented by using any storage technology. For example, the memory may be any available storage medium that can be accessed by the processor and/or the computer. A non-limiting example of the storage medium includes a random access memory (RAM), a read-only memory (ROM), a programmable read-only memory (PROM), an erasable programmable read-only memory (erasable PROM, EPROM), an electrically erasable programmable read-only memory (electrically EPROM, EEPROM), a compact disk read-only memory (CD-ROM), a removable medium, an optical disk memory, a magnetic disk storage medium, a magnetic storage device, a flash memory, a register, a state memory, a remote mounted memory, a local or remote memory component, or any other medium that can carry or store software, data, or information and that can be accessed by the processor/the computer.

The memory (for example, the memory 313 and/or the memory 323) and the processor (for example, the processor 312 and/or the processor 322) may be separately disposed or integrated together. The memory may be configured to be connected to the processor, so that the processor can read information from the memory, and store and/or write information into the memory. The memory 313 may be integrated into the processor 312. The memory 323 may be integrated into the processor 322. The processor (for example, the processor 312 and/or the processor 322) and the memory (for example, the memory 313 and/or the memory 323) may be disposed in an integrated circuit (for example, the integrated circuit may be disposed in UE, a base station, or another network node).

The system architecture and possible application scenario of embodiments are briefly described in the foregoing content. To better understand the solutions in embodiments, the following briefly describes network coding.

A network coding function in the embodiments includes: performing network coding on an original data packet (briefly referred to as an original data packet, an original packet, or the like) and adding a packet header of a coded packet. In a possible implementation, network coding may be implemented by using a coder. An input of the coder is K original packets, and an output of the coder is N coded data packets (briefly referred to as coded packets). Herein, both N and K are positive integers, and N>K. The coded packets include N−K check packets (also referred to as redundancy packets) and K system packets, or the coded packets include N check packets (that is, all of the coded packets are check packets, and include no system packet). Content of the system packet is the same as that of the original packet. The system packet may not be obtained through coding. For example, a system header may be obtained by directly adding a packet header to the original packet. Therefore, it may be considered that an equivalent coding coefficient of the system packet is a unit vector. A coding coefficient of the check packet may be a non-unit vector. Content of the check packet is associated with the content of the original packet used for generating the check packet, so that a receive end can decode the check packet together with the successfully received original packet or system packet, to restore the unsuccessfully received original data packet. In another possible implementation, a packet header may be first added to the original packet, and then network coding is performed and the packet header of the coded packet is added, to obtain a check packet. In the embodiments, a data packet obtained by adding the packet header to the original packet before network coding is also referred to as a system packet.

Network coding in embodiments is shift exclusive OR coding. The shift exclusive OR coding function includes: performing shift exclusive OR coding on an original packet (or a system packet) and adding a packet header of a coded packet. The performing shift exclusive OR coding on a to-be-coded data packet described in the embodiments may include: performing a shift exclusive OR operation on the to-be-coded data packet based on a coding coefficient, and adding a check packet header, to obtain a check packet. Herein, the to-be-coded data packet may be an original packet, and the coded packet may be a system packet or a check packet; or the to-be-coded data packet may be a system packet, and the coded packet may be a check packet.

The following describes the shift exclusive OR coding process by using an example in which shift exclusive OR coding is performed on K original packets to obtain K system packets and R check packets. Herein, R may be equal to N−K, and R≥1 and is an integer. It should be understood that the K original packets are an example of K to-be-coded data packets, and may be respectively denoted as $x_1$, $x_2$, . . . , and $x_K$.

It is assumed that the K original packets are equal in length. In the shift exclusive OR coding process, shift processing is performed on a data packet, and a shift granularity is a shift unit. Therefore, a length of the original packet may be represented by using a quantity of shift units included in the original packet. In embodiments, each original packet includes M shift units, where M≥1 and is an integer. For example, each original packet includes M bits, M bytes, or M symbols. The bit, the byte, and the symbol are shift units. One shift unit may alternatively be another length, for example, may be a bits, a bytes, or a symbols, where a≥1 and is an integer. One byte may include 8 bits, and one symbol may include one or more bits.

An $m^{th}$ shift unit in the original packet $x_k$ may be denoted as $x_{k,m}$. Herein, $1 \leq k \leq K$, $1 \leq m \leq M$, and k and m are integers.

Table 1 shows a shift unit included in each of the original packets $x_1$ to $x_K$:

TABLE 1

| Shift unit | 1 | 2 | . . . | M − 1 | M |
|---|---|---|---|---|---|
| $x_1$ | $x_{1,1}$ | $x_{1,2}$ | · · · | $x_{1,M-1}$ | $x_{1,M}$ |
| $x_2$ | $x_{2,1}$ | $x_{2,2}$ | · · · | $x_{2,M-2}$ | $x_{2,M}$ |
| . | . | . | · · · | . | . |
| . | . | . | | . | . |
| . | . | . | | . | . |
| $x_K$ | $x_{K,1}$ | $x_{K,2}$ | · · · | $x_{K,M-1}$ | $x_{K,M}$ |

Network coding may be performed on the K original packets by using a matrix in a form of $[I_K \ G_{K \times R}]$.

In the matrix, a submatrix $I_K$ is a K×K-dimensional unit matrix. A shift exclusive OR operation is performed on the original packets $x_1$, $x_2$, . . . , and $x_K$ by using the unit matrix $I_K$, and data parts of the generated system packets are still the K original packets $x_1$, $x_2$, . . . , and $x_K$. Further, a packet header is added to the data part, to obtain the K system packets. That is, each system packet is obtained by using the original packet as a data part and adding a packet header. The K system packets may be in a one-to-one correspondence with the K original packets. As described above, generation of the system packet does not necessarily depend on the submatrix $I_K$, and the system packet may be directly obtained by adding a packet header to the original packet. A manner of generating the system packet is not limited in embodiments.

Shift exclusive OR coding is performed on $x_1$, $x_2$, . . . , and $x_K$ by using a submatrix $G_{K \times R}$ in the matrix, and the R check packets may be generated. Data parts of the R check packets may be represented as $y_1$, $y_2$, . . . , and $y_R$, and $y_1$, $y_2$, . . . , and $y_R$ are code words generated after shift exclusive OR coding is performed on the K original packets $x_1$, $x_2$, . . . , and $x_K$. Check packet headers are respectively added to the data parts of the R check packets, to obtain the R check packets.

The submatrix $G_{K \times R}$ used to generate the R check packets may be referred to as a generator matrix. A data part of an $r^{th}$ ($1 \leq r \leq R$, and r is an integer) check packet in the R check packets may be obtained by performing shift exclusive OR coding on the K original packets based on an $r^{th}$ column in the generator matrix.

For example, the generator matrix $G_{K \times R}$ may satisfy:

$$G_{K \times R} = \begin{bmatrix} z'^{1,1} & z'^{1,2} & \ldots & z'^{1,R} \\ z'^{2,1} & z'^{2,2} & \ldots & z'^{2,R} \\ \vdots & \vdots & \ddots & \vdots \\ z'^{K,1} & z'^{K,2} & \ldots & z'^{K,R} \end{bmatrix}$$

The data parts of the R check packets and the generator matrix $G_{K \times R}$ may satisfy:

$$\begin{bmatrix} y_1 \\ y_2 \\ \vdots \\ y_R \end{bmatrix}^T = \begin{bmatrix} x_1 \\ x_2 \\ \vdots \\ x_K \end{bmatrix}^T \begin{bmatrix} z'^{1,1} & z'^{1,2} & \ldots & z'^{1,R} \\ z'^{2,1} & z'^{2,2} & \ldots & z'^{2,R} \\ \vdots & \vdots & \ddots & \vdots \\ z'^{K,1} & z'^{K,2} & \ldots & z'^{K,R} \end{bmatrix}$$

The generator matrix $G_{K \times R}$ includes R columns, and each column includes K coding coefficients, that is, the generator matrix $G_{K \times R}$ includes R groups of coding coefficients. The $r^{th}$ column of coding coefficients in the R columns may be used to generate the $r^{th}$ check packet in the R check packets. That is, $[z^{t_{1,r}} \, z^{t_{2,r}} \ldots z^{t_{K,r}}]^T$ in the generator matrix $G_{K \times R}$ includes a group of coding coefficients used to generate the $r^{th}$ check packet in the R check packets. The data part of the $r^{th}$ check packet and the $r^{th}$ column of coding coefficients meet $y_r = z^{t_{1,r}} x_1 \oplus z^{t_{2,r}} x_2 \oplus \ldots \oplus z^{t_{K,r}} x_K$. Herein, $\oplus$ represents exclusive OR processing, and $z^{t_{k,r}}$ represents that data multiplied by $z^{t_{k,r}}$ is shifted by $t_{k,r}$ shift units.

It should be understood that $y_r = z^{t_{1,r}} x_1 \oplus z^{t_{2,r}} x_2 \oplus \ldots \oplus z^{t_{K,r}} x_K$. This may also be considered as a relationship between the data part $y_r$ of the $r^{th}$ check packet and the K original packets $[x_1 \, x_2 \ldots x_K]$. The data part may be obtained by performing shift exclusive OR coding based on the K original packets and the K coding coefficients. Therefore, it may be considered that there is a shift exclusive OR coding relationship based on the coding coefficient $[z^{t_{1,r}} \, z^{t_{2,r}} \ldots z^{t_{K,r}}]$ between the data part and the K original packets.

It should be further understood that the $r^{th}$ check packet may be any one of the R check packets, and the data part of each of the R check packets satisfies a shift exclusive OR coding relationship based on the coding coefficient with the K original packets.

It should be further understood that because the K original packets are merely an example of the K to-be-coded data packets, the K to-be-coded data packets may alternatively be the K system packets corresponding to the K original packets. Therefore, that the data part of each of the R check packets satisfies a shift exclusive OR coding relationship based on the coding coefficient with the K original packets may mean that the data part of each of the R check packets satisfies a shift exclusive OR coding relationship based on the coding coefficient with the K to-be-coded data. FIG. 4 shows a relationship between an original packet, a system packet, and a check packet. As shown in FIG. 4, the system packet may include a packet header and a data part, and the data part of the system packet is the original packet. The check packet may include a packet header and a data part. The data part of the check packet may be obtained by performing network coding based on the original packet, as shown in a check packet a in the figure; or may be obtained by performing network coding based on the system packet, as shown in a check packet b in the figure. This is not limited in embodiments. The system packet is obtained by adding a packet header to the original packet. Therefore, a length of the system packet is greater than a length of the original packet. Therefore, as shown in FIG. 4, a length of a data part of the check packet b is greater than a length of a data part of the check packet a, and a length of the check packet b is greater than a length of the check packet a. In addition, a packet header length of the system packet may be the same as or different from a packet header length of the check packet. This is not limited in embodiments. It may be understood that in the embodiments, lengths of original packets are the same, but lengths of valid data of the original packets may be the same or may be different. In an optional manner, some original packets may include elements added to make the lengths of the original packets the same, for example, added 0s.

The foregoing network coding function may be implemented by a transmit end. The network coding function of the transmit end corresponds to a network decoding function of a receive end. The receive end may restore K original data packets by decoding at least K successfully received coded packets together. A protocol layer having a network coding function or a decoding function corresponding to network coding may be referred to as a network coding/decoding layer. In the embodiments, the network coding/decoding layer is briefly referred to as a network coding layer.

Embodiments may be applied to the protocol layer having the network coding function, such as the network coding layer. The network coding layer may be located on a CU side of a gNB, or may be located on a DU side of a gNB. This is not limited in embodiments. Alternatively, the network coding function may be embedded into a specific layer, for example, a radio resource control (RRC) layer, a packet data convergence protocol (PDCP) layer, a backhaul adaptation protocol (BAP) layer, a radio link control (radio link control, RLC) layer, a medium access control (MAC) layer, a physical layer (PHY), or another protocol layer. Alternatively, the network coding layer may be a new protocol layer other than the MAC layer, the RLC layer, the BAP layer, and the PDCP layer. A network coding layer may be added above the PDCP layer, a network coding layer may be added above the BAP layer, a network coding layer may be added between the PDCP layer and the RLC layer (located in a CU-UP logical entity or located in a DU logical entity), a network coding layer may be added between the RLC layer and the MAC layer, or a network coding layer may be added between the MAC layer and the PHY layer.

That is, any communication device that can have a network coding layer may use the data transmission method and the data receiving method described below, for example, a base station or a terminal. The base station may be an example of the transmit end, and the terminal may be an example of the receive end; or the terminal may be an example of the transmit end, and the base station may be an example of the receive end. It should be understood that both the "transmit end" and the "receive end" are defined relative to sending and receiving of a coded packet. Devices configured to perform the data transmission method and the data receiving method are not limited.

Figures 5, 6:
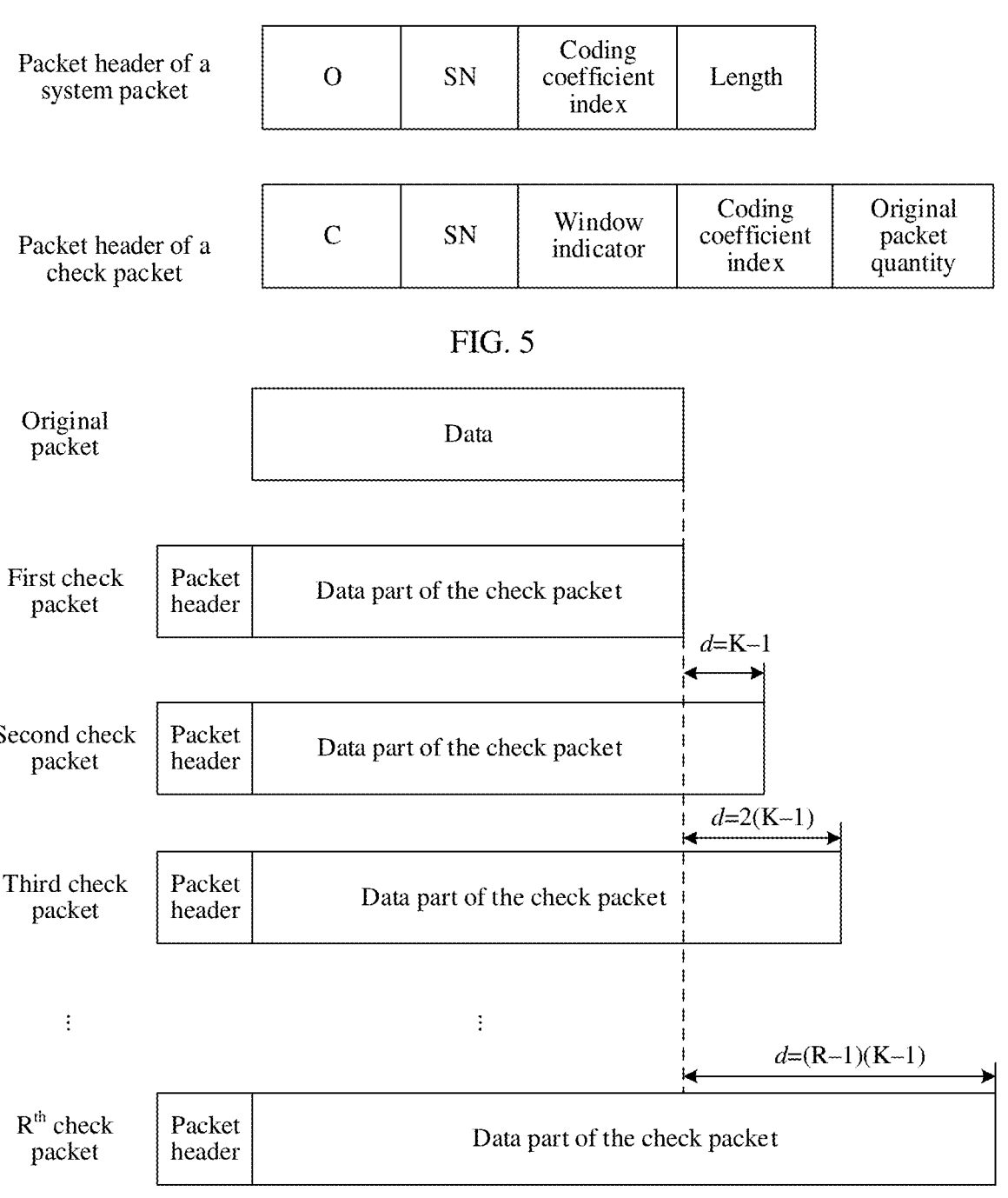
FIG. 5 is a schematic diagram of a packet header of a system packet and a packet header of a check packet.
FIG. 6 is a schematic diagram of a difference between a data length of a check packet and a length of a to-be-coded data packet.

As described above, after performing network coding on an original packet, the transmit end uses a packet header to carry a plurality of fields, so that the receive end correctly decodes the coded packet. FIG. 5 is a schematic diagram of a packet header of a system packet and a packet header of a check packet. FIG. 5 shows a possible implementation of the packet header of the system packet and a possible implementation of the packet header of the check packet in the conventional technology. The packet header of the system packet includes a system packet (original, O) field, a serial number (SN) field, a coding coefficient index field, a length field, and the like. The packet header of the check packet includes a check packet (coded, C) field, an SN field, a coding coefficient index field, an original packet quantity field, and the like. If a packet header of each coded packet carries the plurality of fields described above, high indication overheads are caused, and utilization of spectrum resources is low.

It should be understood that FIG. 5 merely shows an example of the packet header of the system packet and the packet header of the check packet. In actual transmission, the packet header of the system packet and the packet header of the check packet may further include more fields, or some fields are equivalently replaced. This is not limited.

It is found that when shift exclusive OR coding is performed on a plurality of original packets (or system packets) with a same length, a difference between a data length of an obtained check packet and the length of the original packet (or the system packet) is related to a coding coefficient used during coding.

For ease of description and understanding, the original packet and the system packet are collectively referred to as a to-be-coded data packet in the embodiments. In other words, a difference between the data length of the check packet and a length of the to-be-coded data packet is related to the coding coefficient. It may be understood that if the check packet is obtained by performing shift exclusive OR coding on the original packet based on the coding coefficient, the to-be-coded data packet is an original packet; or if the check packet is obtained by performing shift exclusive OR coding on the system packet based on the coding coefficient, the to-be-coded data packet is a system packet. It may be understood, based on the foregoing manner of generating the system packet, that the system packet is a data packet corresponding to the original packet.

It should be understood that for the transmit end, the to-be-coded data packet is a data packet to be coded. For the receive end, the received coded packet is a data packet obtained after the transmit end performs shift exclusive OR coding on the to-be-coded data packet. Therefore, the to-be-coded data packet obtained by the transmit end is coded for the receive end, and therefore the data packet may be named a first data packet for distinction. It may be understood that the to-be-coded data packet and the first data packet are merely different names provided relative to the transmit end and the receive end, and the to-be-coded data packet and the first data packet are substantially the same. The "to-be-coded data packet or first data packet" described may be a to-be-coded data packet relative to the transmit end or a first data packet relative to the receive end.

If a quantity of to-be-coded data packets is K (K>1 and is an integer), and a quantity of check packets is R (R≥1 and is an integer), the R check packets may be obtained by performing shift exclusive OR coding on the K to-be-coded data packets based on R groups of coding coefficients. The R check packets are in a one-to-one correspondence with the R groups of coding coefficients, and each check packet is obtained by performing shift exclusive OR coding on the K original packets based on a corresponding group of coding coefficients. Therefore, a difference between a data length of each check packet and a length of the to-be-coded data packet is separately related to a largest displacement quantity defined by a group of coding coefficients corresponding to the check packet.

It is assumed that the R check packets and the R groups of coding coefficients satisfy:

$$\begin{bmatrix} y_1 \\ y_2 \\ \vdots \\ y_R \end{bmatrix}^T = \begin{bmatrix} x_1 \\ x_2 \\ \vdots \\ x_K \end{bmatrix}^T \begin{bmatrix} z^{t_{1,1}} & z^{t_{1,2}} & \cdots & z^{t_{1,R}} \\ z^{t_{2,1}} & z^{t_{2,2}} & \cdots & z^{t_{2,R}} \\ \vdots & \vdots & \ddots & \vdots \\ z^{t_{K,1}} & z^{t_{K,2}} & \cdots & z^{t_{K,R}} \end{bmatrix}$$

Herein, $y_1$ to $y_R$ represent data parts of the R check packets, $x_1$ to $x_K$ represent the K to-be-coded data packets or K first data packets, and $$\begin{bmatrix} z^{t_{1,1}} & z^{t_{1,2}} & \cdots & z^{t_{1,R}} \\ z^{t_{2,1}} & z^{t_{2,2}} & \cdots & z^{t_{2,R}} \\ \vdots & \vdots & \ddots & \vdots \\ z^{t_{K,1}} & z^{t_{K,2}} & \cdots & z^{t_{K,R}} \end{bmatrix}$$

is a generator matrix $G_{K\times R}$ of the R check packets. An $r^{th}$ column of elements $[z^{t_{1,r}} z^{t_{2,r}} \ldots z^{t_{K,r}}]^T$ in the generator matrix $G_{K\times R}$ includes K coding coefficients $z^{t_{1,r}}, z^{t_{2,r}}, \ldots,$ and $z^{t_{K,r}}$ used to generate an $r^{th}$ check packet. A data part of the $r^{th}$ check packet satisfies $y_r = z^{t_{1,r}} x_1 \oplus z^{t_{2,r}} x_2 \oplus \ldots \oplus z^{t_{K,r}} x_K$, where $\oplus$ represents exclusive OR processing, $z^{t_{k,r}} x_k$ represents a shift operation performed on a to-be-coded data packet $x_k$, $t_{k,r}$ represents a displacement quantity defined by a coding coefficient in a $k^{th}$ row and an $r^{th}$ column in the generator matrix, $1 \leq r \leq R$, $1 \leq k \leq K$, and r and k are integers.

A person skilled in the art may understand that a difference between a data length of the $r^{th}$ check packet and the length of the to-be-coded data packet is a largest displacement quantity defined by the K coding coefficients $z^{t_{1,r}}, z^{t_{2,r}}, \ldots,$ and $z^{t_{K,r}}$ used to generate the $r^{th}$ check packet.

If largest displacement quantities defined by all of the R groups of coding coefficients are different from each other, differences between the length of the to-be-coded data packet and data lengths of the R check packets are different from each other. The difference between the data length of each check packet and the length of the to-be-coded data packet is related to the largest displacement quantity defined by the group of coding coefficients used to generate the check packet, and there is a correspondence between each group of coding coefficients and a largest displacement quantity defined by each group of coding coefficients. Therefore, there is a correspondence between each group of coding coefficients and the difference between the data length of the check packet and the length of the to-be-coded data packet. In this way, a one-to-one correspondence between the R groups of coding coefficients and the differences between the length of the to-be-coded data packet and the data lengths of the R check packets may be obtained. In addition, the to-be-coded data packet may be an original packet or a system packet.

A length of the original packet may be predetermined, and a length of the system packet is a sum of a packet header length of the system packet and the length of the original packet. The packet header length of the system packet may be predetermined. Therefore, the length of the system packet may be predetermined.

In this way, the receive end of the coded packet may determine the coding coefficient based on the correspondence between the length difference and the coding coefficient and a difference between a length of the data part of the received check packet and the length of the to-be-coded data packet. Therefore, when generating the check packet, the transmit end of the coded packet may not need to use a packet header of the check packet to carry indication information of the coding coefficient. Therefore, indication overheads caused by the indication information of the coding coefficient can be reduced.

It can further be found that when shift exclusive OR coding is performed on the K to-be-coded data packets by using a generator matrix $G_V$ in a form of a Vandermonde matrix, a difference between a data length of each obtained check packet and a length of the to-be-coded data packet is an integer multiple of K−1.

Herein, the generator matrix $G_V$ satisfies:

$$G_v = \begin{bmatrix} z^0 & z^0 & z^0 & \cdots & z^0 \\ z^0 & z^1 & z^2 & \cdots & z^{R-1} \\ z^0 & z^2 & z^4 & \cdots & z^{2(R-1)} \\ \vdots & \vdots & \vdots & \ddots & \vdots \\ z^0 & z^{K-1} & z^{2(K-1)} & \cdots & z^{(R-1)(K-1)} \end{bmatrix}$$

Herein, a superscript of each element represents a displacement quantity. For example, all of displacement quantities defined by elements in a first column are 0; displacement quantities defined by elements in a second column are sequentially 0, 1, 2, . . . , and K−1 from top to bottom; displacement quantities defined by elements in a third column are sequentially 0, 2, 4, . . . , and 2(K−1) from top to bottom; and displacement quantities defined by elements in an $R^{th}$ column are sequentially 0, R−1, 2(R−1), . . . , and (R−1)(K−1) from top to bottom. In R groups of coding coefficients including the R columns of elements, largest displacement quantities are respectively 0, K−1, 2(K−1), . . . , and (R−1)(K−1), and are all integer multiples of K−1.

If shift exclusive OR coding is performed based on the generator matrix $G_V$, R obtained check packets and the R groups of coding coefficients in the generator matrix $G_V$ satisfy:

$$\begin{bmatrix} y_1 \\ y_2 \\ \vdots \\ y_R \end{bmatrix}^T = \begin{bmatrix} x_1 \\ x_2 \\ \vdots \\ x_K \end{bmatrix}^T \begin{bmatrix} z^0 & z^0 & z^0 & \ldots & z^0 \\ z^0 & z^1 & z^2 & \ldots & z^{R-1} \\ z^0 & z^2 & z^4 & \ldots & z^{2(R-1)} \\ \vdots & \vdots & \vdots & \ddots & \vdots \\ z^0 & z^{K-1} & z^{2(K-1)} & \ldots & z^{(R-1)(K-1)} \end{bmatrix}$$

For ease of understanding, Table 2 to Table 4 show data parts of three check packets obtained by performing shift exclusive OR coding on the original packets based on the generator matrix $G_V$ when K=3 and R=3.

TABLE 2

| Shift unit | 1 | 2 | . . . | M − 1 | M |
|---|---|---|---|---|---|
| $x_1$ | $x_{1,1}$ | $x_{1,2}$ | $\cdots$ | $x_{1,M-1}$ | $x_{1,M}$ |
| $x_2$ | $x_{2,1}$ | $x_{2,2}$ | $\cdots$ | $x_{2,M-2}$ | $x_{2,M}$ |
| $x_3$ | $x_{3,1}$ | $x_{3,2}$ | $\cdots$ | $x_{3,M-1}$ | $x_{3,M}$ |
| $y_1$ | $y_{1,1}$ | $y_{1,2}$ | | $y_{1,M-1}$ | $y_{1,M}$ |

TABLE 3

| Shift unit | 1 | 2 | 3 | . . . | M | M + 1 | M + 2 |
|---|---|---|---|---|---|---|---|
| $x_1$ | $x_{1,1}$ | $x_{1,2}$ | $x_{1,3}$ | $\cdots$ | $x_{1,M}$ | 0 | 0 |
| $x_2$ | 0 | $x_{2,1}$ | $x_{2,2}$ | $\cdots$ | $x_{2,M-1}$ | $x_{2,M}$ | 0 |
| $x_3$ | 0 | 0 | $x_{3,1}$ | $\cdots$ | $x_{3,M-2}$ | $x_{3,M-1}$ | $x_{3,M}$ |
| $y_2$ | $y_{2,1}$ | $y_{2,2}$ | $y_{2,3}$ | | $y_{2,M}$ | $y_{2,M+1}$ | $y_{2,M+2}$ |

TABLE 4

| Shift unit | 1 | 2 | 3 | 4 | 5 | . . . M | M + 1 | M + 2 | M + 3 | M + 4 |
|---|---|---|---|---|---|---|---|---|---|---|
| $x_1$ | $x_{1,1}$ | $x_{1,2}$ | $x_{1,3}$ | $x_{1,4}$ | $x_{1,5}$ | $\cdots x_{1,M}$ | 0 | 0 | 0 | 0 |
| $x_2$ | 0 | 0 | $x_{2,1}$ | $x_{2,2}$ | $x_{2,3}$ | $\cdots x_{2,M-2}$ | $x_{2,M-1}$ | $x_{2,M}$ | 0 | 0 |
| $x_3$ | 0 | 0 | 0 | 0 | $x_{3,1}$ | $\cdots x_{3,M-4}$ | $x_{3,M-3}$ | $x_{3,M-2}$ | $x_{3,M-1}$ | $x_{3,M}$ |
| $y_3$ | $y_{3,1}$ | $y_{3,2}$ | $y_{3,3}$ | $y_{3,4}$ | $y_{3,5}$ | $\cdots y_{3,M}$ | $y_{3,M+1}$ | $y_{3,M+2}$ | $y_{3,M+3}$ | $y_{3,M+4}$ |

It may be understood that coding coefficients corresponding to a data part $y_1$ of a first check packet in the R check packets are the first column in the generator matrix $G_V$, all displacement quantities are 0, and a data length of $y_1$ is equal to a length of a to-be-coded data packet $x_1$, that is, a difference between the data length of $y_1$ and the length of the to-be-coded data packet is 0.

Coding coefficients corresponding to a data part $y_2$ of a second check packet are the second column in the generator matrix $G_V$, a largest value of a displacement quantity is K−1 shift units, and a difference between a data length of $y_2$ and the length of the to-be-coded data packet is K−1 shift units.

Coding coefficients corresponding to a data part $y_3$ of a third check packet are the third column in the generator matrix $G_V$, a largest value of a displacement quantity is 2(K−1) shift units, and a difference between a data length of $y_3$ and the length of the to-be-coded data packet is 2(K−1) shift units.

By analogy, coding coefficients corresponding to a data part $y_r$ of an $r^{th}$ check packet in the R check packets are an $r^{th}$ column in the generator matrix $G_V$, a largest value of a displacement quantity is (r−1)(K−1) shift units, and a difference between a data length of $y_r$ and the length of the to-be-coded data packet is (r−1)(K−1) shift units.

FIG. 6 shows the difference between the data length of each check packet obtained based on the foregoing generator matrix and the length of the to-be-coded data packet. The to-be-coded data packet shown in FIG. 6 may be an original packet. The original packet and the first check packet to an $R^{th}$ check packet are respectively shown from top to bottom. Differences between a length of the original packet and the data lengths of the first check packet to the $R^{th}$ check packet are sequentially 0, K−1, 2(K−1), . . . , and (R−1)(K−1) shift units.

It should be understood that although FIG. 6 shows only the differences between the length of the original packet and the data lengths of the R check packets, this should not constitute any limitation on embodiments. The original packet in FIG. 6 may be replaced with a system packet, and data of the original packet may be replaced with a packet header and a data part of the system packet. Although not shown in the figure, it may be understood that differences between a length of the system packet and the data lengths of the R check packets also have the foregoing rule.

That is, except that the difference between the length of the first check packet and the length of the to-be-coded data packet is 0, the difference between the data length of each of the other R−1 check packets and the length of the to-be-coded data packet is an integer multiple of K−1. If 0 that is the difference between the length of the first check packet and the length of the to-be-coded data packet is removed, K−1 is a smallest value of the differences between the length of the to-be-coded data packet and the data lengths of the other R−1 check packets, and may be referred to as a displacement reference quantity. It is found, through observation, that if the R groups of coding coefficients respectively correspond to indexes 0 to R−1, the indexes 0 to R−1 are respectively ratios of the largest displacement quantities defined by the R groups of coding coefficients to the displacement reference quantity K−1.

Based on the displacement reference quantity K−1, simple transformation may be performed on the difference between the data length of the check packet and the length of the to-be-coded data packet. It is assumed that the difference between the data length of the check packet and the length of the original packet (that is, an example of the to-be-coded data packet) is ΔL, where a unit of ΔL may be a bit, a byte, a symbol, or the like, a quantity of shift units included in the difference is d, and d=ΔL/a, where a represents a quantity of bits, bytes, or symbols in one shift unit. It should be understood that units of $\Delta L$ and a in $d=\Delta L/a$ may be the same. In consideration of the correspondence between the coding coefficient and the difference between the data length of the check packet and the length of the original packet, it may be obtained that the index i and the quantity d meet $i=d/(K-1)$. Also, the unit of $\Delta L$ may alternatively be a shift unit. In this case, dis the same as $\Delta L$, and the index i and $\Delta Z$ meet $i=\Delta L/(K-1)$.

Based on the correspondence between the length difference and the coding coefficient and the relationship between the length difference and the displacement reference quantity K−1, the receive end of the coded packet may determine the original packet quantity K based on the index i of the coding coefficient of the received check packet and the difference between the length of the data part and the length of the to-be-coded data packet. In this way, when generating the check packet, the transmit end of the coded packet may not need to use a packet header of the check packet to carry indication information of the original packet quantity K. Therefore, indication overheads caused by the indication information of the original packet quantity K can be reduced.

It should be understood that K−1 is merely an example of the displacement reference quantity. That is, in some cases, the displacement reference quantity may be K−1, but the displacement reference quantity is not limited to K−1. The displacement reference quantity is described below with reference to a specific matrix. Therefore, detailed descriptions of the displacement reference quantity are omitted herein.

Based on the foregoing principle, the embodiments provide a data transmission method and a data receiving method. A packet header of a check packet is designed by using a correspondence between a length difference and a coding coefficient, and indication information of an original packet quantity and indication information of the coding coefficient are not simultaneously carried in the packet header of the check packet. Therefore, indication overheads can be reduced, to help improve utilization of spectrum resources.

It can further be found that in most cases, a data length of the check packet is greater than a length of a to-be-coded data packet. As shown in FIG. 6, all of the differences between the length of the original packet and the data lengths of the second check packet to the $R^{th}$ check packet are greater than 0, that is, the data lengths of the second check packet to the $R^{th}$ check packet are greater than the length of the original packet, or the data lengths of the second check packet to the $R^{th}$ check packet are greater than the length of the original packet. The data length of the first check packet is equal to the length of the original packet. This is because all of displacement quantities defined by corresponding coding coefficients are 0.

A person skilled in the art may understand that a length of the check packet is a sum of the data length of the check packet and a packet header length of the check packet. In a shift exclusive OR coding process of the check packet, all of displacement quantities defined by coding coefficients are greater than 0. Therefore, the data length of the check packet is greater than the length of the to-be-coded data packet in most cases. A length of a system packet is a sum of a data length of the system packet and a packet header length of the system packet. The data length of the system packet and the packet header length of the system packet do not change in the shift exclusive OR coding process. If a length critical value can be defined to distinguish between the check packet and the system packet, a transmit end may omit an O/C field indicating a coded packet type from a packet header of a coded packet, and does not need to simultaneously use a packet header of the system packet and the packet header of the check packet to carry the indication information of the coding efficient. Therefore, indication overheads can be reduced, to help improve utilization of spectrum resources.

The data transmission method and the data receiving method provided in embodiments are described in detail below with reference to the accompanying drawings. The data transmission method may be performed at a transmit end of a coded packet, and the data receiving method may be performed at a receive end of the coded packet. The transmit end may be, for example, a communication device (for example, a base station), or may be a component disposed in a communication device, for example, a chip, a chip system, or another functional module that can invoke a program and execute the program. The receive end may be, for example, a communication device (for example, a terminal), or may be a component disposed in a communication device, for example, a chip, a chip system, or another functional module that can invoke a program and execute the program.

It should be further noted that in the following embodiments, the coded packet, a system packet, and a check packet alternately appear. For the transmit end, coded packets may include a system packet and a check packet. For the receive end, because packet loss may occur in a transmission process, all of coded packets received by the receive end may be system packets or check packets, or coded packets received by the receive end may be a system packet and a check packet. Therefore, the coded packets may include a system packet and/or a check packet.

FIG. 7 is a schematic flowchart of a data transmission method and a data receiving method according to an embodiment. The method 700 shown in FIG. 7 may include steps 710 to 740. The following describes in detail the steps in the method 700.

In step 710, a transmit end obtains K to-be-coded data packets.

In this embodiment, lengths of the K to-be-coded data packets are the same, the K to-be-coded data packets are equal in length, or quantities of shift units included in the K to-be-coded data packets are the same. Herein, K is an integer greater than 1.

The K to-be-coded data packets include K original packets or K system packets corresponding to the K original packets. The K original packets may include, for example, a service data unit (SDU), an SDU segment, a protocol data unit (PDU), or a PDU segment. If lengths of the K original packets are the same, the K original packets may be obtained by performing one or more types of processing such as segmentation, concatenation, and padding on one or more SDUs, SDU segments, PDUs, or PDU segments. This is not limited in embodiments.

In addition, a quantity of the K original packets may be predefined in a protocol, may be negotiated by the transmit end and a receive end in advance, or may be independently determined by the transmit end and notified to a receive end by using a packet header to carry indication information of the original packet quantity K. This is not limited in embodiments.

In a possible case, a value of K may be fixed. For example, the value of K is predefined in a protocol, is semi-statically configured by the transmit end by using signaling, or is negotiated by the transmit end and the receive end in advance.

In another possible case, a value of K may be flexibly adjusted, or a value of K is not fixed. For example, the transmit end may independently determine the original packet quantity K, and each time a coded packet is sent, use a packet header to carry the value of the original packet quantity K.

It may be understood that because the system packet corresponds to the original packet, even if the transmit end performs shift exclusive OR coding based on the system packet, if the original packet quantity is K, a quantity of system packets is also K, that is, a quantity of to-be-coded data packets is K.

In step 720, the transmit end performs shift exclusive OR coding based on R groups of coding coefficients and the K to-be-coded data packets, to obtain K system packets and R check packets.

That the transmit end performs shift exclusive OR coding based on the K to-be-coded data packets may be: performing shift exclusive OR coding by inputting all of the K to-be-coded data packets to a coding window or by using the K to-be-coded data packets as a coding group. The K system packets and the R check packets may be obtained based on shift exclusive OR coding performed on the K original packets. For a process in which the transmit end performs shift exclusive OR coding based on the R groups of coding coefficients and the K to-be-coded data packets, refer to the foregoing related descriptions. For brevity, details are not described herein.

In this embodiment, to reduce indication overheads, the following several possible implementations are provided for the packet header of the coded packet:

1. A packet header of the check packet does not include indication information of the coding coefficient.

2. A packet header of the check packet includes indication information of the coding coefficient, but does not include the indication information of the original packet quantity K.

3. The packet header of the coded packet does not include indication information of a coded packet type, and at least one of a packet header of the check packet and a packet header of the system packet does not include indication information of the coding coefficient.

The following describes the three possible implementations in detail.

1. The packet header of the check packet may not include the indication information of the coding coefficient, and there is a correspondence between a length of the check packet or a length of a data part of the check packet and the coding coefficient.

It should be noted that in this implementation, whether the original packet quantity K is variable is not considered. If K is variable, the packet header of the check packet may carry the indication information of the original packet quantity K; or if K is fixed, the packet header of the check packet may not carry the indication information of the original packet quantity K. In other words, the packet header of the check packet may carry or not carry the indication information of the original packet quantity K.

As described above, there is a correspondence between the coding coefficient and a difference between a data length of the check packet and the length of the to-be-coded data packet. Therefore, overheads caused by the indication information of the coding coefficient of the check packet can be reduced by using the correspondence.

To help the receive end accurately determine the coding coefficient of the check packet based on the difference between the data length of the received check packet and the length of the to-be-coded data packet, a difference between a data length of each check packet and the length of the to-be-coded data packet should be in a one-to-one correspondence with the coding coefficient. That is, largest displacement quantities respectively defined by the R groups of coding coefficients used to generate the R check packets should be different from each other.

For example, the foregoing generator matrix $G_{K \times R}$ may be designed, so that coding coefficients in the generator matrix $G_{K \times R}$ meet $0 \leq t_{k_1,r_2} - t_{k_1,r_1} < t_{k_2,r_2} - t_{k_2,r_1}$, where $k_1$ and $k_2$ represent sequence numbers of two rows in the generator matrix, $r_1$ and $r_2$ represent sequence numbers of two columns in the generator matrix, and the following conditions are met: $K \geq k_2 > k_1 \geq 1$, $R \geq r_2 > r_1 \geq 1$, and all of $k_1$, $k_2$, $r_1$, and $r_2$ are integers.

That is, a data length of an $r_1{}^{th}$ check packet is less than a data length of an $r_2{}^{th}$ check packet in the R check packets. Therefore, when the coding coefficients in the generator matrix $G_{K \times R}$ meet $0 \leq t_{k_1,r_2} - t_{k_1,r_1} < t_{k_2,r_2} - t_{k_2,r_1}$, data lengths of the obtained R check packets are different from each other, and a group of coding coefficients can be uniquely determined based on differences between the length of the to-be-coded data packet and the data lengths of the R check packets.

It is found, through observation, that provided that largest displacement quantities respectively defined by R columns of coding coefficients in the generator matrix $G_{K \times R}$ are different, even if row switching transformation and/or column switching transformation are/is performed on the R columns, the feature that the largest displacement quantities respectively defined by the R columns of coding coefficients are different is not affected; and even if row switching transformation is performed on one or more of the R columns, the feature that the largest displacement quantities respectively defined by the R columns of coding coefficients are different is not affected. Therefore, the coding coefficients in the generator matrix $G_{K \times R}$ are not limited to meeting $0 \leq t_{k_1,r_2} - t_{k_1,r_1} < t_{k_2,r_2} - t_{k_2,r_1}$. Provided that a matrix that satisfies $0 \leq t_{k_1,r_2} - t_{k_1,r_1} < t_{k_2,r_2} - t_{k_2,r_1}$ may be obtained after at least one of the following types of transformation is performed on the generator matrix $G_{K \times R}$, R groups of coding coefficients with different largest displacement quantities may be obtained: row switching transformation, column switching transformation, or row switching transformation performed on one or more columns.

The generator matrix $G_{K \times R}$ may be from Q predefined groups of coding coefficients. A possible form of the Q groups of coding coefficients is a P×Q-dimensional matrix $H_1$:

$$H_1 = \begin{bmatrix} z^{s_{1,1}} & z^{s_{1,2}} & \dots & z^{s_{1,Q}} \\ z^{s_{2,1}} & z^{s_{2,2}} & \dots & z^{s_{2,Q}} \\ \vdots & \vdots & \ddots & \vdots \\ z^{s_{P,1}} & z^{s_{P,2}} & \dots & z^{s_{P,Q}} \end{bmatrix}$$

Herein, $P \geq K$, $Q \geq R$, and P and Q are integers. If the coding coefficients in the generator matrix $G_{K \times R}$ need to meet $0 \leq t_{k_1,r_2} - t_{k_1,r_1} < t_{k_2,r_2} - t_{k_2,r_1}$, elements in the matrix $H_1$ should meet $0 \leq s_{p_1,q_2} - s_{p_1,q_1} < s_{p_2,q_2} - s_{p_2,q_1}$, where $p_1$ and $p_2$ represent sequence numbers of two rows in the matrix $H_1$, $q_1$ and $q_2$ represent sequence numbers of two columns in the matrix $H_1$, and the following conditions are met: $P \geq p_2 > p_1 \geq 1$, and $Q \geq q_2 > q_1 \geq 1$. The matrix $G_{K \times R}$ is similar to the generator matrix $G_{K \times R}$. Provided that largest displacement quantities respectively defined by Q columns of elements in the matrix $H_1$ are different, even if row switching transformation and/or column switching transformation are/is performed on the Q columns, the feature that the largest displacement quantities respectively defined by the Q columns of elements are different is not affected; and even if row switching transformation is performed on one or more of the Q columns, the feature that the largest displacement quantities respectively defined by the Q columns of elements are different is not affected. Therefore, the generator matrix $G_{K \times R}$ may be a K×R-dimensional submatrix extracted from the P×Q-dimensional matrix $H_1$, a matrix including K rows and R columns extracted from the P×Q-dimensional matrix $H_1$, or a matrix obtained by performing at least one of the following types of transformation after K rows and R columns are extracted from the P×Q-dimensional matrix $H_1$: row switching transformation, column switching transformation, row switching transformation performed on one or more columns, or the like. This is not limited in embodiments.

It should be understood that the generator matrix $G_{K \times R}$ listed above is merely a possible example of a generator matrix, and the generator matrix may alternatively be a transpose $G_{R \times K}$ of $G_{K \times R}$. The generator matrix $G_{R \times K}$ may satisfy:

$$G_{R \times K} = \begin{bmatrix} z^{\prime 1,1} & z^{\prime 1,2} & \dots & z^{\prime 1,K} \\ z^{\prime 2,1} & z^{\prime 2,2} & \dots & z^{\prime 2,K} \\ \vdots & \vdots & \ddots & \vdots \\ z^{\prime R,1} & z^{\prime R,2} & \dots & z^{\prime R,K} \end{bmatrix}$$

Data parts of the R check packets and the generator matrix $G_{R \times K}$ may satisfy:

$$\begin{bmatrix} y_1 \\ y_2 \\ \vdots \\ y_R \end{bmatrix} = \begin{bmatrix} z^{\prime 1,1} & z^{\prime 1,2} & \dots & z^{\prime 1,K} \\ z^{\prime 2,1} & z^{\prime 2,2} & \dots & z^{\prime 2,K} \\ \vdots & \vdots & \ddots & \vdots \\ z^{\prime R,1} & z^{\prime R,2} & \dots & z^{\prime R,K} \end{bmatrix} \begin{bmatrix} x_1 \\ x_2 \\ \vdots \\ x_K \end{bmatrix}$$

The generator matrix $G_{R \times K}$ includes R rows, and K coding coefficients in each row are a group of coding coefficients. An $r^{th}$ row of coding coefficients in the R rows may be used to generate an $r^{th}$ check packet in the R check packets. That is, $[z^{r,1} \ z^{r,2} \ \dots \ z^{r,K}]$ in the generator matrix $G_{R \times K}$ includes a group of coding coefficients used to generate the $r^{th}$ check packet in the R check packets. A data part of the $r^{th}$ check packet and the $r^{th}$ row of coding coefficients meet $y_r = z^{r,1} x_1 \oplus z^{r,2} x_2 \oplus \dots \oplus z^{r,K} x_K$. Herein, $z^{r,k}$ represents that data multiplied by $z^{r,k}$ is shifted by $t_{r,k}$ shift units. For example, $z^{r,k} x_k$ represents that an original packet $x_k$ is shifted by $t_{r,k}$ shift units. Herein, $t_{r,k}$ represents a displacement quantity defined by a coding coefficient in an $r^{th}$ row and a $k^{th}$ column in the generator matrix, $t_{r,k} \geq 0$, and $t_{r,k}$ is an integer.

Provided that largest displacement quantities respectively defined by the R rows of coding coefficients in the generator matrix $G_{R \times K}$ are different from each other, overheads caused by the indication information of the coding coefficient of the check packet can be reduced by using the correspondence between the coding coefficient and the difference between the data length of the check packet and the length of the to-be-coded data packet.

For example, coding coefficients in the generator matrix $G_{R \times K}$ may meet $0 \leq t_{r_1,k_2} - t_{r_1,k_1} < t_{r_2,k_2} - t_{r_2,k_1}$, where $r_1$ and $r_2$ represent two rows in the generator matrix, $k_1$ and $k_2$ represent two columns in the generator matrix, and the following conditions are met: $K \geq k_2 > k_1 \geq 1$, $R \geq r_2 > r_1 \geq 1$, and all of $k_1$, $k_2$, $r_1$, and $r_2$ are integers.

That is, a data length of an $r_1{}^{th}$ check packet is less than a data length of an $r_2{}^{th}$ check packet in the R check packets. Therefore, when the coding coefficients in the generator matrix $G_{R \times K}$ meet $0 \leq t_{r_1,k_2} - t_{r_1,k_1} < t_{r_2,k_2} - t_{r_2,k_1}$, data lengths of the obtained R check packets are different from each other, and a group of coding coefficients can be uniquely determined based on differences between the length of the to-be-coded data packet and the data lengths of the R check packets.

The matrix is similar to the generator matrix $G_{K \times R}$. Provided that the largest displacement quantities respectively defined by the R rows of coding coefficients in the generator matrix $G_{R \times K}$ are different, even if row switching transformation and/or column switching transformation are/is performed on the R rows, the feature that the largest displacement quantities respectively defined by the R rows of coding coefficients are different is not affected; and even if column switching transformation is performed on one or more of the R rows, the feature that the largest displacement quantities respectively defined by the R rows of coding coefficients are different is not affected. Therefore, the coding coefficients in the generator matrix $G_{R \times K}$ are not limited to meeting $0 \leq t_{r_1,k_2} - t_{r_1,k_2} - t_{r_2,k_1}$. Provided that a matrix that satisfies $0 \leq t_{r_1,k_2} - t_{r_1,k_1} < t_{r_2,k_2} - t_{r_2,k_1}$ may be obtained after at least one of the following types of transformation is performed on the generator matrix $G_{R \times K}$, R groups of coding coefficients with different largest displacement quantities may be obtained: row switching transformation, column switching transformation, or column switching transformation performed on one or more rows.

The generator matrix $G_{R \times K}$ may also be from Q predefined groups of coding coefficients. A possible form of the Q groups of coding coefficients is a Q×P-dimensional matrix $H_2$:

$$H_2 = \begin{bmatrix} z^{s 1,1} & z^{s 1,2} & \dots & z^{s 1,P} \\ z^{s 2,1} & z^{s 2,2} & \dots & z^{s 2,P} \\ \vdots & \vdots & \ddots & \vdots \\ z^{s Q,1} & z^{s Q,2} & \dots & z^{s Q,P} \end{bmatrix}$$

Herein, $P \geq K$, $Q \geq R$, and P and Q are integers. If the coding coefficients in the generator matrix $G_{R \times K}$ need to meet $0 \leq t_{r_1,k_2} - t_{r_1,k_1} < t_{r_2,k_2} - t_{r_2,k_1}$, elements in the matrix $H_2$ should meet $0 \leq s_{q_1,p_2} - s_{q_1,p_1} < s_{q_2,p_2} - s_{q_2,p_1}$, where $q_1$ and $q_2$ represent sequence numbers of two rows in the matrix $H_2$, $p_1$ and $p_2$ represent sequence numbers of two columns in the matrix $H_2$, and the following conditions are met: $Q \geq q_2 > q_1 \geq 1$, and $P \geq p_2 > p_1 \geq 1$.

The matrix is similar to the matrix $H_1$. Provided that largest displacement quantities respectively defined by Q rows of elements in the matrix $H_2$ are different, even if row switching transformation and/or column switching transformation are/is performed on the Q rows, the feature that the largest displacement quantities respectively defined by the Q rows of elements are different is not affected; and even if column switching transformation is performed on one or more of the Q rows, the feature that the largest displacement quantities respectively defined by the Q rows of elements are different is not affected. Therefore, the generator matrix $G_{R \times K}$ may be an R×K-dimensional submatrix extracted from the Q×P-dimensional matrix $H_2$, a matrix including R rows and K columns extracted from the Q×P-dimensional matrix $H_2$, or a matrix obtained by performing at least one of the following types of transformation after R rows and K columns are extracted from the Q×P-dimensional matrix $H_2$: row switching transformation, column switching transformation, column switching transformation performed on one or more rows, or the like. This is not limited in embodiments.

Based on the foregoing descriptions that are of the R groups of coding coefficients and that are provided with reference to the generator matrices $G_{K \times R}$ and $G_{R \times K}$, a correspondence between the R groups of coding coefficients and the differences between the length of the to-be-coded data packet and the data lengths of the R check packets may be shown in Table 5:

TABLE 5

| ΔL or ΔZ | Coding coefficient |
|---|---|
| $\Delta L_1$ or $\Delta Z_1$ | $[z^{t1,\,1}\,z^{t2,\,1}\ldots z^{tK,\,1}]^T$ or $[z^{t1,\,1}\,z^{t1,\,2}\ldots z^{t1,\,K}]$ |
| $\Delta L_2$ or $\Delta Z_2$ | $[z^{t1,\,2}\,z^{t2,\,2}\ldots z^{tK,\,2}]^T$ or $[z^{t2,\,1}\,z^{t2,\,2}\ldots z^{t2,\,K}]$ |
| . | . |
| . | . |
| . | . |
| $\Delta L_R$ or $\Delta Z_R$ | $[z^{t1,\,R}\,z^{t2,\,R}\ldots z^{tK,\,R}]^T$ or $[z^{tR,\,1}\,z^{tR,\,2}\ldots z^{tR,\,K}]$ |

Table 5 shows an example of a one-to-one correspondence between the R groups of coding coefficients and R values. Herein, ΔL represents a difference between the data length of the check packet and the length of the original packet, and ΔZ represents a difference between the data length of the check packet and a length of the system packet. Units of ΔL and ΔZ may be bits, bytes, symbols, or the like, or may be shift units.

The R groups of coding coefficients may be from the Q predefined groups of coding coefficients. Therefore, the correspondence shown in Table 5 may be a part of that in Table 6, or the correspondence shown in Table 5 may be a subset of a correspondence shown in Table 6:

TABLE 6

| ΔI | Coding coefficient |
|---|---|
| $\Delta I_1$ | $[z^{s1,\,1}\,z^{s2,\,1}\ldots z^{sP,\,1}]^T$ or $[z^{s1,\,1}\,z^{s1,\,2}\ldots z^{s1,\,P}]$ |
| $\Delta I_2$ | $[z^{s1,\,1}\,z^{s2,\,1}\ldots z^{sP,\,1}]^T$ or $[z^{s1,\,1}\,z^{s1,\,2}\ldots z^{s1,\,P}]$ |
| . | . |
| . | . |
| . | . |
| $\Delta I_Q$ | $[z^{s1,\,Q}\,z^{s2,\,Q}\ldots z^{sP,\,Q}]^T$ or $[z^{sQ,\,1}\,z^{sQ,\,2}\ldots z^{sQ,\,P}]$ |

Herein, ΔI represents a different length difference, and $\Delta I_1$ to $\Delta I_Q$ may represent length differences between the to-be-coded data packet and check packets generated when corresponding coding coefficients are used. It may be understood that $\Delta L_1$ to $\Delta L_R$ or $\Delta Z_1$ to $\Delta Z_R$ in Table 5 are a subset of $\Delta I_1$ to $\Delta I_Q$. The R groups of coding coefficients may correspond to R vectors corresponding to $\Delta L_1$ to $\Delta L_R$ or $\Delta Z_1$ to $\Delta Z_R$ in Table 6. For example, each of the R groups of coding coefficients may be first K elements, last K elements, or K consecutive elements or K inconsecutive elements whose start location is a predefined sequence number in a vector corresponding to each group of coding coefficients in the R vectors. This is not limited in embodiments.

It should be understood that the correspondence between the coding coefficient and the difference between the data length of the check packet and the length of the to-be-coded data packet may be expressed in a plurality of possible forms, and is not limited to the correspondences shown in Table 5 and Table 6. For example, mathematical transformation may be performed on the difference between the data length of the check packet and the length of the to-be-coded data packet, to obtain another value corresponding to the difference. For example, if the mathematical transformation performed on the difference between the data length of the check packet and the length of the to-be-coded data packet is expressed by using a function $f(\ )$, a correspondence between the coding coefficient and the difference between the data length of the check packet and the length of the original packet may be expressed as a correspondence between the coding coefficient and $f(\Delta L)$, and a correspondence between the coding coefficient and the difference between the data length of the check packet and the length of the system packet may be expressed as a correspondence between the coding coefficient and $f(\Delta Z)$.

In the shift exclusive OR coding process, the length of the original packet, a packet header length of the system packet, and a packet header length of the check packet are fixed values. Therefore, the length of the original packet or the system packet used as the to-be-coded data packet may be a fixed value, and the difference between the data length of the check packet and the length of the to-be-coded data packet may be converted into a difference between the length of the check packet and the length of the to-be-coded data packet, the data length of the check packet, the length of the check packet, or the like by performing some mathematical transformation. These length values obtained by performing mathematical transformation on the difference between the data length of the check packet and the length of the to-be-coded data packet may be referred to as length information of the check packet or length information of the data part of the check packet. Therefore, the correspondence between the coding coefficient and the difference between the data length of the check packet and the length of the to-be-coded data packet may be understood as a correspondence between the coding coefficient and the length information of the check packet or the length information of the data part of the check packet.

The following provides descriptions with reference to a difference between the length of the check packet and the length of the original packet and a difference between the length of the check packet and the length of the system packet.

It may be understood that if the R check packets are obtained by performing shift exclusive OR coding on the K original packets based on the R groups of coding coefficients, a value calculated by using the function $f(\Delta L)$ may be denoted as a first value, and the correspondence between $f(\Delta L)$ and the coding coefficient is a correspondence between the first value and the coding coefficient, that is, the R groups of coding coefficients are in a one-to-one correspondence with R first values.

If the R check packets are obtained by performing shift exclusive OR coding on the K system packets based on the R groups of coding coefficients, a value calculated by using the function $f(\Delta Z)$ may be denoted as a second value, and the correspondence between $f(\Delta Z)$ and the coding coefficient is a correspondence between the second value and the coding coefficient, that is, the R groups of coding coefficients are in a one-to-one correspondence with R second values.

Optionally, the first value is a quantity d of shift units included in the difference between the data length of the check packet and the length of the original packet, where $d=f(\Delta L)=\Delta L/a$, and a represents a quantity of bits, bytes, or symbols in one shift unit. It should be understood that units of a and ΔL are the same.

As described above, the unit of $\Delta L$ may alternatively be a shift unit. In this case, the first value d is the same as $\Delta L$, that is, it is equivalent to that a=1, indicating one shift unit.

Based on the definition of the first value, the correspondences shown in Table 5 and Table 6 may be respectively transformed into those shown in Table 7 and Table 8:

TABLE 7

| d | Coding coefficient |
|---|---|
| $d_1$ | $[z^{t1, 1} z^{t2, 1} \ldots z^{tK, 1}]^T$ or $[z^{t1, 1} z^{t1, 2} \ldots z^{t1, K}]$ |
| $d_2$ | $[z^{t1, 2} z^{t2, 2} \ldots z^{tK, 2}]^T$ or $[z^{t2, 1} z^{t2, 2} \ldots z^{t2, K}]$ |
| . | . |
| . | . |
| . | . |
| $d_R$ | $[z^{t1, R} z^{t2, R} \ldots z^{tK, R}]^T$ or $[z^{tR, 1} z^{tR, 2} \ldots z^{tR, K}]$ |

TABLE 8

| D | Coding coefficient |
|---|---|
| $D_1$ | $[z^{s1, 1} z^{s2, 1} \ldots z^{sP, 1}]^T$ or $[z^{s1, 1} z^{s1, 2} \ldots z^{s1, P}]$ |
| $D_2$ | $[z^{s1, 1} z^{s2, 1} \ldots z^{sP, 1}]^T$ or $[z^{s1, 1} z^{s1, 2} \ldots z^{s1, P}]$ |
| . | . |
| . | . |
| . | . |
| $D_Q$ | $[z^{s1, Q} z^{s2, Q} \ldots z^{sP, Q}]^T$ or $[z^{sQ, 1} z^{sQ, 2} \ldots z^{sQ, P}]$ |

Herein, D represents a quantity of shift units included in a different length difference, and $D_1$ to $D_Q$ may represent quantities of shift units included in differences between the length of the original packet and lengths of check packets generated when corresponding coding coefficients are used. It should be understood that the correspondence shown in Table 7 is an example of a correspondence between the R first values and the R groups of coding coefficients. The correspondence between the R first values and the R groups of coding coefficients may be a subset of the correspondence shown in Table 8. Herein, $d_1$ to $d_R$ are a subset of $D_1$ to $D_Q$ in Table 8. The R groups of coding coefficients may correspond to R vectors corresponding to $D_1$ to $D_Q$ in Table 8.

Optionally, the second value is a quantity w of shift units included in the difference between the data length of the check packet and the length of the system packet, where $w=f(\Delta Z)=\Delta Z/a$, and a represents a quantity of bits, bytes, or symbols in one shift unit. It should be understood that units of a and $\Delta Z$ are the same.

Similar to $\Delta L$, the unit of $\Delta Z$ may alternatively be a shift unit. In this case, the second value w is the same as $\Delta L$.

Based on the definition of the second value, the correspondences shown in Table 5 and Table 6 may be respectively transformed into those shown in Table 9 and Table 10:

TABLE 9

| w | Coding coefficient |
|---|---|
| $w_1$ | $[z^{t1, 1} z^{t2, 1} \ldots z^{tK, 1}]^T$ or $[z^{t1, 1} z^{t1, 2} \ldots z^{t1, K}]$ |
| $w_2$ | $[z^{t1, 2} z^{t2, 2} \ldots z^{tK, 2}]^T$ or $[z^{t2, 1} z^{t2, 2} \ldots z^{t2, K}]$ |
| . | . |
| . | . |
| . | . |
| $w_R$ | $[z^{t1, R} z^{t2, R} \ldots z^{tK, R}]^T$ or $[z^{tR, 1} z^{tR, 2} \ldots z^{tR, K}]$ |

TABLE 10

| W | Coding coefficient |
|---|---|
| $W_1$ | $[z^{s1, 1} z^{s2, 1} \ldots z^{sP, 1}]^T$ or $[z^{s1, 1} z^{s1, 2} \ldots z^{s1, P}]$ |
| $W_2$ | $[z^{s1, 1} z^{s2, 1} \ldots z^{sP, 1}]^T$ or $[z^{s1, 1} z^{s1, 2} \ldots z^{s1, P}]$ |
| . | . |
| . | . |
| . | . |
| $W_Q$ | $[z^{s1, Q} z^{s2, Q} \ldots z^{sP, Q}]^T$ or $[z^{sQ, 1} z^{sQ, 2} \ldots z^{sQ, P}]$ |

Herein, W represents a quantity of shift units included in a different length difference, and $W_1$ to $W_Q$ may represent quantities of shift units included in differences between the length of the original packet and lengths of check packets generated when corresponding coding coefficients are used. It should be understood that the correspondence shown in Table 9 is an example of a correspondence between the R second values and the R groups of coding coefficients. The correspondence between the R second values and the R groups of coding coefficients may be a subset of the correspondence shown in Table 10. Herein, $w_1$ to $w_R$ are a subset of $W_1$ to $W_Q$ in Table 10. The R groups of coding coefficients may correspond to R vectors corresponding to $W_1$ to $W_Q$ in Table 10.

In an example, the Q predefined groups of coding coefficients described above may be determined from a matrix $H_V$ in a form of a Vandermonde matrix, and the matrix $H_V$ satisfies:

$$H_v = \begin{bmatrix} z^0 & z^0 & z^0 & \cdots & z^0 \\ z^0 & z^1 & z^2 & \cdots & z^{Q-1} \\ z^0 & z^2 & z^4 & \cdots & z^{2(Q-1)} \\ \vdots & \vdots & \vdots & \ddots & \vdots \\ z^0 & z^{P-1} & z^{2(P-1)} & \cdots & z^{(P-1)(Q-1)} \end{bmatrix}$$

The Q predefined groups of coding coefficients may correspond to Q columns in the matrix $H_V$, and each group of coding coefficients corresponds to one column in the matrix $H_V$, and includes P coding coefficients. A superscript of each coding coefficient represents a displacement quantity t, a value range of t is $0 \leq t \leq (P-1)(Q-1)$, and t is an integer. In addition, in the matrix, a largest value of t in each row is an integer multiple of $(Q-1)$, and a largest value of t in each column is an integer multiple of $(P-1)$.

The R groups of coding coefficients used to generate the R check packets are from the Q groups of coding coefficients, that is, from the matrix $H_V$, for example, may be elements in any K rows and any R columns in the matrix $H_V$. For example, the R groups of coding coefficients are denoted as follows:

$$\begin{bmatrix} z^0 & z^{i-1} & z^{2(i-1)} & \cdots & z^{(Q-1)(i-1)} \\ z^0 & z^i & z^{2i} & \cdots & z^{(Q-1)i} \\ z^0 & z^{i+1} & z^{2(i+1)} & \cdots & z^{(Q-1)(i+1)} \\ \vdots & \vdots & \vdots & \ddots & \vdots \\ z^0 & z^{i+K-2} & z^{2(i+K-2)} & \cdots & z^{(Q-1)(i+K-2)} \end{bmatrix}$$

The data parts of the R check packets and the R groups of coding coefficients satisfy:

$$
\begin{bmatrix} y_1 \\ y_2 \\ y_3 \\ \vdots \\ y_R \end{bmatrix}^T = \begin{bmatrix} x_1 \\ x_2 \\ x_3 \\ \vdots \\ x_K \end{bmatrix}^T \begin{bmatrix} z^0 & z^{i-1} & z^{2(i-1)} & \ldots & z^{(Q-1)(i-1)} \\ z^0 & z^i & z^{2i} & \ldots & z^{(Q-1)i} \\ z^0 & z^{i+1} & z^{2(i+1)} & \ldots & z^{(Q-1)(i+1)} \\ \vdots & \vdots & \vdots & \ddots & \vdots \\ z^0 & z^{i+K-2} & z^{2(i+K-2)} & \ldots & z^{(Q-1)(i+K-2)} \end{bmatrix}
$$

That is $$
\begin{bmatrix} z^0 & z^{i-1} & z^{2(i-1)} & \ldots & z^{(Q-1)(i-1)} \\ z^0 & z^i & z^{2i} & \ldots & z^{(Q-1)i} \\ z^0 & z^{i+1} & z^{2(i+1)} & \ldots & z^{(Q-1)(i+1)} \\ \vdots & \vdots & \vdots & \ddots & \vdots \\ z^0 & z^{i+K-2} & z^{2(i+K-2)} & \ldots & z^{(Q-1)(i+K-2)} \end{bmatrix}
$$

is a generator matrix of the R check packets.

If the $r^{th}$ check packet in the R check packets corresponds to K coding coefficients in a $q^{th}$ column in the matrix $H_V$, that is, corresponds to elements in the $q^{th}$ column in the generator matrix, and the K coding coefficients are, for example, elements in an $(i-1)^{th}$ row to an $(i+K-2)^{th}$ row in the $q^{th}$ column in the matrix $H_V$, and are respectively denoted as $z^{(i-1)(q-1)}, z^{i(q-1)}, \ldots,$ and $z^{(i+K-2)(q-1)}$, the data part $y_r$ of the check packet and the K coding coefficients meet $y_r = z^{(i-1)(q-1)}x_1 \oplus z^{i(q-1)}x_2 \oplus \ldots \oplus z^{(i+K-2)(q-1)}x_K$. Herein, $1 \le i \le P-K+1$, $1 \le q \le Q$, and i and q are integers.

It is found, through observation, that largest displacement quantities defined by all columns of elements in the matrix $H_V$ are respectively 0, P−1, 2(P−1), . . . , and (P−1)(Q−1), and are all integral multiples of P−1. That is, P−1 is a greatest common divisor of the largest displacement quantities respectively defined by the Q columns of elements.

If the R groups of coding coefficients used to generate the R check packets are determined from the matrix $H_V$, the largest displacement quantities respectively defined by the R groups of coding coefficients are different from each other. In addition, in the K rows of elements in the matrix $H_V$ that correspond to the R groups of coding coefficients, largest displacement quantities corresponding to all columns of element are related to a location of the K rows of elements in the matrix $H_V$.

For example, if the K rows of elements are from first K rows in the matrix $H_V$, all of the largest displacement quantities corresponding to all the columns of elements are integer multiples of K−1.

For example, the first K rows in the matrix $H_V$ are shown as follows:

$$
\begin{bmatrix} z^0 & z^0 & z^0 & \ldots & z^0 \\ z^0 & z^1 & z^2 & \ldots & z^{Q-1} \\ z^0 & z^2 & z^4 & \ldots & z^{2(Q-1)} \\ \vdots & \vdots & \vdots & \ddots & \vdots \\ z^0 & z^{K-1} & z^{2(K-1)} & \ldots & z^{(K-1)(Q-1)} \end{bmatrix}
$$

In the K rows of elements, the largest displacement quantities defined by all the columns of elements are sequentially 0, K−1, 2(K−1), . . . , and (R−1)(K−1) from left to right, and are all integer multiples of K−1. Therefore, if any R columns are selected from the K rows of elements or at least one of the following types of transformation is performed on any R selected columns of elements, a feature that the largest displacement quantities defined by all the columns of elements are integer multiples of K−1 remains unchanged: row transformation, column transformation, row transformation performed on one or more columns, column transformation performed on one or more rows, or the like.

If the R groups of coding coefficients are from the first K rows and first R columns in the matrix $H_V$, the correspondence between the R first values and the R groups of coding coefficients shown in Table 7 and the correspondence between the R second values and the R groups of coding coefficients shown in Table 9 may be respectively transformed into those shown in Table 11 and Table 12:

TABLE 11

| d | Coding coefficient |
|---|---|
| 0 | $[z^0 \, z^0 \, z^0 \, \ldots \, z^0]_{K \times 1}{}^T$ |
| K − 1 | $[z^0 \, z^1 \, z^2 \, \ldots \, z^{K-1}]_{K \times 1}{}^T$ |
| 2(K − 1) | $[z^0 \, z^2 \, z^4 \, \ldots \, z^{2(K-1)}]_{K \times 1}{}^T$ |
| . | . |
| . | . |
| . | . |
| (R − 1)(K − 1) | $[z^0 \, z^{R-1} \, z^{2(R-1)} \, \ldots \, z^{(K-1)(R-1)}]_{K \times 1}{}^T$ |

TABLE 12

| w | Coding coefficient |
|---|---|
| 0 | $[z^0 \, z^0 \, z^0 \, \ldots \, z^0]_{K \times 1}{}^T$ |
| K − 1 | $[z^0 \, z^1 \, z^2 \, \ldots \, z^{K-1}]_{K \times 1}{}^T$ |
| 2(K − 1) | $[z^0 \, z^2 \, z^4 \, \ldots \, z^{2(K-1)}]_{K \times 1}{}^T$ |
| . | . |
| . | . |
| . | . |
| (R − 1)(K − 1) | $[z^0 \, z^{R-1} \, z^{2(R-1)} \, \ldots \, z^{(K-1)(R-1)}]_{K \times 1}{}^T$ |

It should be understood that Table 11 and Table 12 are possible examples obtained based on the R groups of coding coefficients determined based on the first K rows and the first R columns in the matrix $H_V$. However, this should not constitute any limitation on the embodiments. The R groups of coding coefficients may alternatively be determined from any R columns of elements in the first K rows in the matrix $H_V$. For example, the R columns of elements that are in the first K rows in the matrix $H_V$ and from which the R groups of coding coefficients may be determined may be predefined, and the coding coefficients in the correspondences shown in Table 11 and Table 12 are applicable after being correspondingly adjusted based on the R columns of elements.

For example, the R groups of coding coefficients may alternatively be a second column to an $(R+1)^{th}$ column in the first K rows in the matrix $H_V$. In this case, an obtained correspondence between the R first values and the R groups of coding coefficients and an obtained correspondence between the R second values and the R groups of coding coefficients are respectively shown in Table 13 and Table 14:

TABLE 13

| d | Coding coefficient |
|---|---|
| K − 1 | $[z^0 \, z^1 \, z^2 \, \ldots \, z^{K-1}]_{K \times 1}{}^T$ |
| 2(K − 1) | $[z^0 \, z^2 \, z^4 \, \ldots \, z^{2(K-1)}]_{K \times 1}{}^T$ |
| . | . |
| . | . |
| . | . |
| (R − 1)(K − 1) | $[z^0 \, z^{R-1} \, z^{2(R-1)} \, \ldots \, z^{(K-1)(R-1)}]_{K \times 1}{}^T$ |
| R(K − 1) | $[z^0 \, z^R \, z^{2R} \, \ldots \, z^{R(K-1)}]_{K \times 1}{}^T$ |

TABLE 14

| w | Coding coefficient |
|---|---|
| K − 1 | $[z^0 \, z^1 \, z^2 \ldots z^{K-1}]_{K \times 1}{}^T$ |
| 2(K − 1) | $[z^0 \, z^2 \, z^4 \ldots z^{2(K-1)}]_{K \times 1}{}^T$ |
| . | . |
| . | . |
| . | . |
| (R − 1)(K − 1) | $[z^0 \, z^{R-1} \, z^{2(R-1)} \ldots z^{(K-1)(R-1)}]_{K \times 1}{}^T$ |
| R(K − 1) | $[z^0 \, z^R \, z^{2R} \ldots z^{R(K-1)}]_{K \times 1}{}^T$ |

Alternatively, if the R groups of coding coefficients are obtained by performing at least one of the following types of transformation on the first K rows and first R columns in the matrix $H_V$: row switching transformation, column switching transformation, row switching transformation performed on one or more columns, or the like, a sequence of elements in each group of coding coefficients needs to be adjusted accordingly, and a length difference corresponding to each group of coding coefficients may also need to be adjusted accordingly. For brevity, examples are not listed one by one herein.

For another example, if the K rows of elements are from last K rows in the matrix $H_V$, all of the largest displacement quantities corresponding to all the columns of elements are integer multiples of P−1.

For example, the last K rows in the matrix $H_V$ are shown as follows:

$$
\begin{bmatrix}
z^0 & z^{P-K+1} & z^{2(P-K+1)} & \ldots & z^{(Q-1)(P-K+1)} \\
z^0 & z^{P-K+2} & z^{2(P-K+2)} & \ldots & z^{(Q-1)(P-K+2)} \\
z^0 & z^{P-K+3} & z^{2(P-K+3)} & \ldots & z^{(Q-1)(P-K+3)} \\
\vdots & \vdots & \vdots & \ddots & \vdots \\
z^0 & z^{P-1} & z^{2(P-1)} & \ldots & z^{(Q-1)(P-1)}
\end{bmatrix}
$$

In the K rows of elements, the largest displacement quantities defined by all the columns of elements are sequentially 0, P−1, 2(P−1), . . . , and (Q−1)(P−1) from left to right, and are all integer multiples of P−1. Therefore, if any R columns are selected from the K rows of elements or at least one of the following types of transformation is performed on any R selected columns of elements, a feature that the largest displacement quantities defined by all the columns of elements are integer multiples of P−1 remains unchanged: row switching transformation, column switching transformation, row switching transformation performed on one or more columns, or the like.

By analogy, if the K rows of elements are from an $(S-K+1)^{th}$ row to an $S^{th}$ row in the matrix $H_V$, all of the largest displacement quantities corresponding to all the columns of elements are integer multiples of S−1, where K≤S≤P, and S is an integer. Herein, K−1 and P−1 may be understood as two examples existing when S in S−1 is equal to K and P.

Thus, if R columns are randomly selected from any K rows of elements in the matrix $H_V$ as the R groups of coding coefficients, the largest displacement quantities defined by the R groups of coding coefficients are still integer multiples of S−1. If R columns are randomly selected from the K rows of elements in the matrix $H_V$ and then row switching transformation is performed on one or more columns, the largest displacement quantities defined by the R groups of coding coefficients remain unchanged. In addition, a greatest common divisor of the largest displacement quantities determined by using R columns of elements randomly selected from the K rows of elements in the matrix $H_V$ as the R groups of coding coefficients or determined by using R columns of elements obtained by performing at least one of the following types of transformation on the R columns of elements as the coding coefficients remains unchanged: row switching transformation, column switching transformation, or row switching transformation performed on one or more columns.

In this embodiment, the R groups of coding coefficients are determined based on the K rows of elements in the matrix $H_V$, and S−1 may be understood as a greatest common divisor of largest displacement quantities respectively defined by different columns of elements in the K rows of elements in the matrix $H_V$ that correspond to the R groups of coding coefficients, and may be referred to as a displacement reference quantity. It should be understood that K is a smallest value of S, and (K−1) is a smallest value of the displacement reference quantity (S−1). Therefore, (K−1) may be referred to as a smallest displacement reference quantity.

In this embodiment, the greatest common divisor of the largest displacement quantities respectively defined by the different columns of elements in the K rows of elements in the matrix $H_V$ that correspond to the R groups of coding coefficients may be referred to as the displacement reference quantity, or a greatest common divisor of largest displacement quantities respectively defined by different rows of coding coefficients in K columns of coding coefficients in a matrix HET that correspond to the R groups of coding coefficients may be referred to as the displacement reference quantity.

Based on the foregoing definition of the displacement reference quantity, the following transformation may be performed on the difference between the data length of the check packet and the length of the to-be-coded data packet: dividing the difference between the data length of the check packet and the length of the to-be-coded data packet by the displacement reference quantity, to obtain another form of the first value and another form of the second value.

Optionally, the first value is a ratio of the quantity d of shift units included in the difference between the data length of the check packet and the length of the original packet to the displacement reference quantity.

Optionally, the second value is a ratio of the quantity w of shift units included in the difference between the data length of the check packet and the length of the system packet to the displacement reference quantity.

Based on the foregoing another manner of defining the first value and the second value, the correspondences shown in Table 11 to Table 14 may be transformed into a correspondence shown in Table 15:

TABLE 15

| i | Coding coefficient |
|---|---|
| 0 | $[z^0 \, z^0 \, z^0 \ldots z^0]_{K \times 1}{}^T$ |
| 1 | $[z^0 \, z^1 \, z^2 \ldots z^{K-1}]_{K \times 1}{}^T$ |
| 2 | $[z^0 \, z^2 \, z^4 \ldots z^{2(K-1)}]_{K \times 1}{}^T$ |
| . | . |
| . | . |
| . | . |
| R − 1 | $[z^0 \, z^{R-1} \, z^{2(R-1)} \ldots z^{(K-1)(R-1)}]_{K \times 1}{}^T$ |
| R | $[z^0 \, z^R \, z^{2R} \ldots z^{R(K-1)}]_{K \times 1}{}^T$ |

Herein, i may represent a ratio of d to the smallest displacement reference quantity (K−1), that is, another example of the first value; or may represent a ratio of w to the smallest displacement reference quantity (K−1), that is, another example of the second value.

It should be understood that first R rows in Table 15 show the correspondences in Table 11 and Table 12, and last R rows in Table 15 show the correspondences in Table 13 and Table 14. Table 15 is merely an example, and the correspondences listed above with reference to Table 11 to Table 14 are shown in a same table.

It should be further understood that the R groups of coding coefficients shown in Table 11 to Table 15 are all from the first K row of elements in the matrix $H_V$. The R groups of coding coefficients may alternatively be any K rows of elements in the matrix $H_V$. For example, the K rows of elements and the R columns of elements that are in the matrix $H_V$ and from which the R groups of coding coefficients may be determined may be predefined, and the coding coefficients in the correspondences shown in Table 11 to Table 15 are applicable after being correspondingly adjusted based on the K rows of elements and the R columns of elements. Displacement reference quantities in the correspondences shown in Table 11 to Table 13 may be adjusted to a greatest common divisor of largest displacement quantities defined by all columns of elements in the K rows of elements.

The K rows of elements that are in the matrix $H_V$ and from which the R groups of coding coefficients are determined may be predefined, for example, the first K rows, the last K rows, or K consecutive rows or K inconsecutive rows determined by using a predefined row sequence number as a start location. Therefore, the displacement reference quantity may be predetermined, that is, the greatest common divisor of the largest displacement quantities defined by all the columns of elements in the K rows of elements in the matrix $H_V$ that correspond to the R groups of coding coefficients. In this way, the correspondence between the R second values and the R groups of coding coefficients may be determined.

It should be understood that existence of the correspondence between the R second values and the R groups of coding coefficients is not limited to a case in which the R groups of coding coefficients are from the matrix $H_V$. If at least one of the following types of transformation is further performed on any K rows of elements in the matrix $H_V$, and any R columns of elements in an obtained matrix are used as the R groups of coding coefficients, the displacement reference quantity still remains unchanged: row switching transformation, column switching transformation, or row switching transformation performed on one or more columns.

It should be understood that the P×Q-dimensional matrix $H_V$ shown above may be converted into a Q×P-dimensional matrix. For example, the Q×P-dimensional matrix is a transpose HET of the matrix $H_V$. The R groups of coding coefficients used to generate the R check packets may be determined, for example, based on the Q×P-dimensional matrix. For example, the R groups of coding coefficients may be any K columns and any R rows of elements in the Q×P-dimensional matrix, or may be any R rows of elements selected from a matrix obtained after at least one of the following types of transformation is performed on any K columns of elements in the Q×P-dimensional matrix: row switching transformation, column switching transformation, or column switching transformation performed on one or more rows.

The foregoing shows, with reference to a plurality of tables, that the correspondence between the length difference and the coding coefficient has a plurality of possible forms. Only some of the possible forms are shown in this embodiment. Based on a same concept, mathematical transformation may be further performed on the correspondences listed above, to obtain more possible forms. All these possible forms shall fall within the scope of the embodiments.

Based on the foregoing implementation, the packet header of the check packet may not include a coding coefficient index. It should be understood that the coding coefficient index field is a possible example of a field used to carry the indication information of the coding coefficient, and should not constitute any limitation on this embodiment. The indication information of the coding coefficient carried in the coding coefficient index field in the packet header of the check packet may indicate the coding coefficient corresponding to the check packet, that is, may indicate a group of coding coefficients based on which shift exclusive OR coding is performed to obtain the check packet.

For implementations of fields included in the packet header of the check packet and the packet header of the system packet, refer to some existing solutions. This is not limited. The following provides several possible implementations for reference.

In an optional implementation, the packet header of the system packet may include one or more of an O field or an SN field; and the packet header of the check packet may not include the coding coefficient index (that is, an example of the indication information of the coding coefficient) field, but may include one or more of a C field, a window indicator field, or an original packet quantity field. Optionally, the packet header of the system packet further includes a coding coefficient index field. Optionally, the packet header of the check packet further includes an SN field.

Alternatively, in another optional implementation, the packet header of the system packet may include a group identifier field and a packet identifier field; and the packet header of the check packet may not include the coding coefficient index field, but may include one or more of a group identifier field, an original packet quantity field, or a window indicator field. Optionally, the packet header of the system packet further includes at least one of the following fields: a coding coefficient index field or an SN field. Optionally, the packet header of the check packet further includes at least one of the following fields: an SN field or a packet identifier field.

The O/C field may be used by the receive end to identify the system packet and the check packet. The O field is carried in the packet header of the system packet, and indicates that the coded packet is a system packet. The C field is carried in the packet header of the check packet, and indicates that the coded packet is a check packet.

The indication information of the coding coefficient carried in the coding coefficient index field in the packet header of the system packet may indicate the coding coefficient corresponding to the system packet, that is, may indicate a group of coding coefficients based on which shift exclusive OR coding is performed to obtain the system packet.

The SN field may be used to carry an SN, and the SN may indicate a transmission sequence of data packets. The data packet may be a coded packet, including a system packet and a check packet, that is, the SN is carried in both the packet header of the system packet and the packet header of the check packet. Alternatively, the data packet may be a system packet. In this case, the SN may not be carried in the packet header of the check packet.

The SN field and the window indicator field may indicate original packets that are coded together, to determine system packets and check packets that need to be decoded together. The window indicator field may indicate at least two of the following: an SN of a first packet in a window, an SN of a last packet in the window, and a quantity of packets in the window.

The group identifier field indicates original packets that are coded as one coding group or original packets that are coded together, to determine system packets and check packets that need to be decoded together.

Original packets that are coded together may be determined by using the group identifier field or a combination of the SN field and the window indicator field. Therefore, the group identifier field and the combination of the SN field and the window indicator field are exchangeable, and may not be simultaneously carried in the packet header of the coded packet. For example, the group identifier field is included, but the SN field and the window indicator field are not included; or the SN field and the window indicator field are included, but the group identifier field is not included.

The packet identifier field may indicate a relative location of an original packet corresponding to the system packet in a coding unit. The coding unit may refer to a coding window or a coding group. If the transmission sequence of the data packets does not change in the coding unit, the packet identifier field may indicate the transmission sequence of the data packets. Therefore, when the group identifier field indicates the original packets that are coded together, the packet identifier field may further indicate a transmission sequence of the data packets.

The original packet quantity field may indicate the original packet quantity K. The window indicator field may also indicate the original packet quantity K. Therefore, when K is variable, the window indicator field and the original packet quantity K may not need to be simultaneously carried in the packet header of the check packet. In addition, the original packet quantity K may be a fixed value, predefined, or semi-statically configured. Therefore, the original packet quantity field may be omitted.

FIG. 8 and FIG. 9 are schematic diagrams of several possible packet headers.

As shown in FIG. 8, a packet header of a system packet includes an O field and an SN field; and a packet header of a check packet includes a C field and a window indicator field. Optionally, the packet header of the check packet further includes an SN field and/or an original packet quantity field.

As shown in FIG. 9, a packet header of a system packet includes an O field, a group identifier field, and a packet identifier field; and a packet header of a check packet includes a C field and a group identifier field. Optionally, the packet header of the check packet further includes a packet identifier field and/or an original packet quantity field.

It should be understood that FIG. 8 and FIG. 9 show merely examples of two possible packet headers, and should not constitute any limitation on this embodiment. Any case in which the indication information of the coding coefficient is omitted from the packet header of the check packet by using the correspondence between the length difference and the coding coefficient shall fall within the scope of the embodiments.

Therefore, based on the foregoing implementation, when generating the R check packets, the transmit end does not need to use a packet header of each check packet to carry the indication information of the coding coefficient, that is, overheads of the coding coefficient index field can be reduced. Therefore, indication overheads can be reduced, and limited spectrum resources can be used for more data transmission to improve utilization of the spectrum resources.

2. The packet header of the check packet may include the indication information of the coding coefficient, but does not include the indication information of the original packet quantity K, and there is a correspondence between the original packet quantity K and the indication information of the coding coefficient.

In this implementation, a case in which the original packet quantity K is variable may be considered. In some situations, if the value of K is variable, the indication information of the original packet quantity K needs to be carried in the packet header of the check packet. It is determined that when shift exclusive OR coding is performed by using R groups of coding coefficients determined from first K rows of elements in a matrix $H_V$ in a form of a Vandermonde matrix, a largest displacement quantity of the coding coefficient is i times K−1, where i is a coding coefficient index (that is, an example of the indication information of the coding coefficient). Therefore, in this embodiment, K may be determined by using a relationship between the coding coefficient index i and the original packet quantity K and based on a difference between a data length of the check packet and the length of the to-be-coded data packet, and the coding coefficient index i. In this case, the indication information of the coding coefficient and the indication information of the original packet quantity K do not need to be simultaneously carried in the packet header of the check packet.

In an example, when shift exclusive OR coding is performed on the K original packets by using a generator matrix $$G_v = \begin{bmatrix} z^0 & z^0 & z^0 & \dots & z^0 \\ z^0 & z^1 & z^2 & \dots & z^{R-1} \\ z^0 & z^2 & z^4 & \dots & z^{2(R-1)} \\ \vdots & \vdots & \vdots & \ddots & \vdots \\ z^0 & z^{K-1} & z^{2(K-1)} & \dots & z^{(R-1)(K-1)} \end{bmatrix},$$

all of differences between the length of the original packet and data lengths of the R obtained check packets are integer multiples of the smallest displacement reference quantity K−1. A quantity d of shift units included in the difference between the data length of the check packet and the length of the original packet and the coding coefficient index i meet i=d/(K−1). After this relational expression is transformed, it may be obtained that K and the coding coefficient index i meet K=d/i+1.

For the receive end, a difference between a data length of each received check packet and the length of the original packet may be determined, and a quantity d of shift units included in the difference may also be determined. Therefore, provided that the transmit end indicates any one of the coding coefficient index i and the original packet quantity K, the other one may be determined.

Similarly, if the check packet is obtained by performing shift exclusive OR coding on the K system packets based on the foregoing generator matrix, a quantity w of shift units included in a difference between the data length of the check packet and a length of the system packet and the coding coefficient index i meet i=w/(K−1). Therefore, it may be obtained that K and the coding coefficient index i meet K=w/i+1.

Table 16 shows a correspondence among the coding coefficient index i, the quantity d of shift units included in the difference between the data length of the check packet and the length of the original packet or the quantity w of shift units included in the difference between the data length of the check packet and the length of the system packet, and the coding coefficient.

TABLE 16

| i | d or w | Coding coefficient |
|---|--------|--------------------|
| 0 | 0 | $[z^0 \; z^0 \; z^0 \ldots z^0]_{K \times 1}{}^T$ |
| 1 | K − 1 | $[z^0 \; z^1 \; z^2 \ldots z^{K-1}]_{K \times 1}{}^T$ |
| 2 | 2(K − 1) | $[z^0 \; z^2 \; z^4 \ldots z^{2(K-1)}]_{K \times 1}{}^T$ |
| . | . | . |
| . | . | . |
| . | . | . |
| R − 1 | (R − 1)(K − 1) | $[z^0 \; z^{R-1} \; z^{2(R-1)} \ldots z^{(K-1)(R-1)}]_{K \times 1}{}^T$ |
| R | (R − 1)(K − 1) | $[z^0 \; z^R \; z^{2R} \ldots z^{R(K-1)}]_{K \times 1}{}^T$ |

The value of K may be determined based on the correspondence and the relationship between K and the coding coefficient index described above. Therefore, regardless of whether the value of K is flexible or variable, the transmit end may omit the indication information of the original packet quantity K from the packet header of the check packet.

It should be understood that the generator matrix $G_V$ shown above is merely an example of the R groups of coding coefficients, and should not constitute any limitation on this embodiment. As described above, when shift exclusive OR coding is performed based on the R groups of coding coefficients determined from the first K rows of elements in the matrix $H_V$, the largest displacement quantity of the coding coefficient and the coding coefficient index meet the foregoing relationship.

If a K×Q-dimensional matrix including the first K rows of elements in the matrix $H_V$ is denoted as $H_V'$, the matrix $H_V'$ satisfies:

$$H_V' = \begin{bmatrix} z^0 & z^0 & z^0 & \ldots & z^0 \\ z^0 & z^1 & z^2 & \ldots & z^{Q-1} \\ z^0 & z^2 & z^4 & \ldots & z^{2(Q-1)} \\ \vdots & \vdots & \vdots & \ddots & \vdots \\ z^0 & z^{K-1} & z^{2(K-1)} & \ldots & z^{(K-1)(Q-1)} \end{bmatrix}$$

The R groups of coding coefficients may be any R columns of elements in the first K rows (or in the matrix $H_V'$) in the matrix $H_V$, or may be a matrix obtained by performing at least one of the following types of transformation on any R columns of elements in the first K rows (or in the matrix $H_V'$) in $H_V$: row switching transformation, column switching transformation, or row switching transformation performed on any one or more columns. This embodiment includes, but is not limited to this.

It should be understood that the K×Q-dimensional matrix $H_V'$ may be converted into a Q×K-dimensional matrix. For example, the Q×K-dimensional matrix is a transpose $(H_V')^T$ of the K×Q-dimensional matrix $H_V'$. The R groups of coding coefficients may be determined, for example, based on the Q×K-dimensional matrix, for example, are any R rows of elements in the Q×K-dimensional matrix, or may be any R rows of elements in a matrix obtained after at least one of the following types of transformation is performed on the Q×K-dimensional matrix: row switching transformation, column switching transformation, or column switching transformation performed on one or more rows.

Based on the foregoing implementation, the packet header of the check packet may not include an original packet quantity field but include a coding coefficient index field. For implementations of fields included in the packet header of the check packet and the packet header of the system packet, refer to some existing solutions. This is not limited. The following provides several possible implementations for reference.

In a possible implementation, the packet header of the system packet may include one or more of an O field or an SN field; and the packet header of the check packet may include one or more of a C field, a coding coefficient index field, or a window indicator field. Optionally, the packet header of the system packet further includes a coding coefficient index field. Optionally, the packet header of the check packet further includes an SN field.

Alternatively, in another possible implementation, the packet header of the system packet may include one or more of an O field, a group identifier field, or a packet identifier field; and the packet header of the check packet may include one or more of a C field, a group identifier field, or the coding coefficient index field. Optionally, the packet header of the system packet further includes at least one of the following fields: a coding coefficient index field or an SN field. Optionally, the packet header of the check packet further includes at least one of the following fields: an SN field or a packet identifier field.

Alternatively, in another possible implementation, the packet header of the system packet may include one or more of a coding coefficient index field or an SN field; and the packet header of the check packet may include one or more of the coding coefficient index field or a window indicator field, but does not include the original packet quantity field. Optionally, the packet header of the system packet further includes an O field. Optionally, the packet header of the check packet further includes at least one of the following fields: a C field or an SN field.

Alternatively, in still another possible implementation, the packet header of the system packet may include one or more of a coding coefficient index field or a group identifier field; and the packet header of the check packet may include one or more of the coding coefficient index field, a group identifier field, or the coding coefficient index field. Optionally, the packet header of the system packet further includes at least one of the following fields: an O field, an SN field, or a packet identifier field. Optionally, the packet header of the check packet further includes at least one of the following fields: a C field, an SN field, or a packet identifier field.

As described above, the coding coefficient of the system packet is a unit vector, and the coding coefficient of the check packet is a non-unit vector. For example, in coding coefficients used to generate the system packet, each group of coding coefficients includes a non-zero element.

However, the coding coefficient of the check packet does not have this feature. The coding coefficient of the system packet and the coding coefficient of the check packet may be used by the receive end to identify whether a received coded packet is a system packet or a check packet, to replace the O/C field to implement a same function. Therefore, when each of the packet header of the system packet and the packet header of the check packet carries the coding coefficient index field, or when it may be determined, by using length information of the system packet and length information of the check packet, whether there is a system packet or a check packet, the O/C field may be omitted. In addition, a location of the non-zero element corresponds to a relative location of an original packet corresponding to the system packet in a coding window or a coding group. Therefore, the packet identifier field may also be omitted from the packet header of the system packet.

Functions of other fields are described in detail above. For brevity, details are not described herein.

FIG. 10 to FIG. 13 are schematic diagrams of several possible packet headers. It should be understood that the packet headers shown in FIG. 10 to FIG. 13 are applicable to a case in which the original packet quantity K is variable, and are also applicable to a case in which the original packet quantity K is fixed. This is not limited in embodiments.

Figures 10, 11, 12:
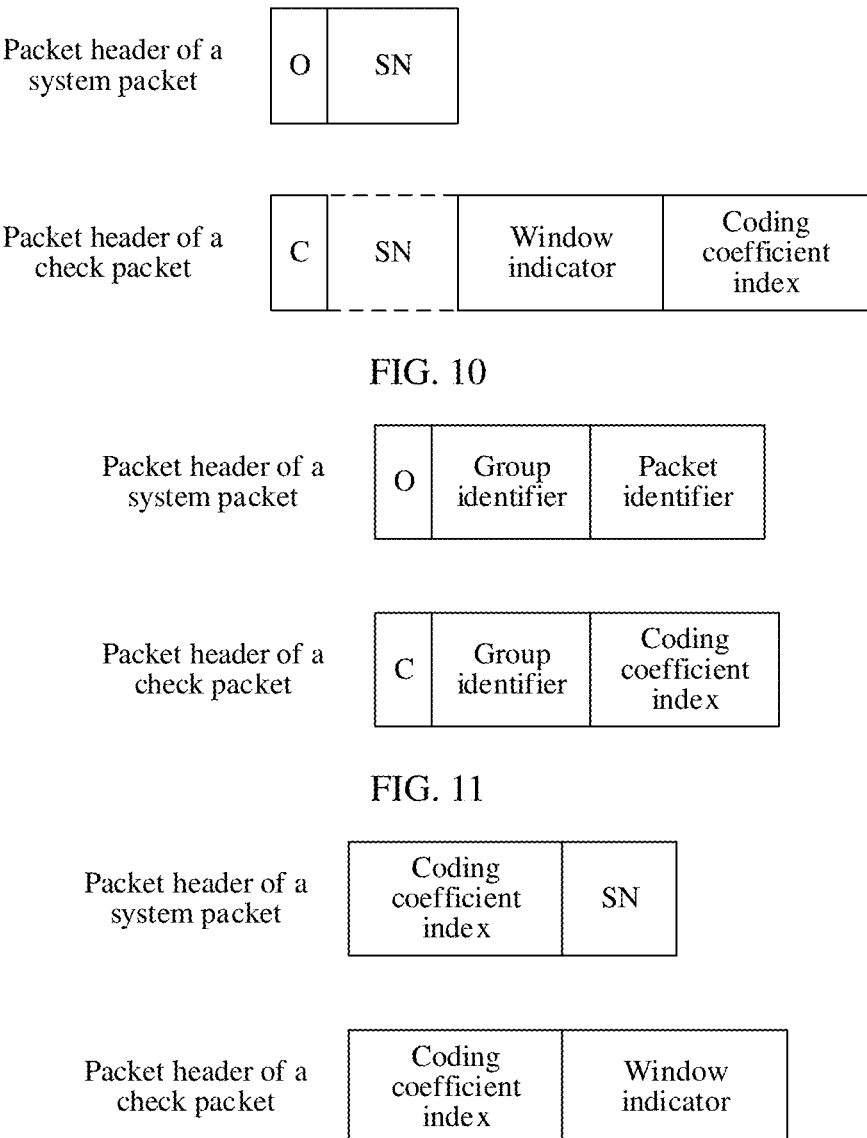
FIG. 10 is a schematic diagram of a packet header according to an embodiment.
FIG. 11 is a schematic diagram of a packet header according to an embodiment.
FIG. 12 is a schematic diagram of a packet header according to an embodiment.

As shown in FIG. 10, a packet header of a system packet includes an O field and an SN field; and a packet header of a check packet includes a C field, a window indicator field, and a coding coefficient index field. Optionally, the packet header of the check packet further includes an SN field.

As shown in FIG. 11, a packet header of a system packet includes an O field, a group identifier field, and a packet identifier field; and a packet header of a check packet includes a C field, a group identifier field, and a coding coefficient index field.

As shown in FIG. 12, a packet header of a system packet includes a coding coefficient index field and an SN field, and a packet header of a check packet includes a coding coefficient index field and a window indicator field.

Figures 13, 14:
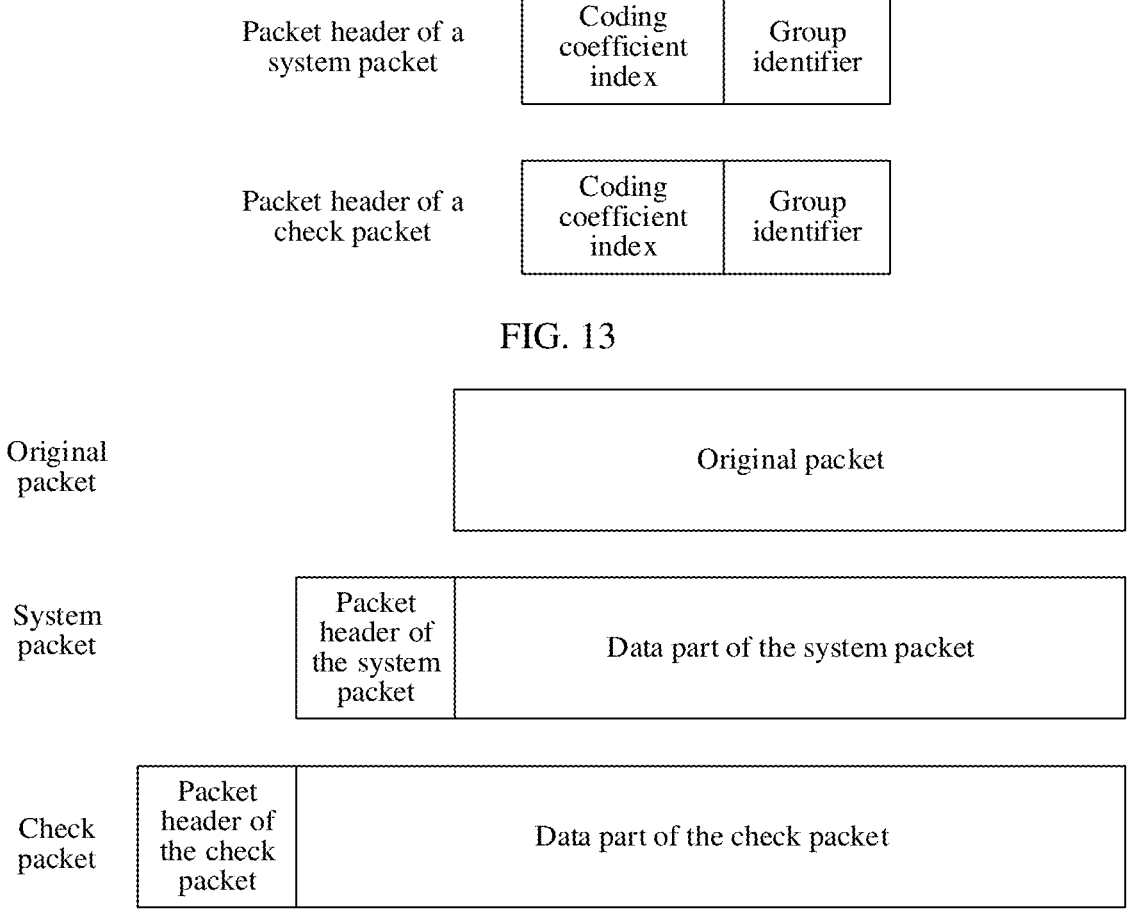
FIG. 13 is a schematic diagram of a packet header according to an embodiment.
FIG. 14 is a schematic diagram of an original packet, a system packet, and a check packet obtained by performing shift exclusive OR coding on the system packet.

As shown in FIG. 13, a packet header of a system packet includes a coding coefficient index field and a group identifier field; and a packet header of a check packet includes a coding coefficient index field and a group identifier field.

It should be understood that FIG. 10 to FIG. 13 show merely examples of several possible packet headers, and should not constitute any limitation on this embodiment. Any case in which the indication information of the original packet quantity K is omitted from the packet header of the check packet by using the relationship between the original packet quantity K and the coding coefficient index i shall fall within the scope of the embodiments.

Therefore, based on the foregoing implementation, when the transmit end generates the R check packets, even if the original packet quantity K is variable, the indication information of the coding coefficient and the indication information of the original packet quantity do not need to be simultaneously carried in a packet header of each check packet. By using the relationship between the original packet quantity K and the coding coefficient index i, the transmit end may indicate one of the coding coefficient and the original packet quantity, and even when the original packet quantity K is fixed, may omit the two pieces of information from the packet header. Therefore, limited spectrum resources are used for more data transmission to improve utilization of the spectrum resources.

3. The packet header of the coded packet may not include the indication information of the coded packet type, or the packet header of the coded packet does not include a coded packet type field, and the packet header of the check packet does not include the indication information of the coding coefficient. The coded packet includes a check packet and/or a system packet, and there is a correspondence between the coded packet type and a length of the coded packet or a length of a data part of the coded packet.

As described above, the coding coefficient of the system packet is a unit vector, and the coding coefficient of the check packet is a non-unit vector. For example, in coding coefficients used to generate the system packet, each group of coding coefficients includes a non-zero element. However, the coding coefficient of the check packet does not have this feature. The coding coefficient of the system packet and the coding coefficient of the check packet may be used by the receive end to identify whether a received coded packet is a system packet or a check packet.

Therefore, the coded packet type may be indicated by using an O field carried in the packet header of the system packet and a C field carried in the packet header of the check packet, or the coded packet type may be indicated by using the indication information of the coding coefficient carried in the packet header of the system packet and the indication information of the system packet carried in the packet header of the check packet. The indication information of the data packet type may include the O/C field or the indication information of the coding coefficient of the system packet and the indication information of the coding coefficient of the check packet. In a possible implementation, the indication information of the coding coefficient is carried in a coding coefficient index field.

Therefore, that the packet header of the coded packet may not include the indication information of the coded packet type includes: The packet header of the system packet does not include the O field, and the packet header of the check packet does not include the C field; and the packet header of the system packet does not include the indication information of the coding coefficient, and the packet header of the check packet does not include the indication information of the coding coefficient either. There is a correspondence between the coded packet type and the length of the coded packet or the length of the data part of the coded packet. As described above, a length of the check packet is different from a length of the system packet, and the check packet and the system packet may be distinguished by setting a length critical value. The coded packet type may be determined based on a value relationship between the length of the coded packet and the length critical value, or may be determined based on a value relationship between the length of the data part of the coded packet and the length critical value. The following performs analysis with reference to three different cases, to determine the length critical value.

Case 1: A packet header length of the check packet is the same as a packet header length of the system packet, and the check packet is obtained by performing shift exclusive OR coding based on the system packet.

Case 2: A packet header length of the check packet is the same as a packet header length of the system packet, and the check packet is obtained by performing shift exclusive OR coding based on the original packet.

Case 3: A packet header length of the check packet is greater than a packet header length of the system packet.

In the case 1, the check packet is obtained by performing shift exclusive OR coding based on the system packet. Therefore, a data length of the check packet is not less than the length of the system packet, and the length of the system packet is a sum of a data length of the system packet and the packet header length of the system packet. Therefore, the length of the check packet is not less than a sum of the length of the system packet and the packet header length of the check packet.

FIG. 14 shows an original packet, a system packet, and a check packet obtained by performing shift exclusive OR coding on the system packet. As shown in FIG. 14, a packet header length of the check packet is the same as a packet header length of the system packet, and a length of the check packet is greater than a length of the system packet. The length of the original packet and the packet header length of the system packet are predefined, the length of the system packet is the sum of the packet header length and the data length of the system packet, a data part of the system packet is the original packet, and the data length of the system packet is the length of the original packet. Therefore, the length of the system packet may be predetermined. Therefore, the length of the system packet may be used as the length critical value, and may be a sum of the packet header length of the system packet and the length of the original packet or a sum of the packet header length of the check packet and the length of the original packet. If the length of the received coded packet is greater than the length critical value, the coded packet is a check packet; or if the length of the received coded packet is equal to the length critical value, the coded packet is a system packet.

Alternatively, a data part of the check packet is the system packet, and therefore the data length of the check packet is not less than a sum of the packet header length of the system packet and the length of the original packet; and a data part of the system packet is the original packet, and therefore the data length of the check packet is greater than the data length of the system packet. Therefore, the length of the original packet may alternatively be used as the length critical value. If a length (such as a data length) obtained after a packet header length is subtracted from the received coded packet is greater than the length critical value, the coded packet is a check packet; or if a length obtained after a packet header length is subtracted from the received coded packet is equal to the length critical value, the coded packet is a system packet.

In the case 2, the check packet is obtained by performing shift exclusive OR coding based on the original packet. Therefore, a data length of the check packet is the length of the original packet. It may be understood from the foregoing description provided with reference to FIG. 6 that when all of displacement quantities defined by a group of coding coefficients are 0, the data length of the check packet is the length of the original packet. In addition, a data length of the system packet is also the length of the original packet, and the packet header length of the check packet is the same as the packet header length of the system packet. Therefore, the length of the check packet is the same as the length of the system packet.

Figure 15:
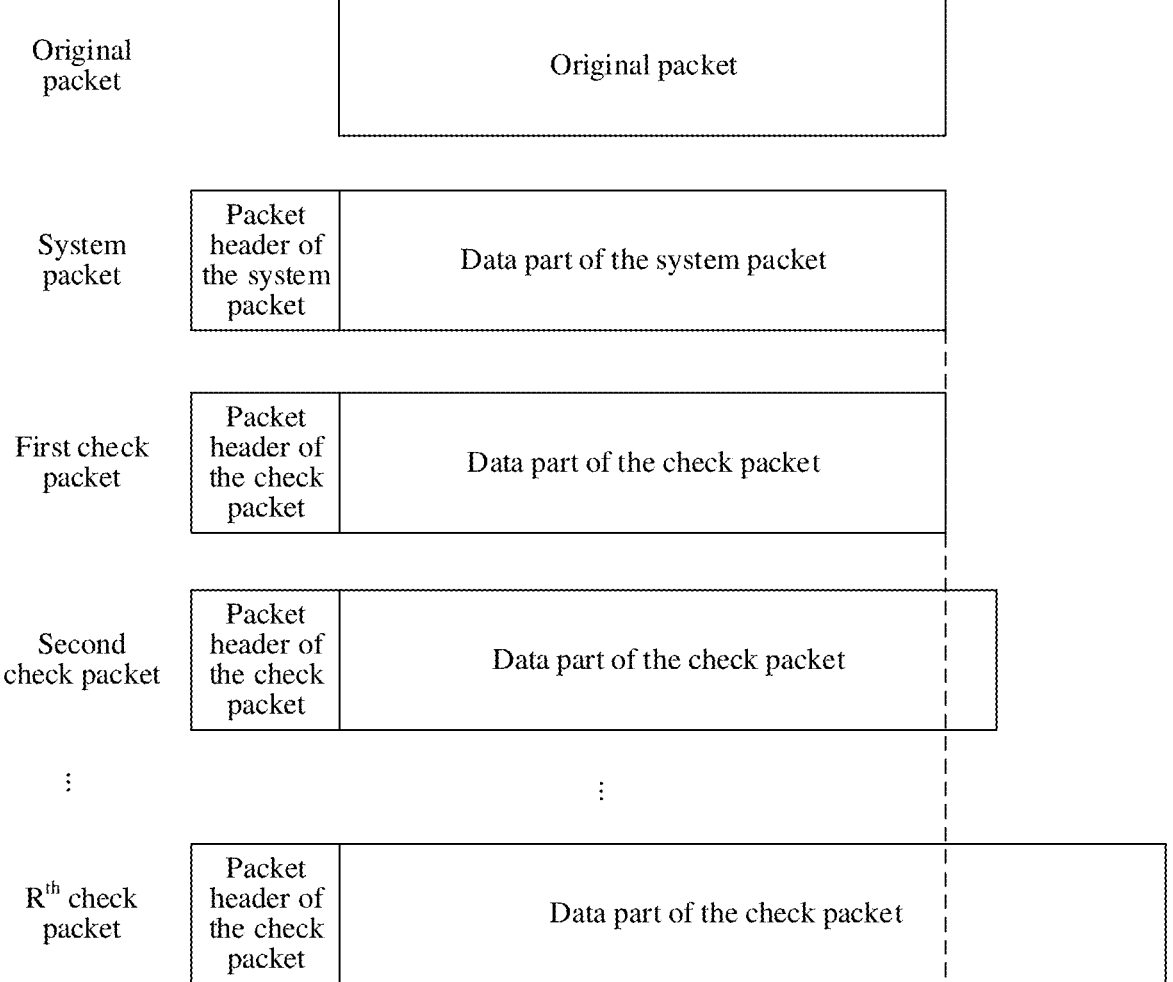
FIG. 15 is a schematic diagrams of an original packet, a system packet, and a check packet obtained by performing shift exclusive OR coding on the original packet.

FIG. 15 shows an original packet, a system packet, and R check packets obtained by performing shift exclusive OR coding on the original packet. As shown in the figure, if all of displacement quantities defined by coding coefficients used to generate a first check packet are 0, a length of the first check packet is the same as a length of the system packet. If all of displacement quantities defined by coding coefficients used to generate another check packet are not 0, a length of the check packet is greater than the length of the system packet.

However, if the coding coefficients are designed to implement that all of displacement quantities defined by any one of the R groups of coding coefficients are not 0, the data length of the check packet may be greater than the length of the original packet. In this way, the length of the check packet is greater than the length of the system packet.

In this case, the length of the system packet may still be used as the length critical value, and may be a sum of the packet header length of the system packet and the length of the original packet or a sum of the packet header length of the check packet and the length of the original packet. If the length of the received coded packet is greater than the length critical value, the coded packet is a check packet; or if the length of the received coded packet is equal to the length critical value, the coded packet is a system packet.

Alternatively, data of the check packet is obtained by performing shift exclusive OR coding on the original packet, and therefore a data length of the check packet is greater than the length of the original packet; and a data part of the system packet is the original packet, and therefore the data length of the check packet is greater than a data length of the system packet. Therefore, the length of the original packet may alternatively be used as the length critical value. If a length (such as a data length) obtained after a packet header length is subtracted from the received coded packet is greater than the length critical value, the coded packet is a check packet; or if a length obtained after a packet header length is subtracted from the received coded packet is equal to the length critical value, the coded packet is a system packet.

For example, to meet a requirement that all of the displacement quantities defined by the any one of the R groups of coding coefficients are not 0 in the case 2, when a generator matrix in a form of a Vandermonde matrix is used, a case in which a column of elements whose defined displacement quantities are all 0 is selected as a group of coding coefficients should be avoided.

For example, the listed matrix $H_V$ in a form of a Vandermonde matrix satisfies:

$$H_V = \begin{bmatrix} z^0 & z^0 & z^0 & \ldots & z^0 \\ z^0 & z^1 & z^2 & \ldots & z^{Q-1} \\ z^0 & z^2 & z^4 & \ldots & z^{2(Q-1)} \\ \vdots & \vdots & \vdots & \ddots & \vdots \\ z^0 & z^{P-1} & z^{2(P-1)} & \ldots & z^{(P-1)(Q-1)} \end{bmatrix}$$

In the case 2, a case in which a first column of elements in the generator matrix is selected as a group of coding coefficients should be avoided. For example, a second column of elements and another column of elements after the second column may be selected as coding coefficients.

In an example, a generator matrix determined based on the matrix $H_V$ is as follows:

$$G_V' = \begin{bmatrix} z^0 & z^0 & \ldots & z^0 & z^0 \\ z^1 & z^2 & \ldots & z^{R-1} & z^R \\ z^2 & z^4 & \ldots & z^{2(R-1)} & z^{2R} \\ \vdots & \vdots & \ddots & \vdots & \vdots \\ z^{K-1} & z^{2(K-1)} & \ldots & z^{(R-1)(K-1)} & z^{R(k-1)} \end{bmatrix}$$

Figure 16:
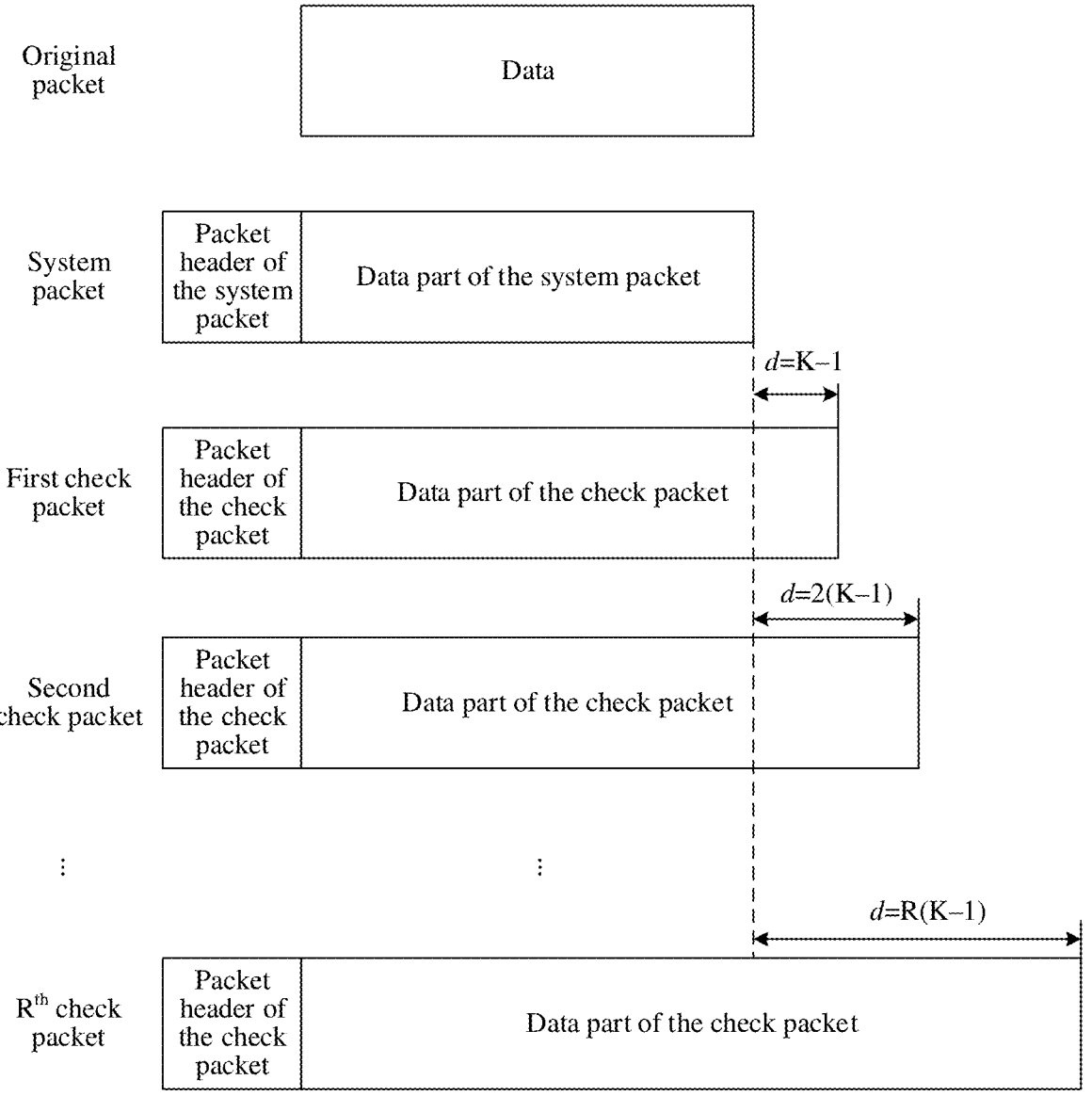
FIG. 16 is a schematic diagrams of an original packet, a system packet, and a check packet obtained by performing shift exclusive OR coding on the original packet.

Based on the generator matrix $G_V'$, differences between the length of the system packet and data lengths of the R check packets may be obtained, as shown in FIG. 16. Both the data part of the system packet and a data part of the check packet are the original packet, and both the data length of the system packet and the data length of the check packet are the length of the original packet. The length of the system packet is equal to the sum of the length of the original packet and the packet header length of the system packet (or the check packet). The differences between the length of the system packet and a length of the first check packet to a length of an $R^{th}$ check packet are respectively $K-1$, $2(K-1)$, ..., and $R(K-1)$ shift units. The length of the check packet is greater than the sum of the length of the original packet and the packet header length of the system packet (or the check packet).

In addition, because the packet header length of the check packet is the same as the packet header length of the system packet, a difference between the data length of the check packet and the length of the original packet is a difference between the length of the check packet and the length of the system packet. As shown in FIG. 16, a quantity of shift units included in the length difference between each check packet and the system packet is an integer multiple of K−1. This is exactly consistent with the correspondence between the R first values and the R groups of coding coefficients shown in Table 13, and is also consistent with the correspondence between the R index values and the R groups of coding coefficients shown in the last R rows Table 15 and Table 16.

That is, when shift exclusive OR coding is performed on the K original packets by using the generator matrix $G_V'$, both the indication information (which may be a coding coefficient index field) of the coding coefficient and the indication information (which may be a C field) of the coded packet type may be omitted from the packet header of the check packet, and the indication information (which may be an O field) of the coded packet type may be omitted from the packet header of the system packet. In other words, the implementation 1 and the implementation 3 described above may be used in combination.

It should be understood that $G_V'$ is another example of the generator matrix in a form of a Vandermonde matrix. Based on the foregoing principle, another generator matrix may be further determined based on the matrix $H_V$. For example, the generator matrix is determined based on any R columns of elements in a second column to a $Q^{th}$ column in the matrix $H_V$. For example, any R columns and any K rows of elements in a second column to a $Q^{th}$ column in the matrix $H_V$ are used as the generator matrix. Alternatively, a matrix including any R columns of elements and any K rows of elements in a second column to a $Q^{th}$ column in the matrix $H_V$ may be used as the generator matrix after at least one of the following types of transformation is performed: row switching transformation, column switching transformation, or row switching transformation performed on any one or more columns. This embodiment includes, but is not limited to this.

It should be further understood that the generator matrix is not limited to the listed structure in a form of a Vandermonde matrix. Provided that all of displacement quantities defined by each of the R groups of coding coefficients are greater than 0, the system packet and the check packet may be distinguished based on the length critical value.

In the case 3, because the packet header length of the check packet is greater than the packet header length of the system packet, even if a data length of the check packet is the same as a data length of the system packet, the length of the check packet is still greater than the length of the system packet. Therefore, regardless of whether the check packet is obtained by performing shift exclusive OR coding based on the original packet or obtained by performing shift exclusive OR coding based on the system packet, it may be obtained that the length of the check packet is greater than a sum of the data length of the system packet and the packet header length of the system packet.

Figure 17:
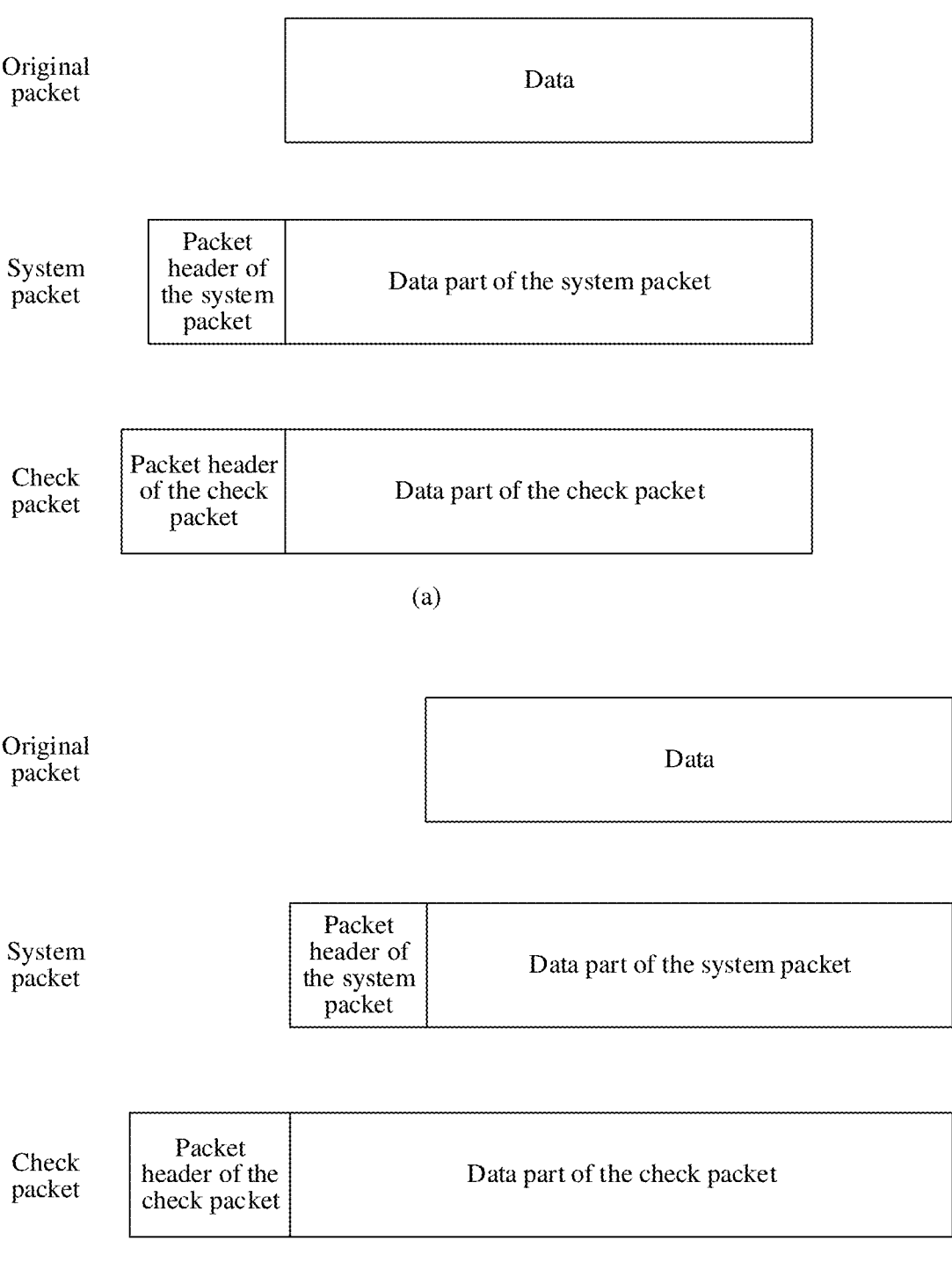
FIG. 17 is a schematic diagram of an original packet, a system packet, and a check packet obtained by performing shift exclusive OR coding on the system packet.

FIG. 17 shows an original packet, a system packet, and a check packet obtained by performing shift exclusive OR coding on the system packet.

As shown in (a) in FIG. 17, both a data length of the system packet and a data length of the check packet are a length of the original packet. A length of the system packet is equal to a sum of the length of the original packet and a packet header length of the system packet. A length of the check packet is a sum of the length of the original packet and a packet header length of the check packet. The packet header length of the check packet is greater than the packet header length of the system packet. Therefore, the length of the check packet is greater than the length of the system packet.

As shown in (b) in FIG. 17, a data length of the system packet is a length of the original packet, and a data length of the check packet is not less than a length of the system packet. That is, after shift exclusive OR coding is performed based on the system packet, a check packet header further needs to be added, and a length of the check packet is greater than the length of the system packet.

Therefore, the length of the system packet may be used as the length critical value, and may be a sum of the length of the original packet and the packet header length of the system packet. If the length of the received coded packet is greater than the length critical value, the coded packet is a check packet; or if the length of the received coded packet is equal to the length critical value, the coded packet is a system packet.

Alternatively, a sum of the length of the original packet and the packet header length of the check packet may be used as the length critical value. If the length of the received coded packet is greater than or equal to the length critical value, the coded packet is a check packet; or if the length of the received coded packet is less than the length critical value, the coded packet is a system packet.

It may be understood from the foregoing description provided with reference to the three different cases that corresponding length critical values are defined for different cases to distinguish between the system packet and the check packet. The transmit end may omit the O/C field from the packet header of the coded packet, or may omit the coding coefficient index field from the packet header of the system packet, that is, does not need to simultaneously use the packet header of the system packet and the packet header of the check packet to carry the coding coefficient field. Therefore, indication overheads can be reduced, and limited spectrum resources can be used for more data transmission to improve utilization of the spectrum resources.

Based on the foregoing implementation, the packet header of the system packet and the packet header of the check packet may not include information that may indicate a coded packet type, for example, an indication information field of the coded packet type, and/or at least one of the packet header of the check packet and the packet header of the system packet does not include the indication information of the coding coefficient. The coded packet includes a check packet and/or a system packet, and there is a correspondence between the coded packet type and the length of the coded packet. For implementations of fields included in the packet header of the check packet and the packet header of the system packet, refer to some existing solutions. This is not limited. The following provides several possible implementations for reference.

Figures 18, 19, 20, 21:
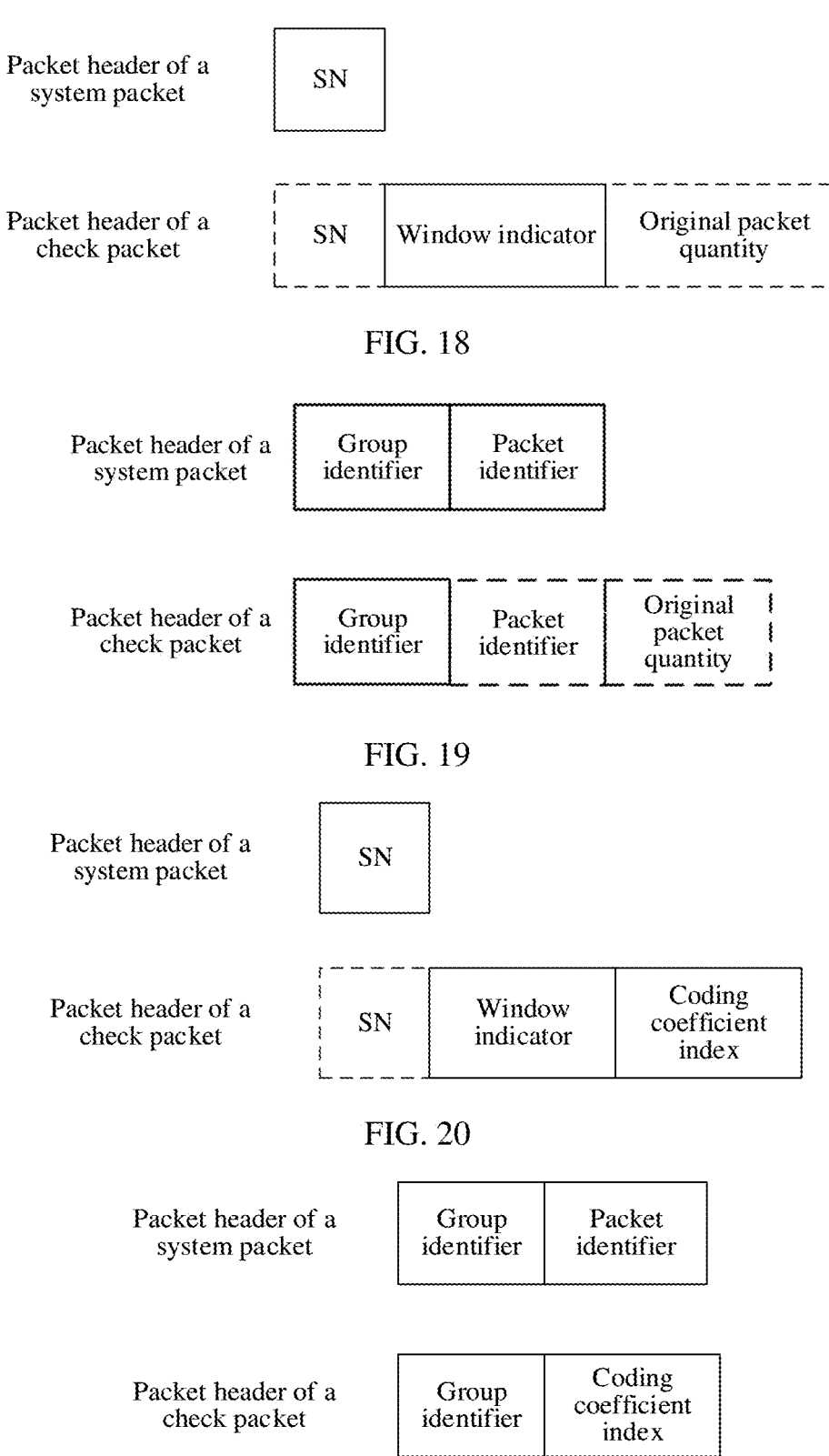
FIG. 18 is a schematic diagram of a packet header according to an embodiment.
FIG. 19 is a schematic diagram of a packet header according to an embodiment.
FIG. 20 is a schematic diagram of a packet header according to an embodiment.
FIG. 21 is a schematic diagram of a packet header according to an embodiment.

FIG. 18 to FIG. 20 are schematic diagrams of several possible packet headers.

As shown in FIG. 18, a packet header of a system packet includes an SN field; and a packet header of a check packet includes a window indicator field. Optionally, the packet header of the check packet further includes an SN field and/or an original packet quantity field. As shown in FIG. 19, a packet header of a system packet includes a group identifier field and a packet identifier field; and a packet header of a check packet includes a group identifier field. Optionally, the packet header of the check packet further includes a packet identifier field and/or an original packet quantity field.

The packet headers shown in FIG. 18 and FIG. 19 are obtained after the O/C field is removed from the packet headers shown above with reference to FIG. 8 and FIG. 9, or may be understood as a combination of the implementation 1 and the implementation 3. A function of each field is described in detail above. For brevity, details are not described herein.

As shown in FIG. 20, a packet header of a system packet includes an SN field; and a packet header of a check packet includes a window indicator field and a coding coefficient index field. Optionally, the packet header of the check packet further includes an SN field.

As shown in FIG. 21, a packet header of a system packet includes a group identifier field and a packet identifier field; and a packet header of a check packet includes a group identifier field, and a coding coefficient index field.

It should be understood that the packet headers shown in FIG. 20 and FIG. 21 are obtained after the O/C field is removed from the packet headers shown above with reference to FIG. 10 and FIG. 11, or may be understood as a combination of the implementation 2 and the implementation 3. A function of each field is described in detail above. For brevity, details are not described herein.

It should be further understood that FIG. 18 to FIG. 21 show merely examples of several possible packet headers, and should not constitute any limitation on this embodiment. Any case in which the check packet and the system packet are distinguished by defining the length critical value by using the difference between the length of the check packet and the length of the system packet to omit the O/C field from the packet header of the coded packet or to omit the coding coefficient index field from both the packet header of the check packet and the packet header of the system packet shall fall within the scope of this embodiment.

In step 730, the transmit end sends the K system packets and the R check packets.

Correspondingly, the receive end receives a plurality of coded packets.

It should be understood that the K system packets and the R check packets that are sent by the transmit end are all coded packets. The receive end needs to identify the received coded packet, to determine whether the received coded packet is a system packet or a check packet. In addition, not all the K+R coded packets sent by the transmit end can be successfully received by the receive end. For example, packet loss may occur. However, provided that a quantity of coded packets received by the receive end is greater than or equal to (or is not less than) K, the K original packets can be successfully obtained through decoding. In this embodiment, it is assumed that if the quantity of coded packets successfully received by the receive end is greater than K, the K original packets can be successfully obtained through decoding. Therefore, in step 730, corresponding to the transmit end, the receive end receives the plurality of coded packets.

In step 740, the receive end obtains the K original packets based on the plurality of coded packets.

It should be understood that the coded packets received by the receive end may be all system packets, may be all check packets, or may include at least one system packet and at least one check packet. This is not limited in embodiments.

It may be understood that a packet header of the system packet received by the receive end is consistent with that of the system packet sent by the transmit end in step 720; and a packet header of the check packet received by the receive end is consistent with that of the check packet sent by the transmit end in step 720. After receiving the plurality of coded packets, the receive may determine a coded packet type, a coding coefficient, an original packet quantity, and the like based on each field in the packet header of the system packet and/or the packet header of the check packet.

In step 720, a plurality of different implementations for the packet header are shown with reference to the accompanying drawings. For the foregoing implementation, a processing process of the receive end is described in detail herein.

For ease of description, it is assumed that the receive end receives U check packets, where U≤R, and U is an integer.

The U check packets and U groups of coding coefficients satisfy:

$$
\begin{bmatrix} y_1 \\ y_2 \\ \vdots \\ y_U \end{bmatrix}^T = \begin{bmatrix} x_1 \\ x_2 \\ \vdots \\ x_K \end{bmatrix}^T \begin{bmatrix} z^{t1,R_1} & z^{t1,R_2} & \ldots & z^{t1,R_U} \\ z^{t2,R_1} & z^{t2,R_2} & \ldots & z^{t2,R_U} \\ \vdots & \vdots & \ddots & \vdots \\ z^{tK,R_1} & z^{tK,R_2} & \ldots & z^{sK,R_U} \end{bmatrix}
$$

Herein, $y_1$ to $y_U$ represent data parts of the U check packets, and $x_1$ to $x_K$ represent K first data packets. A matrix $$
\begin{bmatrix} z^{t1,R_1} & z^{t1,R_2} & \ldots & z^{t1,R_U} \\ z^{t2,R_1} & z^{t2,R_2} & \ldots & z^{t2,R_U} \\ \vdots & \vdots & \ddots & \vdots \\ z^{tK,R_1} & z^{tK,R_2} & \ldots & z^{sK,R_U} \end{bmatrix}
$$

includes U columns. Each column includes a group of coding coefficients, and coding coefficients in each column are from K coding coefficients in a column vector in the P×Q-dimensional matrix $H_1$. An $(R_u)^{th}$ column includes K coding coefficients used to generate a $u^{th}$ check packet, where $1 \le u \le U$, $1 \le R_u \le Q$, and u and $R_u$ are integers. A data part of the $u^{th}$ check packet in the U check packets satisfies $$
y_u = z^{t1,R_u} x_1 \oplus z^{t2,R_u} x_2 \oplus \ldots \oplus z^{tK,R_u} x_K.
$$

It should be understood that the matrix $$
\begin{bmatrix} z^{t1,R_1} & z^{t1,R_2} & \ldots & z^{t1,R_U} \\ z^{t2,R_1} & z^{t2,R_2} & \ldots & z^{t2,R_U} \\ \vdots & \vdots & \ddots & \vdots \\ z^{tK,R_1} & z^{tK,R_2} & \ldots & z^{sK,R_U} \end{bmatrix}
$$

is U columns in the generator matrix $$
\begin{bmatrix} z^{t1,1} & z^{t1,2} & \ldots & z^{t1,R} \\ z^{t2,1} & z^{t2,2} & \ldots & z^{t2,R} \\ \vdots & \vdots & \ddots & \vdots \\ z^{tK,1} & z^{tK,2} & \ldots & z^{tK,R} \end{bmatrix}.
$$

Therefore, it may be understood that $R_u \le R$. In addition, the U columns in the generator matrix that correspond to the U columns in the matrix are not limited.

It may be understood from related descriptions of step 720 that lengths of the R check packets are different from each other. Therefore, lengths of the U check packets received by the receive end are different from each other, or lengths of any two of the U check packets are different.

The following separately describes a processing process of the receive end for the foregoing three implementations.

1. The packet header of the check packet does not include the indication information of the coding coefficient, and there is a correspondence between the length of the check packet or the length of the data part of the check packet and the coding coefficient.

As described above, although the packet header of the check packet does not include the indication information of the coding coefficient, the coding coefficient is related to the difference between the data length of the check packet and the length of the to-be-coded data packet. It is assumed that the receive end receives the U check packets, where U≤R, and U is an integer. Differences between the length of the to-be-coded data packet and data lengths of the U check packets are in a one-to-one correspondence with the U groups of coding coefficients. For example, if the U check packets are obtained by performing shift exclusive OR coding on the K original packets based on the U groups of coding coefficients, differences between the length of the original packet and the data lengths of the U check packets are in a one-to-one correspondence with the U groups of coding coefficients; or if the U check packets are obtained by performing shift exclusive OR coding on the K system packets based on the U groups of coding coefficients, differences between the length of the system packet and the data lengths of the U check packets are in a one-to-one correspondence with the U groups of coding coefficients.

The correspondence between the U groups of coding coefficients and the differences between the length of the original packet and the data lengths of the U check packets may be considered as a subset of the correspondence shown in any one of Table 5, Table 6, Table 7, Table 8, Table 11, and Table 13 in step 720. The correspondence between the U groups of coding coefficients and the differences between the length of the system packet and the data lengths of the U check packets may be considered as a subset of the correspondence shown in any one of Table 5, Table 6, Table 9, Table 10, Table 12, and Table 14 in step 720.

It should be understood that the receive end is unaware of the quantity R of check packets generated by the transmit end, and the correspondence stored by the receive end may be a correspondence designed for the Q predefined groups of coding coefficients, for example, as shown in Table 6, Table 8, or Table 10. It may be understood that when Q=R and P=K, the correspondence shown in Table 6 is the same as the correspondence shown in Table 5, the correspondence shown in Table 8 is the same as the correspondence shown in Table 7, and the correspondence shown in Table 10 is the same as the correspondence shown in Table 9.

In addition, if the U groups of coding coefficients are from the first K rows in the matrix $H_V$ in a form of a Vandermonde matrix, the receive end may further pre-store the correspondences shown in Table 11 to Table 14.

In an implementation, for example, the receive end may pre-store the correspondences shown in Table 6, Table 8, and Table 10 to Table 14. After the U check packets are received, a corresponding coding coefficient may be determined based on a difference between a data length of each check packet and the length of the to-be-coded data packet.

In another implementation, the receive end may alternatively selectively store the correspondences shown in some of Table 6, Table 8, and Table 10 to Table 14. Whether the transmit end performs shift exclusive OR coding on the original packet or performs shift exclusive OR coding on the system packet based on the U groups of coding coefficients is predefined, for example, predefined in a protocol, or negotiated by the transmit end and the receive end in advance. Therefore, when it is determined that the shift exclusive OR coding is performed on the original packet or the system packet, the receive end may select some correspondences for storage, for example, pre-store the correspondences shown in one or more of Table 6, Table 8, Table 11, or Table 13, or pre-store the correspondences shown in one or more of Table 6, Table 10, Table 12, or Table 14.

If the U check packets are obtained by performing shift exclusive OR coding on the K original packets based on the U groups of coding coefficients, the receive end may determine the coding coefficient based on a correspondence between the U groups of coding coefficients and U first values. The U first values and the data lengths of the U check packets are related to a data length of the original packet. For example, the U first values are quantities of shift units respectively included in differences between the data length of the original packet and the data lengths of the U check packets; or the U first values are ratios of quantities of shift units respectively included in differences between the data length of the original packet and the data lengths of the U check packets to a displacement reference quantity.

After receiving the U check packets, the receive end may calculate the difference between the data length of each check packet and the length of the original packet, and determine the coding coefficient based on the correspondence shown in Table 6; may further determine a quantity (that is, an example of the first value) of shift units included in the length difference, and determine the coding coefficient based on the correspondence shown in Table 8; or may determine a ratio (that is, another example of the first value) of a quantity of shift units to the displacement reference quantity, and further determine the coding coefficient based on, for example, the correspondence shown in Table 11 or Table 13.

If the U check packets are obtained by performing shift exclusive OR coding on the K system packets based on the U groups of coding coefficients, the receive end may determine the coding coefficient based on a correspondence between the U groups of coding coefficients and U second values. The U second values and the data lengths of the U check packets are related to a data length of the system packet. For example, the U second values are quantities of shift units respectively included in differences between the data length of the system packet and the data lengths of the U check packets; or the U second values are ratios of quantities of shift units respectively included in differences between the data length of the system packet and the data lengths of the U check packets to a displacement reference quantity.

A specific process in which the receive end may determine the U groups of coding coefficients based on the correspondence between the U groups of coding coefficients and the U second values is similar to the foregoing example process of determining the U groups of coding coefficients based on the correspondence between the U groups of coding coefficients and the U first values. For example, the receive end may determine the coding coefficients by using the correspondence shown in Table 6, Table 10, Table 12, or Table 14. For brevity, details are not described herein.

Therefore, even if the packet header of the check packet does not include the indication information of the coding coefficient, the receive end can still determine the coding coefficient corresponding to each check packet.

2. The packet header of the check packet includes the indication information of the coding coefficient, but does not include the indication information of the original packet quantity K, and there is a correspondence between the original packet quantity K and the indication information of the coding coefficient.

It should be understood that the original packet quantity K is important for determining the coding coefficient and decoding. For example, when each of the Q predefined groups of coding coefficients includes more than K coding coefficients, the receive end needs to determine the coding coefficient based on the original packet quantity K. In addition, if the receive end cannot determine the original packet quantity, decoding may not be successfully performed.

In this embodiment, although the packet header of the check packet does not include the indication information of the original packet quantity K, when the transmit end performs shift exclusive OR coding by using the R groups of coding coefficients determined based on the first K rows of elements in the matrix $H_r$ in a form of a Vandermonde matrix, there is a correspondence between a coding coefficient index and the original packet quantity K. That is, the U groups of coding coefficients corresponding to the U check packets received by the receive end are also from U columns in the first K rows in the matrix $H_r$.

As described above, the original packet quantity K and the coding coefficient index i meet K=d/i+1 or K=w/i+1. Herein, K=d/i+1 may be used in a case in which the check packet is obtained by performing shift exclusive OR coding on the original packet, and K=w/i+1 may be used in a case in which the check packet is obtained by performing shift exclusive OR coding on the system packet.

For ease of understanding, it is assumed that the U check packets are obtained by performing shift exclusive OR coding on the K original packets based on the U groups of coding coefficients. After receiving the U check packets, the receive end may calculate a quantity d of shift units included in a difference between a data length of each check packet and the length of the original packet, and then calculate K based on the coding coefficient index i carried in a packet header by using K=d/i+1.

It should be understood that if the U check packets are obtained by performing shift exclusive OR coding on the K system packets based on the U groups of coding coefficients, K may be determined based on a same principle by using K=w/i+1. For brevity, details are not described herein.

Therefore, even if the packet header of the check packet does not include the indication information of the original packet quantity K, the receive end can still determine the original packet quantity K, and further determine the U groups of coding coefficients.

3. The packet header of the coded packet does not include the indication information of the coded packet type, or the packet header of the coded packet does not include the coded packet type field, and the packet header of the check packet does not include the indication information of the coding coefficient. The coded packet includes a check packet and/or a system packet, and there is a correspondence between the coded packet type and a length of the coded packet or a length of a data part of the coded packet.

As described above, the receive end may identify the system packet and the check packet based on a relationship between the length of the received coded packet and the length critical value. It should be noted that a relationship between the packet header length of the check packet and the packet header length of the system packet may be predefined. Whether the check packet is obtained by performing shift exclusive OR coding based on the original packet or is obtained by performing shift exclusive OR coding based on the system packet may also be predefined, for example, may be predefined in a protocol. Therefore, the receive end may predetermine to use the length critical value defined in a specific case in the foregoing three cases to identify the system packet and the check packet.

In a possible case, if the packet header length of the check packet is equal to the packet header length of the system packet, the check packet is obtained by performing shift exclusive OR coding based on the K original packets, and all of the displacement quantities defined by the coding coefficients in each group of coding coefficients used to generate the U check packets are not 0, the length critical value may be the length of the original packet. That is, the data length of the check packet is greater than the length of the original packet, and the data length of the system packet is equal to the length of the original packet. Alternatively, the length critical value may be the sum of the length of the original packet and the packet header length of the system packet. That is, the length of the check packet is greater than the sum of the length of the original packet and the packet header length of the system packet, and the length of the system packet is equal to the sum of the length of the original packet and the packet header length of the system packet.

In another possible case, if the packet header length of the check packet is equal to the packet header length of the system packet, and the check packet is obtained by performing shift exclusive OR coding based on the K system packets, the length critical value may be the length of the original packet. That is, the data length of the check packet is greater than the length of the original packet, and the data length of the system packet is equal to the length of the original packet. Alternatively, the length critical value may be a sum of the length of the original packet and the length of the system packet. That is, the length of the check packet is greater than the sum of the length of the original packet and the packet header length of the system packet, and the length of the system packet is equal to the sum of the length of the original packet and the packet header length of the system packet.

In still another possible case, if the packet header length of the check packet is greater than the packet header length of the system packet, the length critical value may be the sum of the length of the original packet and the packet header length of the system packet. That is, the length of the check packet is greater than the sum of the length of the original packet and the packet header length of the system packet, and the length of the system packet is equal to the sum of the length of the original packet and the packet header length of the system packet. Alternatively, the length critical value may be the sum of the length of the original packet and the packet header length of the check packet. That is, the length of the check packet is greater than or equal to the sum of the length of the original packet and the packet header length of the check packet, and the length of the system packet is less than the sum of the length of the original packet and the packet header length of the check packet.

In the three different cases described above, the length critical value and the length of the system packet and the check packet are separately described in detail with reference to the accompanying drawings. For brevity, details are not described herein.

Based on the foregoing processing, the receive end may identify the system packet and the check packet, and determine the coding coefficient of each check packet and the original packet quantity K, and the receive end may further perform decoding based on the plurality of received coded packets, to obtain the K original packets.

In a possible case, if the check packet received by the receive end is obtained by performing shift exclusive OR coding based on the original packet, the receive end may perform decoding based on the plurality of received coded packets, to obtain the K original packets.

For ease of description, a possible implementation of restoring the K original packets is described by using the foregoing process of generating the check packet shown above with reference to Table 1 as an example. In this example, it is assumed that the original packet quantity K is 3, one system packet and two check packets are received, the received system packet corresponds to an original packet $x_1$, and data parts of the received check packets are $y_1$ and $y_2$.

The original packet may be obtained by directly removing a packet header of the system packet. Therefore, the original packet $x_1$ may be obtained based on the received system packet, that is, $x_{1,1}$ to $x_{1,M}$ may be obtained. With reference to Table 3, $y_{2,2} = x_{1,2} \oplus x_{2,1}$, and $x_{1,2}$ and $y_{2,2}$ are known, and therefore $x_{2,1}$ may be deduced; with reference to Table 2, $y_{1,1} = x_{1,1} \oplus x_{2,1} \oplus x_{3,1}$, and $x_{1,2}$, $x_{2,1}$, and $y_{1,1}$ are known, and therefore $x_{3,1}$ may be deduced; with reference to Table 3, $y_{2,3} = x_{1,3} \oplus x_{2,2} \oplus x_{3,1}$, and $x_{1,3}$, $x_{3,1}$, and $y_{2,3}$ are known, and therefore $x_{2,2}$ may be deduced; and by analogy, original packets $x_2$ and $x_3$ may be deduced. It should be understood that a process of obtaining the original packet based on the check packet and the coding coefficient and a process of obtaining the check packet based on the original packet and the coding coefficient are reversible. For brevity, details are not described herein. The receive end may obtain the K original packets based on a shift exclusive OR coding relationship that is between the check packet and the original packet and that is based on the coding coefficient.

In another possible case, the check packet received by the receive end is obtained by performing shift exclusive OR coding based on the system packet. In a possible implementation, the receive end performs decoding based on the plurality of received coded packets, to obtain the K system packets, and then removes a packet header of the system packet, to obtain the K original packets.

It should be understood that a manner in which the receive end performs decoding based on the plurality of received coded packets, to obtain the K system packets is similar to the manner that is of restoring the K original packets and that is described with reference to Table 1. For brevity, details are not described herein.

Based on the foregoing solution, by using the correspondence between the coding coefficient and the difference between the data length of the check packet and the length of the to-be-coded data packet, the relationship between the coding coefficient and the original packet quantity K, and the difference between the length of the check packet and the length of the system packet, the transmit end omits fields that originally need to be carried in the packet header of the coded packet, for example, a coding coefficient index field, an original packet quantity field, and an O/C field. Therefore, indication overheads are reduced without affecting decoding, and limited spectrum resources are used for more data transmission to improve utilization of the spectrum resources.

The data transmission method and the data receiving method provided in embodiments are described in detail above with reference to FIG. 7 to FIG. 21. A communication apparatus provided in embodiments is described in detail below with reference to FIG. 22 and FIG. 23.

Figure 22:
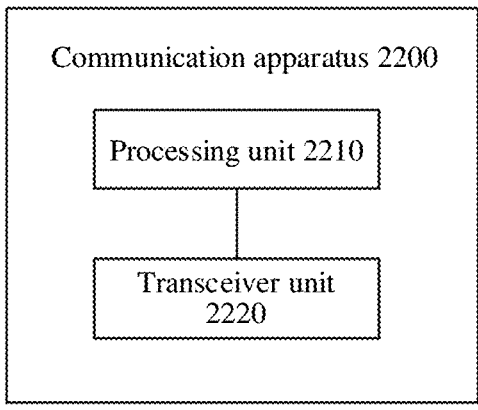
FIG. 22 is a schematic diagram of a communication apparatus according to an embodiment.

FIG. 22 is a schematic block diagram of a communication apparatus according to an embodiment. As shown in FIG. 22, the communication apparatus 2200 may include a processing unit 2210 and a transceiver unit 2220.

In a possible implementation, the communication apparatus 2200 may correspond to the transmit end in the foregoing method embodiments, for example, may be a transmit end, or may be a component (for example, a chip or a chip system) disposed in a transmit end. The units in the apparatus 2200 may be configured to implement the corresponding procedure performed by the transmit end in the method 700 shown in FIG. 7. For example, the processing unit 2210 may be configured to perform step 710 and step 720 in the method 700, and the transceiver unit 2220 may be configured to perform step 730 in the method 700.

For example, the processing unit 2210 may be configured to obtain K original packets, where lengths of the K original packets are the same, and K>1 and is an integer; and may be further configured to perform shift exclusive OR coding based on a coding coefficient and the K original packets, to obtain a check packet, where a packet header of the check packet does not include indication information of the coding coefficient, the coding coefficient of the check packet corresponds to a length difference, the length difference includes a difference between a data length of the check packet and the length of the original packet or a difference between a data length of the check packet and a length of a system packet, and the system packet corresponds to the original packet; and the transceiver unit 2220 may be configured to send the check packet.

In another possible implementation, the communication apparatus 2200 may correspond to the receive end in the foregoing method embodiments, for example, may be a receive end, or may be a component (for example, a chip or a chip system) disposed in a receive end. The units in the apparatus 2200 may be configured to implement the corresponding procedure performed by the receive end in the method 700 shown in FIG. 7. For example, the transceiver unit 2220 may be configured to perform step 730 in the method 700, and the processing unit 2210 may be configured to perform step 740 in the method 700. For example, the transceiver unit 2220 may be configured to receive a plurality of coded packets, where the plurality of coded packets include a check packet, and a packet header of the check packet does not include indication information of a coding coefficient; the processing unit 2210 may be configured to determine the coding coefficient based on the check packet, where the coding coefficient corresponds to a length difference, the length difference includes a difference between a data length of the check packet and a length of an original packet or a difference between a data length of the check packet and a length of a system packet, and the original packet corresponds to the system packet; and the processing unit 2210 may be further configured to obtain K original packets based on the plurality of coded packets and the coding coefficient, where lengths of the K original packets are the same, the check packet includes data obtained by performing shift exclusive OR coding on the K original packets based on the coding coefficient, and K>1 and is an integer.

It should be understood that a specific process in which the units perform the foregoing corresponding steps is described in detail in the foregoing method embodiments. For brevity, details are not described herein.

It should be further understood that in embodiments, division into modules is an example, and is merely logical function division. In actual implementation, there may be another division manner. In addition, functional modules in embodiments may be integrated into one processor, each module may exist alone physically, or two or more modules may be integrated into one module. The integrated module may be implemented in a form of hardware, or may be implemented in a form of a software functional module.

It should be understood that the communication apparatus 2200 may correspond to the base station 310 or the terminal 320 in the communication system shown in FIG. 3. The base station 310 may be an example of a transmit end, and the terminal 320 may be an example of a receive end; or the terminal 320 may be another example of a transmit end, and the base station 310 may be another example of a receive end. The processing unit 2210 in the communication apparatus 2200 may correspond to a processor in the base station 310 or the terminal 320, and may invoke, by using the processor in the base station 310 or the terminal 320, instructions stored in a memory, to implement the foregoing functions, for example, functions such as network coding and original packet obtaining. The transceiver unit 2220 may correspond to an interface in the base station 310 or the terminal 320, and may implement, in response to instructions of the processor, the foregoing functions of receiving and/or sending data.

For example, when the base station 310 is a transmit end, and the terminal 320 is a receive end, the processor 312 in the base station 310 may be configured to perform step 710 and step 720 in the method 700, the interface 311 may be configured to perform step 730 in the method 700, the interface 322 in the terminal 320 may be configured to perform step 730 in the method 700, and the processor 322 may be configured to perform step 740 in the method 700.

When the terminal 320 is a transmit end, and the base station 310 is a receive end, the processor 322 in the terminal 320 may be configured to perform step 710 and step 720 in the method 700, the interface 322 may be configured to perform step 730 in the method 700, the interface 311 in the base station 310 may be configured to perform step 730 in the method 700, and the processor 312 may be configured to perform step 740 in the method 700.

It should be understood that a specific process in which the units perform the foregoing corresponding steps is described in detail in the foregoing method embodiments. For brevity, details are not described herein.

Figure 23:
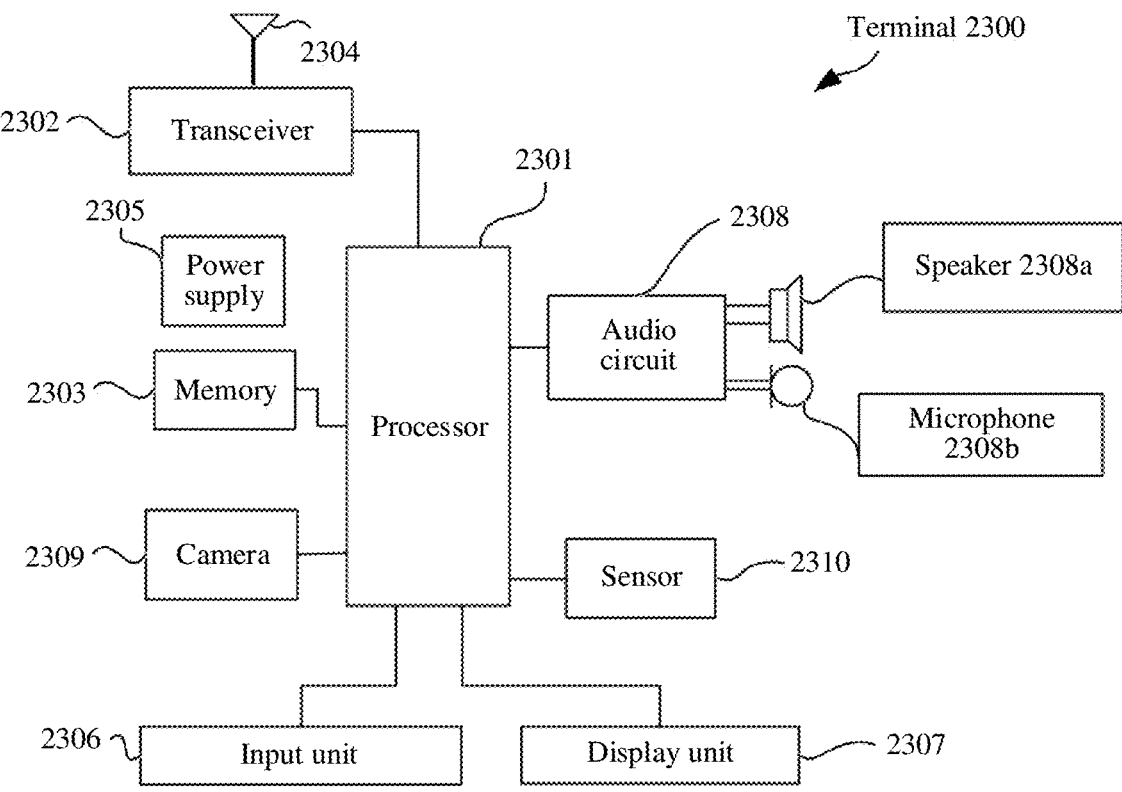
FIG. 23 is a schematic diagram of a terminal device according to an embodiment.

FIG. 23 is a schematic diagram of a possible structure of a terminal according to an embodiment. The terminal may be used in the systems shown in FIG. 1, FIG. 2, and FIG. 3. As shown in FIG. 23, the terminal 2300 includes a processor 2301 and a transceiver 2302. Optionally, the terminal 2300 further includes a memory 2303. The processor 2301, the transceiver 2302, and the memory 2303 may communicate with each other through an internal connection path, and transfer a control signal and/or a data signal. The memory 2303 is configured to store a computer program, and the processor 2301 is configured to: invoke the computer program from the memory 2303 and run the computer program, to control the transceiver 2302 to transmit or receive a signal. Optionally, the terminal 2300 may further include an antenna 2304, configured to send, by using a radio signal, uplink data or uplink control signaling output by the transceiver 2302.

The processor 2301 and the memory 2303 may be combined into one processing apparatus, and the processor 2301 is configured to execute program code stored in the memory 2303, to implement the foregoing functions. In specific implementation, the memory 2303 may alternatively be integrated into the processor 2301, or may be independent of the processor 2301. The processor 2301 may correspond to the processor in FIG. 3 or the processing unit 2210 in FIG. 22.

The transceiver 2302 may correspond to the interface in FIG. 3 or the transceiver unit 2220 in FIG. 22. The transceiver 2302 may include a receiver (or referred to as a receiver machine or a receiver circuit) and a transmitter (or referred to as a transmitter machine or a transmitter circuit). The receiver is configured to receive a signal, and the transmitter is configured to transmit a signal.

Optionally, the terminal 2300 may further include a power supply 2305, configured to supply power to various devices or circuits in the terminal 2300.

In addition, to improve functions of the terminal device, the terminal 2300 may further include one or more of an input unit 2306, a display unit 2307, an audio circuit 2308, a camera 2309, a sensor 2310, and the like. The audio circuit may further include a speaker 2308*a*, a microphone 2308*b*, and the like.

It should be understood that the terminal 2300 shown in FIG. 23 can implement processes performed by the transmit end or processes performed by the receive end in the method embodiment shown in FIG. 7. Operations and/or functions of the modules in the terminal 2300 are respectively intended to implement the corresponding procedures in the foregoing method embodiments. For details, refer to the descriptions in the foregoing method embodiments. To avoid repetition, detailed descriptions are properly omitted herein.

In embodiments, it should be noted that the foregoing method embodiments may be applied to a processor, or may be implemented by a processor. The processor may be an integrated circuit chip and has a signal processing capability. In an implementation process, the steps in the foregoing method embodiments may be completed by using an integrated logic circuit of hardware in the processor, or by using instructions in a form of software. The processor may be a general-purpose processor, a DSP, an ASIC, an FPGA or another programmable logical device, a discrete gate or a transistor logic device, or a discrete hardware component. The processor may implement or perform the methods, steps, and logical block diagrams that are in embodiments. The general-purpose processor may be a microprocessor, or the processor may be any conventional processor or the like. The steps of the methods with reference to embodiments may be directly performed and completed by a hardware decoding processor, or may be performed and completed by using a combination of a hardware module in a decoding processor and a software module. The software module may be located in a mature storage medium in the art, for example, a random access memory, a flash memory, a read-only memory, a programmable read-only memory, an electrically erasable programmable memory, or a register. The storage medium is located in the memory, and the processor reads information in the memory, and completes the steps of the foregoing methods in combination with the hardware in the processor.

It may be understood that the memory in embodiments may be a volatile memory or a nonvolatile memory, or may include a volatile memory and a nonvolatile memory. The nonvolatile memory may be a ROM, a PROM, an EPROM, an EEPROM, or a flash memory. The volatile memory may be a RAM, and serves as an external cache. Based on descriptions used as an example instead of a limitation, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM). It should be noted that the memory in the system and method described in embodiments includes, but is not limited to, these memories and any memory of another proper type.

The embodiments include a chip system. The chip system includes at least one processor, configured to support implementation of a function of the transmit end or a function of the receive end in any one of the foregoing method embodiments, for example, receiving, sending, or processing of data and/or information in the foregoing method.

In a possible implementation, the chip system further includes a memory. The memory is configured to store program instructions and data. The memory is located inside or outside the processor.

The chip system may include a chip, or may include a chip and another discrete device.

This embodiments further provide a computer program product. The computer program product includes a computer program (which may also be referred to as code or instructions). When the computer program is run, a computer is enabled to perform the method performed by the transmit end or the method performed by the receive end in the embodiment shown in FIG. 7.

The embodiments further provide a non-transitory computer-readable storage medium. The non-transitory computer-readable storage medium stores a computer program (which may also be referred to as code or instructions). When the computer program is run, a computer is enabled to perform the method performed by the transmit end or the method performed by the receive end in the embodiment shown in FIG. 7.

The embodiments further provide a communication system. The communication system includes the foregoing transmit end and the foregoing receive end.

All or some of the methods provided in the foregoing embodiments may be implemented by software, hardware, firmware, or any combination thereof. When software is used for implementation, all or some of the methods may be implemented in a form of a computer program product. The computer program product may include one or more computer instructions. When the computer program instructions are loaded and executed on a computer, all or some of the procedures or functions according to embodiments are generated. The computer may be a general-purpose computer, a dedicated computer, a computer network, or another programmable apparatus. The computer instructions may be stored in a non-transitory computer-readable storage medium, or may be transmitted from a non-transitory computer-readable storage medium to another non-transitory computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The non-transitory computer-readable storage medium may be any usable medium accessible by the computer, or a data storage device, for example, a server or a data center, into which one or more usable media are integrated. The usable medium may be a magnetic medium (for example, a floppy disk, a hard disk, or a magnetic disk), an optical medium (for example, a DVD), a semiconductor medium (for example, a solid-state drive (solid-state drive, SSD)), or the like.

A person of ordinary skill in the art may be aware that the example units, algorithms, and steps described with reference to embodiments in the embodiments can be implemented by electronic hardware or a combination of computer software and electronic hardware. Whether the functions are performed by hardware or software depends on particular applications and design constraints of the solutions. A person skilled in the art may use different methods to implement the described functions for each particular application, but it should not be considered that the implementation goes beyond the scope of the embodiments.

It may be clearly understood by a person skilled in the art that for convenient and brief description, for detailed working processes of the system, apparatus, and unit described above, refer to the corresponding processes in the foregoing method embodiments. Details are not described herein.

In the several embodiments provided, it should be understood that the system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located at one location, or may be distributed on a plurality of network units. Some or all of the units may be selected based on actual requirements to achieve the objectives of the solutions in embodiments.

In addition, functional units in embodiments may be integrated into one processing unit, each unit may exist alone physically, or two or more units may be integrated into one unit.

When the functions are implemented in a form of a software functional unit and sold or used as an independent product, the functions may be stored in a non-transitory computer-readable storage medium. Based on such an understanding, the solutions in the embodiments essentially, or the part contributing to the conventional technology, or some of the solutions may be implemented in a form of a software product. The computer software product is stored in a non-transitory storage medium, and includes several instructions for instructing a computer device (which may be a personal computer, a server, a network device, or the like) to perform all or some of the steps of the methods described in embodiments. The non-transitory storage medium includes any medium that can store program code, for example, a USB flash drive, a removable hard disk, a read-only memory, a random access memory, a magnetic disk, or an optical disc.

The foregoing descriptions are merely specific implementations, but the scope of the embodiments is not limited thereto. Any variation or replacement readily figured out by a person skilled in the art shall fall within the scope of the embodiments.

What is claimed is:

1. A method, comprising:

obtaining K to-be-coded data packets, wherein lengths of the K to-be-coded data packets are the same, and K>1 and is an integer;

performing shift exclusive OR coding based on a coding coefficient and the K to-be-coded data packets, to obtain a check packet, wherein a packet header of the check packet does not comprise indication information of the coding coefficient, the coding coefficient of the check packet corresponds to a difference between a data length of the check packet and the length of the to-be-coded data packet, and the K to-be-coded data packets comprise K original packets or K system packets corresponding to the K original packets; and sending the check packet.

2. The method according to claim 1, wherein the check packet is any one of R check packets obtained by performing shift exclusive OR coding based on R groups of coding coefficients and the K to-be-coded data packets, each of the R check packets corresponds to one of the R groups of coding coefficients, and R≥1 and is an integer; and the R check packets are obtained by performing shift exclusive OR coding on the K to-be-coded data packets based on the R groups of coding coefficients, the R groups of coding coefficients are in a one-to-one correspondence with R values, and the R values respectively correspond to differences between the length of the to-be-coded data packet and data lengths of the R check packets.

3. The method according to claim 2, wherein the R values respectively corresponding to differences between the length of the to-be-coded data packet and data lengths of the R check packets comprises:

the R values are respectively quantities of shift units comprised in the differences between the length of the to-be-coded data packet and the data lengths of the R check packets.

4. The method according to claim 2, wherein the R values respectively corresponding to differences between the length of the to-be-coded data packet and data lengths of the R check packets comprises:

the R values are respectively ratios of quantities of shift units comprised in the differences between the length of the to-be-coded data packet and the data lengths of the R check packets to a displacement reference quantity, wherein the displacement reference quantity is a greatest common divisor of largest displacement quantities respectively defined by different columns of coding coefficients in K rows of coding coefficients in a predefined P×Q-dimensional matrix that correspond to the R groups of coding coefficients, P≥K, Q≥R, and P and Q are integers.

5. The method according to claim 4, wherein the P×Q-dimensional matrix $H_V$ satisfies:

$$H_V = \begin{bmatrix} z^0 & z^0 & z^0 & \ldots & z^0 \\ z^0 & z^1 & z^2 & \ldots & z^{Q-1} \\ z^0 & z^2 & z^4 & \ldots & z^{2(Q-1)} \\ \vdots & \vdots & \vdots & \ddots & \vdots \\ z^0 & z^{P-1} & z^{2(P-1)} & \ldots & z^{(P-1)(Q-1)} \end{bmatrix},$$

wherein a group of coding coefficients used to generate one of the R check packets is from K coding coefficients $[z^{(i-1)(q-1)} \, z^{i(q-1)} \ldots z^{(i+K-2)(q-1)}]^T$ in a $q^{th}$ column in the matrix $H_V$, $1 \le i \le (P-K+1)$, $1 \le q \le Q$, and q are integers; and a data part $y_q$ of the check packet satisfies $y_q = z^{(i-1)(q-1)} x_1 \oplus z^{i(q-1)} x_2 \oplus \ldots \oplus z^{(i+K-2)(q-1)} x_K$, $\oplus$ represents exclusive OR processing, $x_1, x_2, \ldots,$ and $x_K$ represent the K to-be-coded data packets, $z^t$ represents that data multiplied by $z^t$ is shifted by t shift units, $0 \le t \le (P-1)(Q-1)$, and t is an integer.

6. The method according to claim 2, wherein when R>1, lengths of any two of the R check packets are different.

7. The method according to claim 1, wherein the check packet is one of a plurality of coded packets obtained by performing shift exclusive OR coding on the K to-be-coded data packets based on a plurality of groups of coding coefficients, a packet header of each of the plurality of coded packets does not comprise indication information of a coded packet type, or a packet header of each of the plurality of coded packets does not comprise a coded packet type field, there is a correspondence between the coded packet type and a length of the coded packet or a length of a data part of the coded packet, and the coded packet type comprises a check packet or a system packet.

8. The method according to claim 7, wherein the correspondence between the coded packet type and the length of the coded packet or the length of the data part of the coded packet comprises:

a length of the check packet is greater than a sum of a length of the original packet and a packet header length of the system packet, and a length of the system packet is equal to the sum of the length of the original packet and the packet header length of the system packet; or a length of the check packet is greater than or equal to a sum of a length of the original packet and a packet header length of the check packet, and a length of the system packet is less than the sum of the length of the original packet and the packet header length of the check packet; and the packet header length of the check packet is greater than the packet header length of the system packet.

9. The method according to claim 7, wherein the correspondence between the coded packet type and the length of the coded packet or the length of the data part of the coded packet comprises:

a data length of the check packet is greater than a length of the original packet, and a data length of the system packet is equal to the length of the original packet; or a length of the check packet is greater than a sum of a length of the original packet and a packet header length of the system packet, and a length of the system packet is equal to the sum of the length of the original packet and the packet header length of the system packet; and a packet header length of the check packet is equal to the packet header length of the system packet, the check packet is obtained by performing shift exclusive OR coding based on the K original packets, and all of displacement quantities defined by coding coefficients in each group of coding coefficients used to generate the check packet are not 0.

10. The method according to claim 7, wherein the correspondence between the coded packet type and the length of the coded packet or the length of the data part of the coded packet comprises:

a data length of the check packet is greater than a length of the original packet, and a data length of the system packet is equal to the length of the original packet; or a length of the check packet is greater than a sum of a length of the original packet and a packet header length of the system packet, and a length of the system packet is equal to the sum of the length of the original packet and the packet header length of the system packet; and a packet header length of the check packet is equal to the packet header length of the system packet, and the check packet is obtained by performing shift exclusive OR coding based on the K system packets.

11. The method according to claim 1, wherein the packet header of the check packet further comprises indication information of the original packet quantity K.

12. The method according to claim 1, wherein the original packet quantity K is predefined or preconfigured.

13. A method, comprising:

receiving a plurality of coded packets, wherein the plurality of coded packets comprise a check packet, a packet header of the check packet does not comprise indication information of a coding coefficient, the check packet comprises data obtained by performing shift exclusive OR coding on K first data packets with a same length based on the coding coefficient, the K first data packets comprise K original packets or K system packets corresponding to the K original packets, K>1 and is an integer, and there is a correspondence between the coding coefficient and a difference between a data length of the check packet and the length of the first data packet.

14. The method according to claim 13, wherein the plurality of coded packets comprise U check packets, the check packet is any one of the U check packets, the U check packets comprise data obtained by performing shift exclusive OR coding on the K first data packets based on U groups of coding coefficients, each of the U check packets corresponds to one of the U groups of coding coefficients, and U≥1 and is an integer; and the method further comprises:

determining the coding coefficient based on the difference between the data length of the check packet and the length of the first data packet and a correspondence between the U groups of coding coefficients and U first values, wherein the U first values correspond to differences between the length of the first data packet and data lengths of the U check packets.

15. The method according to claim 14, wherein the U first values corresponding to differences between the length of the first data packet and data lengths of the U check packets comprises:

the U first values are respectively quantities of shift units comprised in the differences between the length of the first data packet and the data lengths of the U check packets.

16. The method according to claim 14, wherein the U first values corresponding to differences between the length of the first data packet and data lengths of the U check packets comprises:

the U first values are respectively ratios of quantities of shift units comprised in the differences between the length of the first data packet and the data lengths of the U check packets to a displacement reference quantity, wherein the displacement reference quantity is a greatest common divisor of largest displacement quantities respectively defined by different columns of coding coefficients in K rows of coding coefficients in a predefined P×Q-dimensional matrix that correspond to the U groups of coding coefficients, P≥K, Q≥U, and P and Q are integers.

17. The method according to claim 16, wherein the P×Q-dimensional matrix $H_V$ satisfies:

$$H_V = \begin{bmatrix} z^0 & z^0 & z^0 & \dots & z^0 \\ z^0 & z^1 & z^2 & \dots & z^{Q-1} \\ z^0 & z^2 & z^4 & \dots & z^{2(Q-1)} \\ \vdots & \vdots & \vdots & \ddots & \vdots \\ z^0 & z^{P-1} & z^{2(P-1)} & \dots & z^{(P-1)(Q-1)} \end{bmatrix},$$

wherein a group of coding coefficients used to generate one of the U check packets is from K coding coefficients $[z^{(i-1)(q-1)}\, z^{i(q-1)} \dots z^{(i+K-2)(q-1)}]^T$ in a $q^{th}$ column in the matrix $H_V$, $1 \leq i \leq P-K+1$, $1 \leq q \leq Q$, and q are integers; and a data part $y_q$ of the check packet satisfies $y_q = z^{(i-1)(q-1)}x_1 \oplus z^{i(q-1)}x_2 \oplus \dots \oplus z^{(i+K-2)(q-1)}x_k$, $\oplus$ represents exclusive OR processing, $x_1$, $x_2$, . . . , and $x_k$ represent the K first data packets, $z^t$ represents that data multiplied by $z^t$ is shifted by t shift units, $0 \leq t \leq (P-1)(Q-1)$, and t is an integer.

18. The method according to claim 14, wherein when U>1, lengths of any two of the U check packets are different.

19. The method according to claim 13, wherein the check packet is one of the plurality of coded packets, a packet header of each of the plurality of coded packets does not comprise indication information of a coded packet type, or a packet header of each of the plurality of coded packets does not comprise a coded packet type field, there is a correspondence between the coded packet type and a length of the coded packet or a length of a data part of the coded packet, and the coded packet type comprises a check packet or a system packet.

20. The method according to claim 19, wherein the correspondence between the coded packet type and the length of the coded packet the length of the data part of the coded packet comprises:

a length of the check packet is greater than a sum of a length of the original packet and a packet header length of the system packet, and a length of the system packet is equal to the sum of the length of the original packet and the packet header length of the system packet; or a length of the check packet is greater than or equal to a sum of a length of the original packet and a packet header length of the check packet, and a length of the system packet is less than the sum of the length of the original packet and the packet header length of the check packet; and the packet header length of the check packet is greater than the packet header length of the system packet.

* * * * *